United States Patent
Asano et al.

(10) Patent No.: US 7,225,339 B2
(45) Date of Patent: May 29, 2007

(54) INFORMATION RECORDING/PLAYBACK APPARATUS AND METHOD

(75) Inventors: Tomoyuki Asano, Kanagawa (JP); Yoshitomo Osawa, Kanagawa (JP); Ryuji Ishiguro, Tokyo (JP); Atsushi Mitsuzawa, Tokyo (JP); Tateo Oishi, Saitama (JP)

(73) Assignee: Sony Corporation (JP)

(*) Notice: Subject to any disclaimer, the term of this patent is extended or adjusted under 35 U.S.C. 154(b) by 839 days.

(21) Appl. No.: 09/980,272

(22) PCT Filed: Apr. 5, 2001

(86) PCT No.: PCT/JP01/02963

§ 371 (c)(1),
(2), (4) Date: Mar. 6, 2002

(87) PCT Pub. No.: WO01/78300

PCT Pub. Date: Oct. 18, 2001

(65) Prior Publication Data

US 2003/0016826 A1 Jan. 23, 2003

(51) Int. Cl.
*H04L 9/00* (2006.01)
(52) U.S. Cl. .................... 713/193; 380/280; 380/45
(58) Field of Classification Search ............ 713/193; 380/280, 45
See application file for complete search history.

(56) References Cited

FOREIGN PATENT DOCUMENTS

| DE | 19511298 A1 | 10/1996 |
|---|---|---|
| DE | 19847941 A1 | 4/2000 |
| EP | 0 768 774 | 4/1997 |
| EP | 789361 A2 | 8/1997 |
| EP | 1 008 989 A2 | 6/2000 |
| JP | 10-3256 A | 1/1998 |

(Continued)

OTHER PUBLICATIONS

Waldvogel, M., et al., "The VersaKey Framework: Versatile Group Key Management", IEEE Journal on Selected Areas in Communications, Sep. 1999, vol. 17, No. 9, pp. 1614 to 1631, especially pp. 1616 to 1621.

(Continued)

*Primary Examiner*—Gilberto Barron
*Assistant Examiner*—Jacob Lipman
(74) *Attorney, Agent, or Firm*—Lerner, David, Littenberg, Krumholz & Mentlik, LLP

(57) ABSTRACT

In a tree-structural key distribution system, renewed data of a master key and medium key are sent along with a key renewal block (KRB). KRB is such that each of devices included as leaves of a tree structure has a leaf key and restricted node key. A specific KRB can be generated for a group identified by a specific node and distributed to the group to restrict a device for which the key can be renewed. Any device not belonging to the group cannot decrypt the key, whereby the security of key distribution can be assured. Especially in a system using a generation-managed master key, a master key renewed with KRB can be distributed.

44 Claims, 43 Drawing Sheets

FOREIGN PATENT DOCUMENTS

| | | |
|---|---|---|
| JP | 11-126425 A | 5/1999 |
| JP | 11-187013 A | 7/1999 |
| JP | 11-224461 A | 8/1999 |
| JP | 11-250570 A | 9/1999 |
| WO | WO-01/03365 A1 | 1/2001 |

OTHER PUBLICATIONS

Wong, C. K. et al., Secure Group Communications Using Key Graphs. In: Proceedings of ACM SIGCOMM'98, (1998), pp. 68 to 79, especially, 3.4 Leaving a tree key graph (http://www.acm.org/sigcomm/sigcomm98/tp/technical.html).

5C Digital Transmission Content Protection White Paper Revision 1.0, (1998), pp. 3, 11, 12, (http://www.dtcp.com).

Chang et al., "Key Management for Secure Internet Multicast using Boolean Function Minimization Techniques", Infocom '99, Eighteeth Annual Joint Conference of the IEEE Computer and Communications Societies. Proceedings. IEEE New York, NY, 689-697 (Mar. 21, 1999).

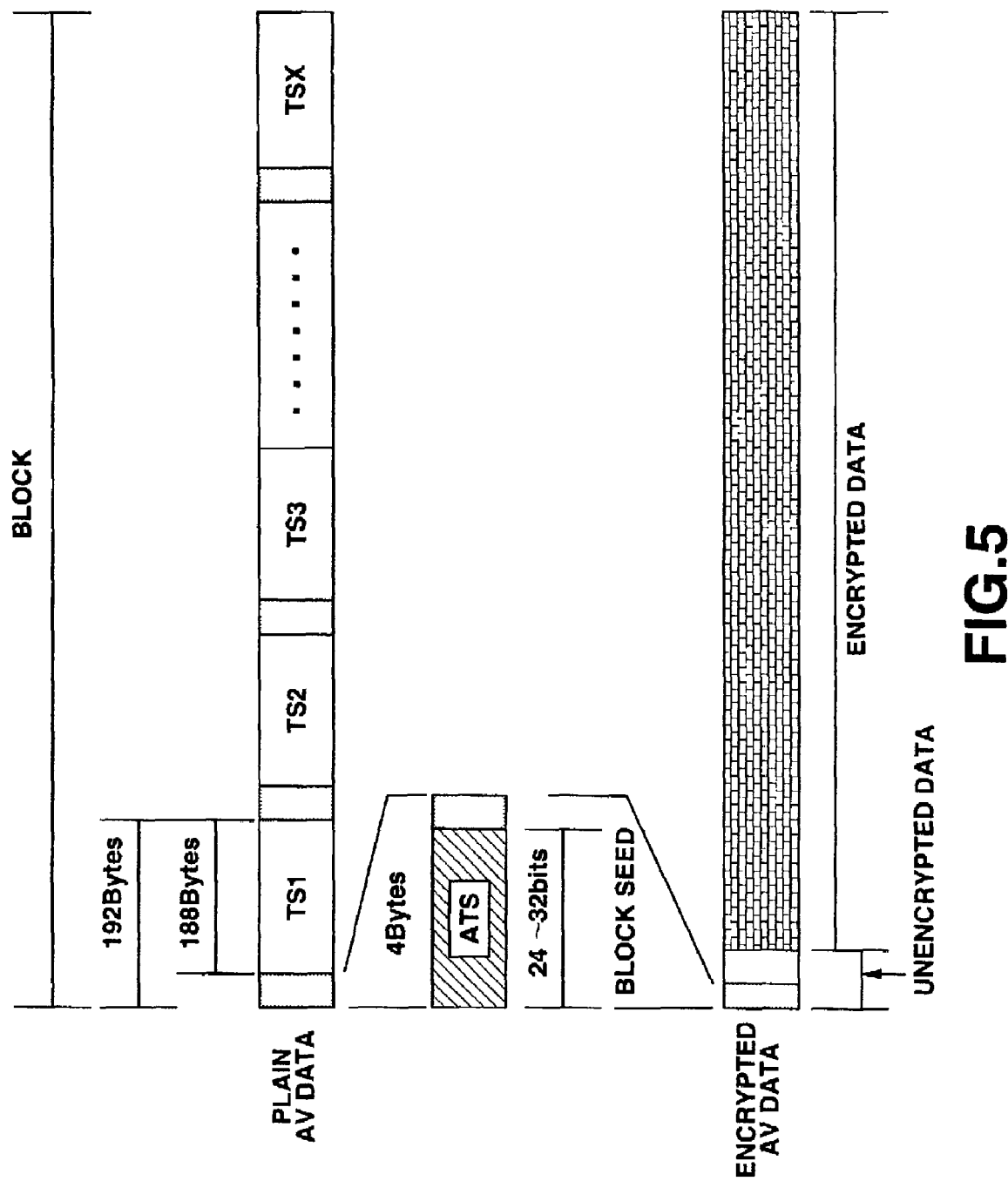

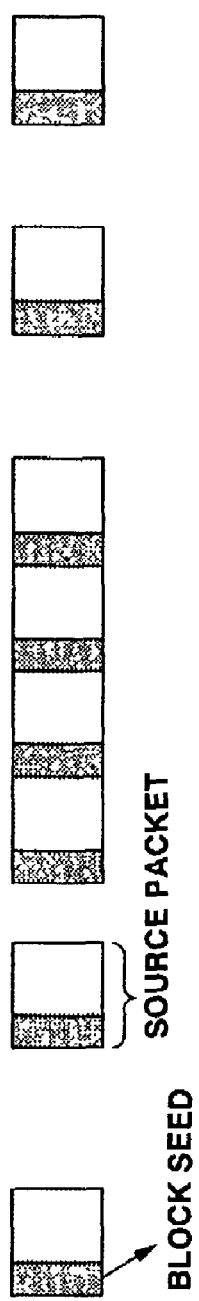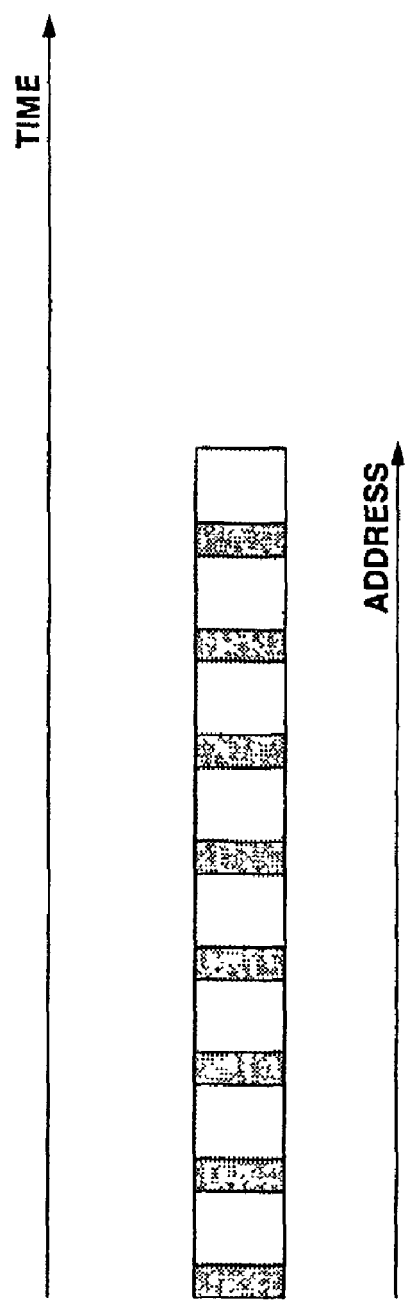
FIG.7A INPUT TRANSPORT STREAM
FIG.7B OUTPUT OF BLOCK SEED APPENDING CIRCUIT
FIG.7C AV DATA ON RECORDING MEDIUM

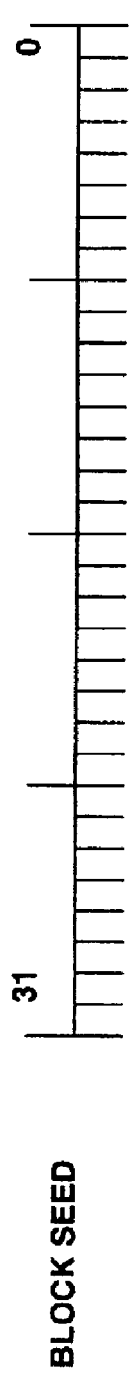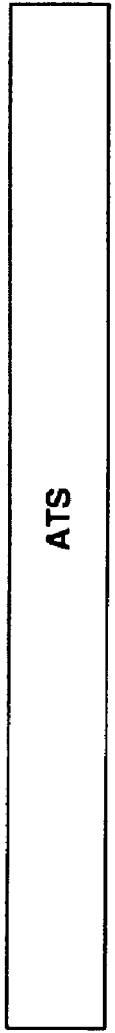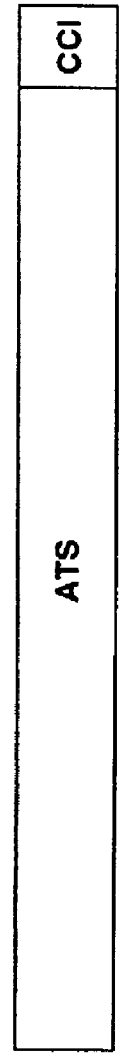
FIG.10

| GENERATION : t | |
|---|---|
| INDEX | ENCRYPTION KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG.12A

| GENERATION : t | |
|---|---|
| INDEX | ENCRYPTION KEY |
| 000 | Enc(K000, K(t)00) |
| 001 | Enc(K(t)001, K(t)00) |
| 0010 | Enc(K0010, K(t)001) |

FIG.12B

EXAMPLE 1
EXAMPLE OF DEVICE-UNIQUE KEY GENERATION
INPUTS:
MASTER KEY (64BITS)
DISC ID (64BITS)
OUTPUTS:
DISC-UNIQUE KEY (64BITS)
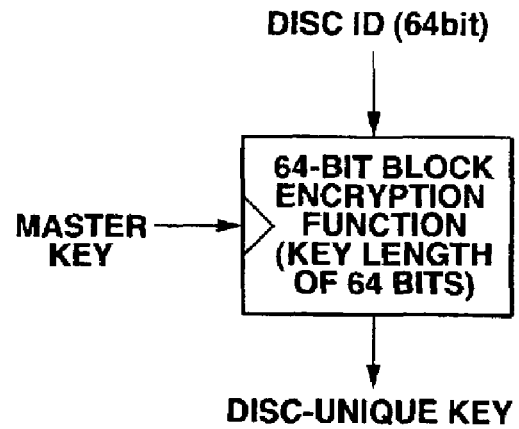
EXAMPLE 2
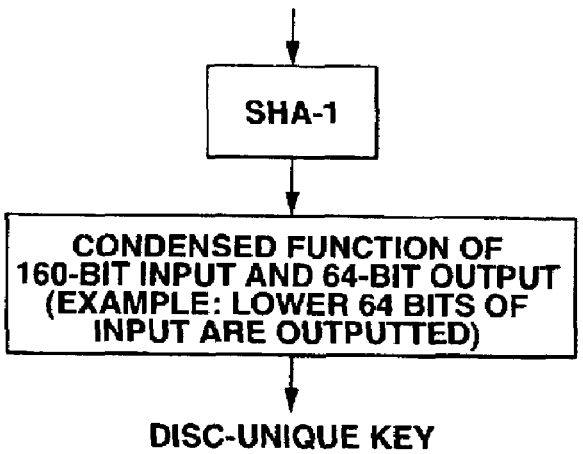
FIG.19

EXAMPLE 1
EXAMPLE OF BLOCK KEY GENERATION
INPUTS:
BLOCK SEED (32BITS)
TITLE-UNIQUE KEY (64BITS)
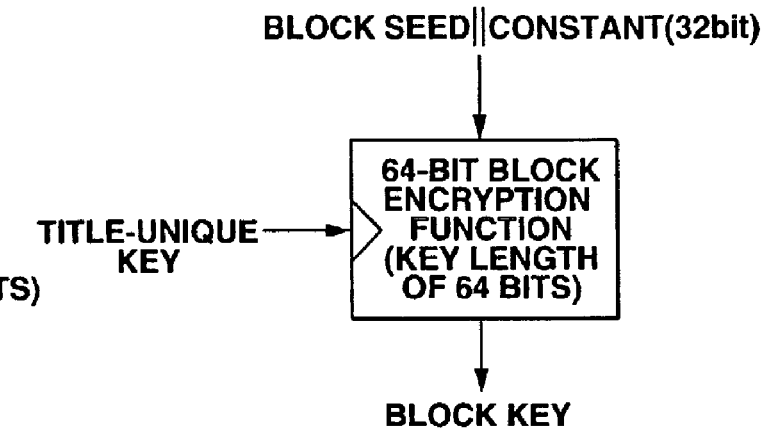
OUTPUTS:
BLOCK KEY (64BITS)
EXAMPLE 2
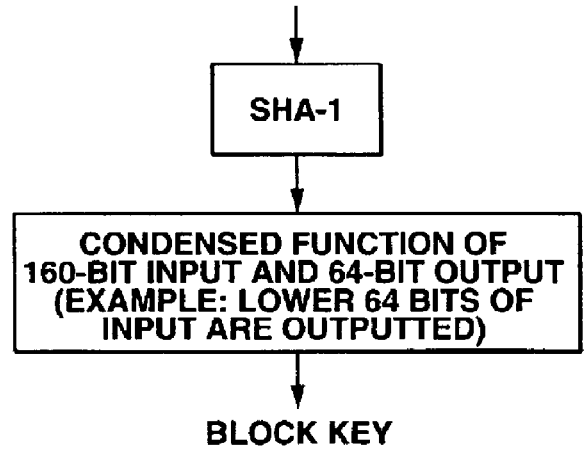
FIG.22

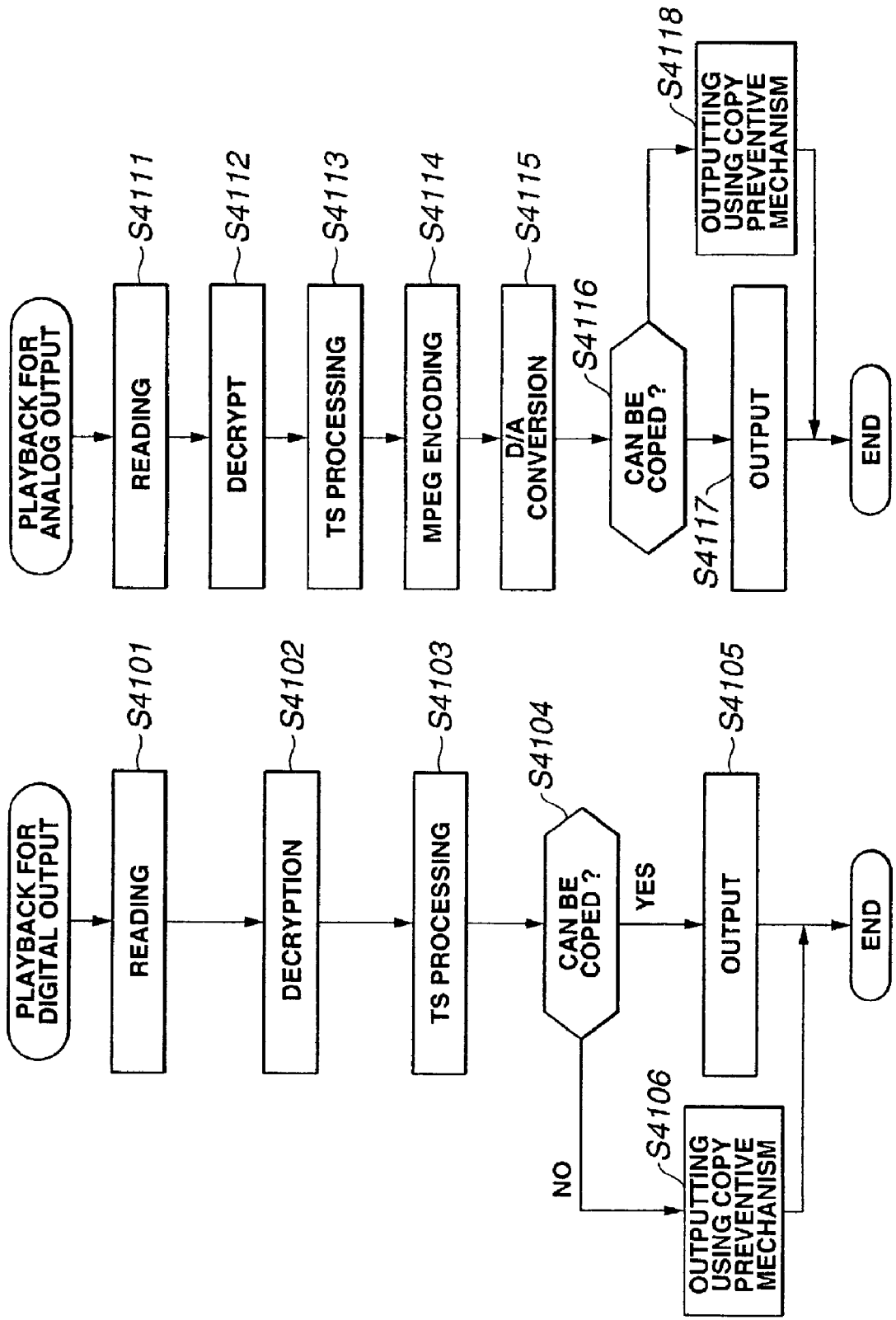

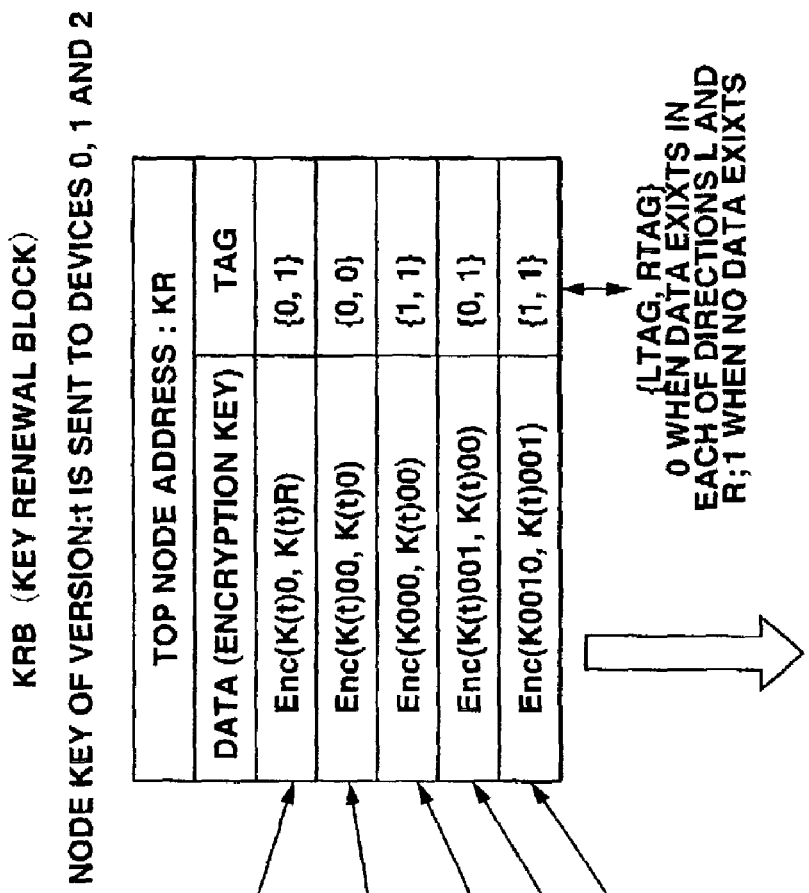
FIG.46B
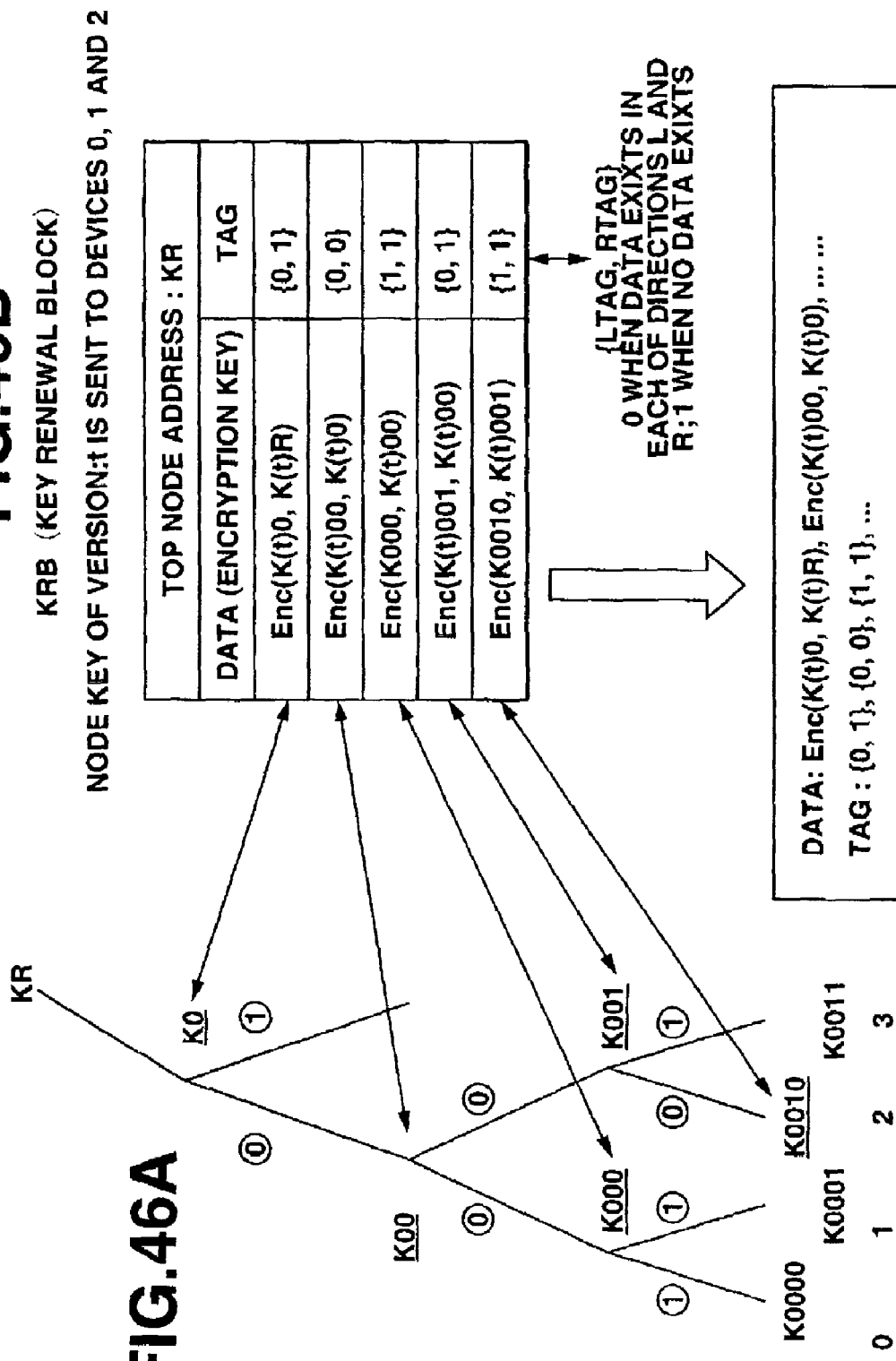
FIG.46A
FIG.46C

INFORMATION RECORDING/PLAYBACK APPARATUS AND METHOD

BACKGROUND OF THE INVENTION

1. Technical Field

The present invention relates generally to an information recorder, information player, information recording method, information playback method, information recording medium, and a program serving medium, and more particularly to an information recorder, information player, information recording method, information playback method, information recording medium, and a program serving medium, in which a tree-structured hierarchical key distribution method is used to reduce the size of a message, thereby minimizing the load of data distribution when a key such as a master key, medium key or the like has been renewed. More particularly, the present invention relates to an information recorder, information player, information recording method, information playback method, information recording medium, and a program serving medium, in which a key distribution method in which each of a number n of recorder/players is disposed at each of leaves of a tree is used to distribute a necessary key, such as a maser key or medium key, for recording or playback of a content data to or from a recording medium via the recording medium or a communications line and the master key or medium key thus distributed is used by each recorder/player to record or play back the content data.

2. Background Art

With the recent advancement and development of the digital signal processing technology, digital recorders and recording media have been prevailing. With such a digital recorder and recording medium, an image or sound, for example, can be repeatedly recorded and played back without any degradation thereof. Since digital data can be repeatedly copied many times with no degradation of the image and sound qualities, so recording media having digital data illegally recorded therein, if put on the market, will cause the copyrighters of various contents such as music, movie, etc. or legal distributors of the contents to be deprived of profits which would come to the latter if such illegal copying is not possible. To prevent such illegal copying of digital data, various illegal-copy preventing systems have recently been introduced in digital recorders and recording media.

As an example of the above illegal-copy preventing systems, SCMS (Serial Copy Management System) is adopted in the MD (mini disc) drive (MD is a trademark). The SCMS is such that at a data player side, audio data is outputted along with SCMS signal from a digital interface (DIF) while at a data recorder side, recording of the audio data from the data player side is controlled based on the SCMS signal from the data player side, thereby preventing the audio data from being illegally copied.

More particularly, the above SCMS signal indicates that an audio data is a "copy-free" data which is allowed to freely be copied many times, a "copy-once-allowed" data which is allowed to be copied only once or a "copy-prohibited" data which is prohibited from being copied. At the data recorder side, when receiving an audio data from the DIF, SCMS signal transmitted along with the audio data is detected. If the SCMS signal indicates that the audio data is a "copy-free" data, the audio data is recorded along with the SCMS signal to the mini disc. If the SCMS signal indicates that the audio data is a "copy-once-allowed" data, the audio data is converted to a "copy-prohibited" data and the SCMS signal is recorded along with the audio data to the mini disc. Further, if the SCMS signal indicates that the audio data is a copy-prohibited data, the audio data is not recorded to the mini disc. Under a control with the SCMS signal, a copyrighted audio data is prevented from being illegally copied in the mini disc drive unit.

However, the SCMS is valid only when the data recorder itself is constructed to control recording of audio data from the data player side based on the SCMS signal. Therefore, it is difficult for the SCMS to support a mini disc drive not constructed to perform the SCMS control. To apply the SCMS, a DVD player for example adopts a content scrambling system to prevent a copyrighted data from being illegally copied.

The content scrambling system is such that encrypted video data, audio data and the like are recorded in a DVD-ROM (read-only memory) and a decryption key for use to decrypt the encrypted data is granted to each licensed DVD player. The license is granted to a DVD player designed in conformity with a predetermined operation rule against illegal copying etc. Therefore, using the granted decryption key, a licensed DVD player can decrypt encrypted data recorded in a DVD-ROM to thereby play back the video and audio data from the DVD-ROM.

On the other hand, an unlicensed DVD player cannot decrypt encrypted data recorded in a DVD-ROM because it has no decryption key for the encrypted data. In short, the content scrambling system prevents a DVD player not meeting the licensing requirements from playing a DVD-ROM having digital data recorded therein in order to prevent illegal copying.

However, the content scrambling system adopted in the DVD-ROM is directed to a recording medium to which the user cannot write data (will be referred to as "ROM medium" hereunder wherever appropriate), but not to any recording medium to which the user can write data (will be referred to as "RAM medium" hereunder wherever appropriate).

That is to say, copying all encrypted data recorded in a ROM medium as they are to a RAM medium will produce a so-called pirated edition of the data which can be played back by a licensed DVD player.

To solve the above problem, the Applicant of the present invention proposed, as disclosed in the Japanese Published Unexamined Application No. 224461 of 1999 (Japanese Patent Application No. 25310 of 1998), a method in which information to identify each recording medium (will be referred to as "medium ID information" hereunder) is recorded with other data in a recording medium to allow access to the medium ID information in the recording medium only when a player going to play the recording medium has been licensed for the medium ID information.

The above method encrypts data in the recording medium with a private key (master key) acquired through licensing of the medium ID information so that any unlicensed player cannot acquire any meaningful data even if it can read the encrypted data. Note that a player licensed for the medium ID information has the operation thereof restricted against illegal copying.

No unlicensed player can access the medium ID information. The medium ID information is unique to each recording medium. Even if an unlicensed player could copy all encrypted data recorded in such a recording medium to a new recording medium, the data thus recorded in the new recording medium cannot correctly be decrypted by the unlicensed player as well as by a licensed player. Thus, it is substantially possible to prevent data from being illegally copied.

Now it should be reminded that in the above conventional system, a master key stored in a licensed device is generally common to all devices included in the same system. The master key common to a plurality of devices in a system is stored to permit one of the devices to play a recording medium having data recorded therein by any other device in the system (to secure the inter-device operability).

However, if an attacker has succeeded in attacking a device included the in the system and extracted the master key, the encrypted data recorded in the entire system can be decrypted and the entire system will be collapsed. To avoid the above, if it is revealed that an attacking of the device has uncover the master key, the master key has to be renewed to a new one and the new master key has to be granted to all the devices included in the system except for the one having been attacked. This measure can be implemented most simply by giving each of the devices a unique key (device key), encrypting the new master key with each of the device keys to provide a corresponding value, and transmitting the value to each of the devices via a recording medium. However, this will add to the size of to-be-transmitted message proportionally to the number of the destination devices.

SUMMARY OF THE INVENTION

Accordingly, the present invention has an object to overcome the above-mentioned drawbacks of the prior art by providing a system in which the tree-structured key distribution method is used to reduce the size of a message, thereby minimizing the load of distributing a new or renewed key such as a master key, medium key or the like. That is, the present invention has an object to provide an information recorder, information player, information recording method, information playback method, information recording medium and a program serving medium, in which a key distribution method in which each of a number n of recorder/players is disposed at each of leaves of a tree is used to distribute a necessary key, such as a maser key or medium key, for recording or playback of a content data to or from a recording medium via the recording medium or a communications line and the master key or medium key thus distributed is used by each recorder/player to record or play back the content data.

According to the first aspect of the present invention, there can be provided an information recorder to record information to a recording medium, the apparatus including a cryptography means having a node key unique to each of nodes included in a hierarchical tree structure in which a plurality of different information recorders is included as each of leaves of the tree structure and a leaf key unique to each of the information recorders, and which encrypts data to be stored into the recording medium; the cryptography means generating an encryption key based on encryption key generating data built in the information recorder to encrypt data to be stored into the recording medium; and the encryption key generating data being data which can be renewed with at least either the node key or leaf key.

In the above information recorder according to the present invention, the encryption key generating data is a master key common to the plurality of information recorders.

Further in the above information recorder according to the present invention, the encryption key generating data is a medium key unique to a specific recording medium.

Also in the above information recorder according to the present invention, the node key can be renewed, there is distributed, when a node key is renewed, a key renewal block (KRB) derived from encryption of the renewal node key with at least either a node key or leaf key on a lower stage of the tree structure to an information recorder at a leaf where the encryption key generating data has to be renewed, and the cryptography means in the information recorder receives a renewal data for the encryption key generating data encrypted with the renewed node key, encrypts the key renewal block (KRB) to acquire the renewed node key, and calculates a renewal data for the encryption key generating data based on the renewed node key thus acquired.

Further in the above information recorder according to the present invention, the key renewal block (KRB) is stored in a recording medium and the cryptography means encrypts the key renewal block (KRB) read from the recording medium.

Further in the above information recorder according to the present invention, the encryption key generating data has a generation number as renewal information correlated therewith, and the cryptography means stores, as a recording generation number into the recording member, a generation number of the encryption key generating data having been used when storing encrypted data into the recording medium.

Further in the above information recorder according to the present invention, the following encrypting procedures are selectively effected depending upon whether a player restriction is set or not: when the player restriction is not set, a first encryption key is generated for data to be stored into the recording medium based on a first encryption key generating data to encrypt the data to be stored into the recording medium with the first encryption key and the first encryption key generating data is stored into the recording medium, or when the player restriction is set, a second encryption key for the data to be stored into the recording medium is generated based on a second encryption key generating data built in the information recorder to encrypt the data to be stored into the recording medium with the second encryption key.

Further in the above information recorder according to the present invention, when the player restriction is not set, the cryptography means generates a title-unique key from a master key, of which the generation is managed, stored in the information recorder, a disc ID being an identifier unique to a recording medium, a title key unique to data to be recorded to the recording medium and a device ID being an identifier for the information recorder and generates the first encryption key from the title-unique key, or when the player restriction is set, the cryptography means generates a title-unique key from the generation-managed master key stored in the information recorder, disc ID being an identifier unique to the recording medium, title key unique to the data to be recorded to the recording medium and the device-unique key unique to the information recorder and generates the second encryption key from the title-unique key.

In the above information recorder according to the present invention, there is further included a transport stream processing means for appending an arrival time stamp (ATS) to each of discrete transport packets included in a transport stream, the cryptography means generates a block key as an encryption key for a block data including more than one packet each having the arrival time stamp (ATS) appended thereto, and the block key as an encryption key is generated, in encryption of the data to be stored into the recording medium, based on data including the encryption key generating data and a block seed being additional information unique to the block data including the arrival time stamp (ATS).

Further in the above information recorder according to the present invention, the cryptography means encrypts the data to be stored into the recording medium according to DES algorithm.

In the above information recorder according to the present invention, there is further provided an interface means for receiving information to be recorded to a recording medium, and identifying copy control information appended to each of packets included in a transport stream in a data to judge, based on the copy control information, whether or not recording to the recording medium is possible.

In the above information recorder according to the present invention, there is further provided an interface means for receiving information to be recorded to a recording medium, and identifying 2-bit EMI (encryption mode indicator) as copy control information to judge, based on the EMI, whether or not recording to the recording medium is possible.

According to the second aspect of the present invention, there can be provided an information player to play back information from a recording medium, the apparatus including a cryptography means having a node key unique to each of nodes included in a hierarchical tree structure in which a plurality of different information recorders is included as each of leaves of the tree structure and a leaf key unique to each of the information recorders and which decrypts data stored in the recording medium; the cryptography means generating a decryption key based on decryption key generating data built in the information recorder to decrypt data stored in the recording medium; and the decryption key generating data being data which can be renewed with at least either the node key or leaf key.

In the above information player according to the present invention, the decryption key generating data is a master key common to the plurality of information recorders.

Further in the above information player according to the present invention, the decryption key generating data is a medium key unique to a specific recording medium.

Also in the above information player according to the present invention, the node key can be renewed, there is distributed, when a node key is renewed, a key renewal block (KRB) derived from encryption of the renewal node key with at least either a node key or leaf key on a lower stage of the tree structure to an information player at a leaf where the encryption key generating data has to be renewed, and the cryptography means in the information recorder receives a renewal data for the decryption key generating data encrypted with the renewed node key, encrypts the key renewal block (KRB) to acquire the renewed node key, and calculates a renewal data for the decryption key generating data based on the renewed node key thus acquired.

Further in the above information player according to the present invention, the key renewal block (KRB) is stored in a recording medium and the cryptography means encrypts the key renewal block (KRB) read from the recording medium.

Further in the above information player according to the present invention, the decryption key generating data has a generation number as renewal information correlated therewith, and the cryptography means reads, from the recording medium when decrypting encrypted data from the recording medium, a generation number of the encryption key generating data having been used when encrypting the encrypted data and generates a decryption key from decryption key generating data corresponding to the generation number thus read.

Further in the above information player according to the present invention, there are selectively effected the following procedures either of which is to be effected depending upon whether a player restriction is set or not: when the player restriction is not set, a first decryption key is generated for encrypted data stored in the recording medium based on a first decryption key generating data stored in the recording medium, the encrypted data is decrypted with the first decryption key, or when the player restriction is set, a second decryption key for the encrypted data stored in the recording medium is generated based on a second encryption key generating data built in the information recorder and the encrypted data is decrypted with the second decryption key.

Further in the above information player according to the present invention, when the player restriction is not set, the cryptography means acquires a generation-managed master key stored in the information recorder and acquires, from a recording medium, a disc ID being an identifier unique to a recording medium, a title key unique to data to be decrypted and a device ID being an identifier for the information recorder having recorded the encrypted data to generate a title-unique key from the master key, disc ID, title key and device key and the first decryption key from the title-unique key, or when the player restriction is set, the cryptography means acquires a generation-managed master key stored in the information recorder and a device-unique key unique to, and stored in, the information recorder and acquires, from a recording medium, a disc ID being an identifier unique to the recording medium and a title key unique to the data to be decrypted to generate a title-unique key from the master key, disc ID, title key and device-unique key, and the second decryption key is generated from the title-unique key.

In the above information player according to the present invention, there is further included a transport stream processing means for controlling data outputting based on an arrival time stamp (ATS) appended to each of a plurality of transport packets included in the block data having been decrypted by the cryptography means, the cryptography means generates a block key as a decryption key for a block data including more than one packets each having the arrival time stamp (ATS) appended thereto, and the block key as a decryption is generated, in decryption of the encrypted data stored in the recording medium, based on data including the decryption key generating data and a block seed being additional information unique to the block data including the arrival time stamp (ATS).

Further in the above information player according to the present invention, the cryptography means decrypts the encrypted data stored in the recording medium according to DES algorithm.

In the above information player according to the present invention, there is further provided an interface means for receiving information to be recorded to a recording medium, and identifying copy control information appended to each of packets included in a transport stream in a data to judge, based on the copy control information, whether or not playback from the recording medium is possible.

In the above information player according to the present invention, there is further provided an interface means for receiving information to be recorded to a recording medium, and identifying 2-bit EMI (encryption mode indicator) as copy control information to judge, based on the EMI, whether or not playback from the recording medium is possible.

According to the third aspect of the present invention, there can be provided an information recording method for recording information to a recording medium, the method including the steps of: renewing encryption key generating data to generate an encryption key for encrypting data to be stored into a recording medium with at least either a node key unique to each of nodes included in a hierarchical tree structure in which a plurality of different information recorders is included as each of leaves of the tree structure or a leaf key unique to each of the information recorders; and generating an encryption key based on the encryption key generating data to encrypt data to be stored into the recording medium.

In the above information recording method according to the present invention, the encryption key generating data is a master key common to the plurality of information recorders.

Further in the above information recording method according to the present invention, the encryption key generating data is a medium key unique to a specific recording medium.

Also in the above information recording method according to the present invention, the node key can be renewed, there is distributed, when a node key is renewed, a key renewal block (KRB) derived from encryption of the renewal node key with at least either a node key or leaf key on a lower stage of the tree structure to an information recorder at a leaf where the encryption key generating data has to be renewed, and the renewing step includes steps of: acquiring the renewed node key by encrypting the key renewal block (KRB); and calculating a renewal data for the encryption key generating data based on the renewed node key thus acquired.

Further in the above information recording method according to the present invention, the encryption key generating data has a generation number as renewal information correlated therewith, and the cryptography step further includes the step of storing, when storing encrypted data into the recording medium, a generation number of the encryption key generating data having been used, as a recording generation number into the recording medium.

Further in the above information recording method according to the present invention, the cryptography step includes the following two procedures, either of which is to selectively be effected depending upon whether a player restriction is set or not: when the player restriction is not set, a first encryption key is generated for data to be stored into the recording medium based on a first encryption key generating data, the data to be stored into the recording medium is encrypted with the first encryption key and the first encryption key generating data is stored into the recording medium; and when the player restriction is set, a second encryption key for the data to be stored into the recording medium is generated based on a second encryption key generating data built in the information recorder and the data to be stored into the recording medium is encrypted with the second encryption key.

Further in the above information recording method according to the present invention, the cryptography step includes the following two procedures: When the player restriction is not set, the cryptography means generates a title-unique key from a generation-managed master key stored in the information recorder, a disc ID being an identifier unique to a recording medium, a title key unique to data to be recorded to the recording medium and a device ID being an identifier for the information recorder and generates the first encryption key from the title-unique key; and when the player restriction is set, the cryptography means generates a title-unique key from the generation-managed master key stored in the information recorder, disc ID being an identifier unique to the recording medium, title key unique to the data to be recorded to the recording medium and the device-unique key unique to the information recorder and generates the second encryption key from the title-unique key.

In the above information recording method according to the present invention, there is further included a transport stream processing step of appending an arrival time stamp (ATS) to each of discrete transport packets included in a transport stream, there is generated in the cryptography step a block key as an encryption key for a block data including more than one packet each having the arrival time stamp (ATS) appended thereto, and the block key as an encryption key is generated, in encrypt of the data to be stored into the recording medium, based on data including the encryption key generating data and a block seed being additional information unique to the block data including the arrival time stamp (ATS).

Further in the above information recording method according to the present invention, there is encrypted in the cryptography step the data to be stored into the recording medium according to DES algorithm.

In the above information recording method according to the present invention, copy control information appended to each of packets included in a transport stream in a data is identified to judge, based on the copy control information, whether or not recording to the recording medium is possible.

In the above information recording method according to the present invention, 2-bit EMI (encryption mode indicator) as copy control information is identified to judge, based on the EMI, whether or not recording to the recording medium is possible.

According to the fourth aspect of the present invention, there can be provided an information playback method to play back information from a recording medium, the method including the steps of: renewing decryption key generating data from which there is generated a decryption key for decryption of encrypted data stored in the recording medium with at least either a node key unique to each of nodes included in a hierarchical tree structure in which a plurality of different information players is included as each of leaves of the tree structure or a leaf key unique to each of the information players; and generating the decryption key from the decryption key generating data having renewed in the renewing step to decrypt the data stored in the recording medium.

In the above information playback method according to the present invention, the decryption key generating data is a master key common to the plurality of information recorders.

Further in the above information playback method according to the present invention, the decryption key generating data is a medium key unique to a specific recording medium.

Also in the above information player according to the present invention, the node key can be renewed, there is distributed, when a node key is renewed, a key renewal block (KRB) derived from encryption of the renewal node key with at least either a node key or leaf key on a lower stage of the tree structure to an information player at a leaf where the encryption key generating data has to be renewed, and the cryptography step includes the steps of: encrypting the key renewal block (KRB) to acquire the renewed node key; and calculating a renewal data for the decryption key generating data based on the renewed node key thus acquired.

Further in the above information playback method according to the present invention, the decryption key generating data has a generation number as renewal information correlated therewith, and there is read, in the cryptography step, from the recording medium when decrypting encrypted data from the recording medium, a generation number of the encryption key generating data having been used when encrypting the encrypted data to generate a decryption key from decryption key generating data corresponding to the generation number thus read.

Further in the above information playback method according to the present invention, the cryptography step includes the following two procedures, either of which is to selectively be effected depending upon whether a player restriction is set or not: when the player restriction is not set, a first decryption key is generated for encrypted data stored in the recording medium based on a first decryption key generating data stored in the recording medium, the encrypted data is decrypted with the first decryption key, or when the player restriction is set, a second decryption key for the encrypted data stored in the recording medium is generated based on a second encryption key generating data built in the information recorder and the encrypted data is decrypted with the second decryption key.

Further in the above information recorder according to the present invention, the cryptography step includes the following two procedures: when the player restriction is not set, there is acquired a generation-managed master key stored in the information recorder and also acquired, from a recording medium, a disc ID being an identifier unique to a recording medium, a title key unique to data to be decrypted and a device ID being an identifier for the information recorder having recorded the encrypted data to generate a title-unique key from the master key, disc ID, title key and device key and the first decryption key from the title-unique key; and when the player restriction is set, there is acquired a generation-managed master key stored in the information recorder and a device-unique key unique to, and stored in, the information recorder and also acquired, from a recording medium, a disc ID being an identifier unique to the recording medium and a title key unique to the data to be decrypted to generate a title-unique key from the master key, disc ID, title key and device-unique key; and the second decryption key being generated from the title-unique key thus generated.

In the above information playback method according to the present invention, the player includes a transport stream processing means for controlling data outputting based on an arrival time stamp (ATS) appended to each of a plurality of transport packets included in the decrypted block; and in the cryptography step, a block key is generated as a decryption key for a block data including more than one packets each having the arrival time stamp (ATS) appended thereto, and the block key as a decryption is generated, in decryption of the encrypted data stored in the recording medium, based on data including the decryption key generating data and a block seed being additional information unique to the block data including the arrival time stamp (ATS).

Further in the above information playback method according to the present invention, the cryptography means decrypts the encrypted data stored in the recording medium according to DES algorithm.

Further in the above information playback method according to the present invention, copy control information appended to each of packets included in a transport stream in a data is identified to judge, based on the copy control information, whether or not playback from the recording medium is possible.

Further in the above information playback method according to the present invention, 2-bit EMI (encryption mode indicator) as copy control information is identified to judge, based on the EMI, whether or not playback from the recording medium is possible.

According to the fifth aspect of the present invention, there can be provided an information recording medium capable of recording information, having stored therein a key renewal block (KRB) derived from encryption of a renewed node key with at least either a node key unique to each of nodes included in a hierarchical tree structure in which a plurality of different information recorders is included as each of leaves of the tree structure and a leaf key unique to each of the information recorders.

Further in the above information recording medium according to the present invention, there is included data derived from encryption, with the renewed node key, of encryption key generating data used to generate an encryption key to encrypt data to be stored into the recording medium in the information recorder.

Further in the above information recording medium according to the present invention, there is included data derived from decryption, with the renewed node key, of decryption key generating data used to generate a decryption key to decrypt encrypted data stored in the recording medium in the information player.

Further in the above information recording medium according to the present invention, there is stored generation information on the encryption or decryption key generating data.

According to the sixth aspect of the present invention, there can be provided a recording medium producing apparatus for producing an information recording medium, the apparatus including: a memory to store a key renewal block (KRB) derived from encryption of a renewed node key with at least either a node key unique to each of nodes included in a hierarchical tree structure in which a plurality of different information recorders is included as each of leaves of the tree structure and a leaf key unique to each of the information recorders; and a control unit to control write of the key renewal block (KRB) stored in the memory to the recording medium.

Further in the above recording medium producing apparatus, the memory further stores at least any of a recording medium identifier and encrypted encryption key generating data or encrypted decryption key generating data, and the control unit controls write, to the recording medium, of at least any of the recording medium identifier and encrypted encryption key generating data or encrypted decryption key generating data.

Further in the above recording medium producing apparatus, the memory further stores generation information on the encryption key generating data or decryption key generating data, and the control unit controls write of the generation information to the recording medium.

According to the seventh aspect of the present invention, there can be provided a recording medium producing method including the steps of: storing, into a memory, a key renewal block (KRB) derived from encryption of a renewed node key with at least either a node key unique to each of nodes included in a hierarchical tree structure in which a plurality of different information recorders is included as each of leaves of the tree structure and a leaf key unique to each of the information recorders; and writing, to the recording medium, the key renewal block (KRB) stored in the memory.

Further in the above recording medium producing method, there is further stored into the memory at least any of a recording medium identifier and encrypted encryption key generating data or encrypted decryption key generating data, and there is written to the recording medium at least any of the recording medium identifier and encrypted encryption key generating data or encrypted decryption key generating data.

Further in the above recording medium producing method, generation information on the encryption key generating data or decryption key generating data is stored into the memory, and write of the generation information to the recording medium is controlled.

According to the eighth aspect of the present invention, there can be provided a program serving medium for serving a computer program under which information processing for recording information to a recording medium is conducted in a computer system, the computer program including the steps of: renewing encryption key generating data to generate an encryption key for encrypting data to be stored into a recording medium with at least either a node key unique to each of nodes included in a hierarchical tree structure in which a plurality of different information recorders is included as each of leaves of the tree structure or a leaf key unique to each of the information recorders; and generating an encryption key based on the encryption key generating data to encrypt data to be stored into the recording medium.

According to the ninth aspect of the present invention, there can be provided a program serving medium for serving a computer program under which information stored in a recording medium is played back in a computer system, the computer program including the steps of: renewing decryption key generating data from which there is generated a decryption key for decryption of encrypted data stored in the recording medium with at least either a node key unique to each of nodes included in a hierarchical tree structure in which a plurality of different information players is included as each of leaves of the tree structure or a leaf key unique to each of the information players; and generating the decryption key from the decryption key generating data having renewed in the renewing step to decrypt the data stored in the recording medium.

According to the present invention, the tree-structure hierarchical key distribution method is used to reduce the size of a message to be distributed, necessary for renewing the key. Namely, in the key distribution method, each of a number n of recorder/players is disposed at each of leaves of a tree. The method is used to distribute a necessary key, such as a maser key or medium key, for recording or playback of a content data to or from a recording medium via the recording medium or a communications line, and the master key or medium key thus distributed is used by each recorder/player to record or play back the content data.

According to one of the modes of the present invention, a content to be recorded to a recording medium is in the form of MPEG2-defined TS (transport stream) packets, and it is recorded with ATS being formation on a time at which the packet has been received by the recorder, appended to each of the TS packets. The ATS is a somehow random data of 24 to 32 bits. ATS stands for "arrival time stamp". One block (sector) of the recording medium records a number X of TS (transport stream) packets each having an ATS appended thereto. An ATS appended to the first one of TS packets in each of blocks included in a transport stream is used to generate a block key which is used to encrypt the data in the block.

Thus, data in each block can be encrypted with a unique block key without having to provide any special area for storage of the key and access any data other than main data during recording or playback.

Further, in addition to ATS, copy control information (CCI) may be appended to a TS packet to be recorded and both the ATS and CCI be used to generate a block key.

Note that the program serving media according to the eighth and ninth aspects of the present invention are for example a medium which serves a computer program in a computer-readable form to a general-purpose computer system capable of executing various program codes. The medium is not limited to any special form but it may be any of recording media such as CD, FD, MO, etc. and transmission media such as a network.

The above program serving media define a structural or functional collaboration between a computer program and medium to perform functions of a predetermined computer program in a computer system. In other words, when the computer program is installed in a computer system via the program serving medium, it will work collaboratively in the computer system to provide the similar effects to those in the other aspects of the present invention.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 5 explains a data format processed in the information recorder/player according to the present invention.

FIGS. 7A to 7C explain a transport stream processed in the information recorder/player according to the present invention.

FIG. 10 shows an example of additional information to the block data processed in the information recorder/player according to the present invention.

FIGS. 12A and 12B show examples of the key renewal block (KRB) used in distribution of keys such as the master key, medium key, etc. to the information recorder/player according to the present invention.

FIG. 19 explains an example of disc-unique key generation in the information recorder/player according to the present invention.

FIG. 22 shows how to generate the block key in the information recorder/player according to the present invention.

FIGS. 41A and 41B show flows of operations effected for copy control in the data playback in the information recorder/player according to the present invention.

FIGS. 46A to 46C explains a tag to the key renewal block (KRB) used in the information recorder/player according to the present invention.

DETAILED DESCRIPTION

[System Configuration]

Figure 1:
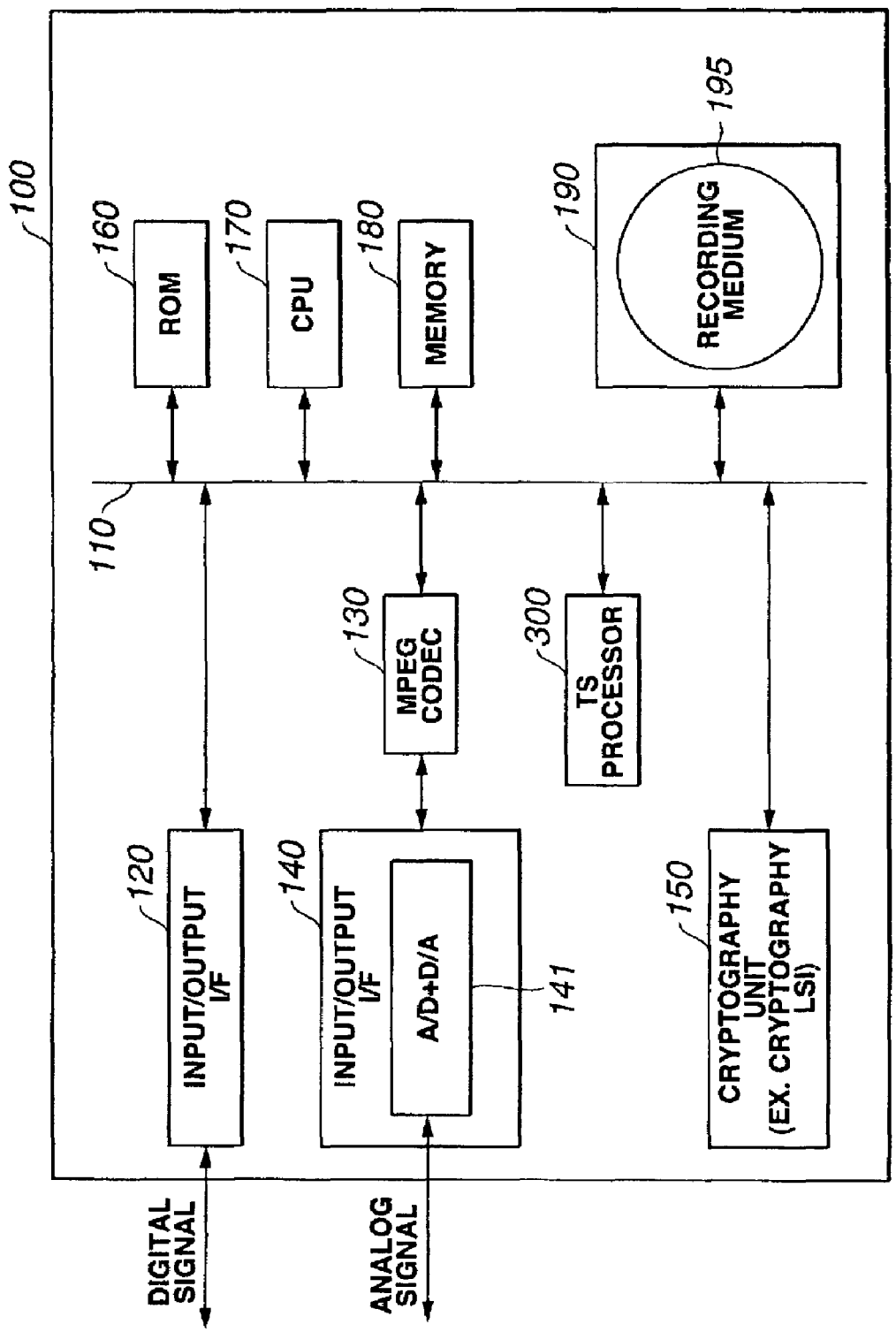
FIG. 1 is a block diagram showing an example construction (1) of the information recorder/player according to the present invention.

Referring now to FIG. 1, there is schematically illustrated in the form of a block diagram an embodiment of the information recorder/player according to the present invention. The recorder/player is generally indicated with a reference 100. As shown, the recorder/player 100 includes an input/output interface (I/F) 120, MPEG (Moving Picture Experts Group) codec 130, input/output I/F 140 including an A/D converter and D/A converter combination 141, cryptography unit 150, ROM (read-only memory) 160, CPU (central processing unit) 170, memory 180, drive 190 for a recording medium 195, and a transport stream processing means (TS processor) 300. The components are connected to each other by a bus 110.

The in/output I/F 120 receives digital signals included in each of various contents such as image, sound, program or the like supplied from outside, and outputs them to the bus 110 and also to outside. The MPEG codec 130 makes MPEG decoding of MPEG-encoded data supplied via the bus 110, and outputs the MPEG-decoded data to the input/output I/F 140 while making MPEG encoding of digital signals supplied from the input/output I/F 140 and outputs the data to the bus 110. The input/output I/F 140 incorporates the A/D converter and D/A converter combination 141. The input/output I/F 140 receives analog signals as a content from outside, makes A/D (analog-to-digital) conversion of the data and outputs digital signals thus obtained to the MPEG codec 130, while making D/A (digital-to-analog) conversion of digital signals from the MPEG codec 130 and outputs analog signals thus obtained to outside.

The cryptography unit 150 is a one-chip LSI (large scale integrated circuit) for example. It encrypts or decrypts digital signals in a content supplied via the bus 110, and outputs the data to the bus 110. Note that the cryptography unit 150 is not limited to the one-chip LSI but may be a combination of various types of software or hardware. A software-type cryptography unit will further be described later.

The ROM 160 has stored therein a leaf key being a device key unique to for example each recorder/player or a group of a plurality of recorders/players and a node key being a device key unique to the plurality of recorder/players or a plurality of groups. The CPU 170 executes a program stored in the memory 180 to control the MPEG codec 130, cryptography unit 150, etc. The memory 180 is for example a nonvolatile memory to store for example a program to be executed by the CPU 170 and necessary data for operation of the CPU 170. The drive 190 drives the recording medium 195 capable of recording digital data to read digital data from the recording medium 195 and outputs the data to the bus 110 while supplying digital data supplied via the bus 110 to the recording medium 195 for recording to the latter. Note that the recorder/player 100 may be constructed so that the ROM 160 stores the program while the memory 180 stores the device keys.

The recording medium 195 is a medium capable of storing digital data, such as one of optical discs including a DVD, CD and the like, a magneto-optical disc, a magnetic disc, a magnetic tape or one of semiconductor memories including a RAM and the like. In this embodiment, the recording medium 195 is removably installable in the drive 190. Note however that the recording medium 195 may be built in the recorder/player 100.

The transport stream processing means (TS processor) 300 extracts transport packets corresponding to a predetermined program (content) from, for example, a transport stream having a plurality of TV programs (contents) multiplexed therein, stores information on a time of appearance of the extracted transport stream appears along with each packet into the recording medium 195, and controls the time of appearance of a transport stream for reading from the recording means 195. The TS processor 300 will further be described later with FIG. 6 and subsequent drawings.

For a transport stream, there is set an ATS (arrival time stamp) as a time of appearance of each of transport packets in the transport stream. The time of appearance is determined during encoding not to cause a failure of a T-STD (transport stream system target decoder) being a virtual decoder defined in the MPEG-2 Systems, and during read of a transport stream, the time of appearance is controlled with an ATS appended to each of transport packets. The TS processor 300 performs the above kinds of control. For example, in recording of transport packets to the recording medium, the transport packets are recorded as source packets arranged with no space between successive packets and the time of appearance of each packet kept unchanged, which enables to control the output timing of each transport packet during read from the recording medium. The TS processor 300 appends ATS (arrival time stamp) indicative of a time at which each of transport packets has been received, when data is recorded to the recording medium 195 such as a DVD.

In the recorder/player 100 according to the present invention, a content including a transport stream in which the ATS is appended to each of transport packets is encrypted by the cryptography unit 150, and the content thus encrypted is stored into the recording medium 195. Further, the cryptography unit 150 decrypts an encrypted content stored in the recording medium 195. These encryption and decryption will further be described later.

Note that in FIG. 1, the cryptography unit 150 and TS processor 130 are shown as separate blocks for the convenience of the illustration and explanation but these functions may be incorporated in a one-chip LSI or performed by a combination of software or hardware pieces.

Figure 2:
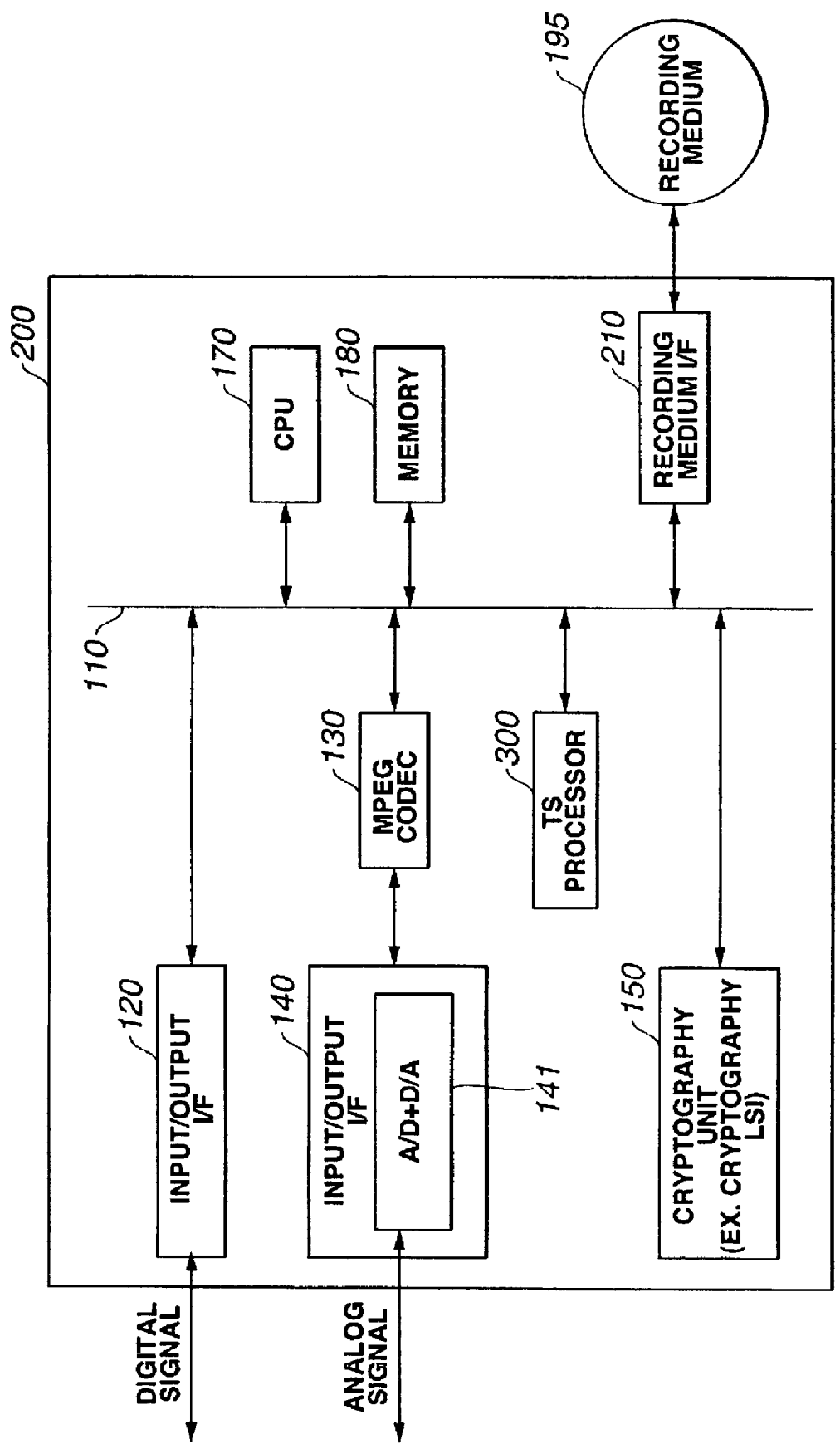
FIG. 2 is a block diagram showing an example construction (2) of the information recorder/player according to the present invention.

In addition to the construction shown in FIG. 1, the recorder/player according to the present invention may be constructed as in FIG. 2. The recorder/player shown in FIG. 2 is generally indicated with a reference 200. In the recorder/player 200, a recording medium 195 is removably installable in a recording medium interface (I/F) 210 as a drive unit. Write and read of data to and from the recording medium 195 are also possible when it is used in another recorder/player.

[Data Recording and Playback]

Figure 3A:
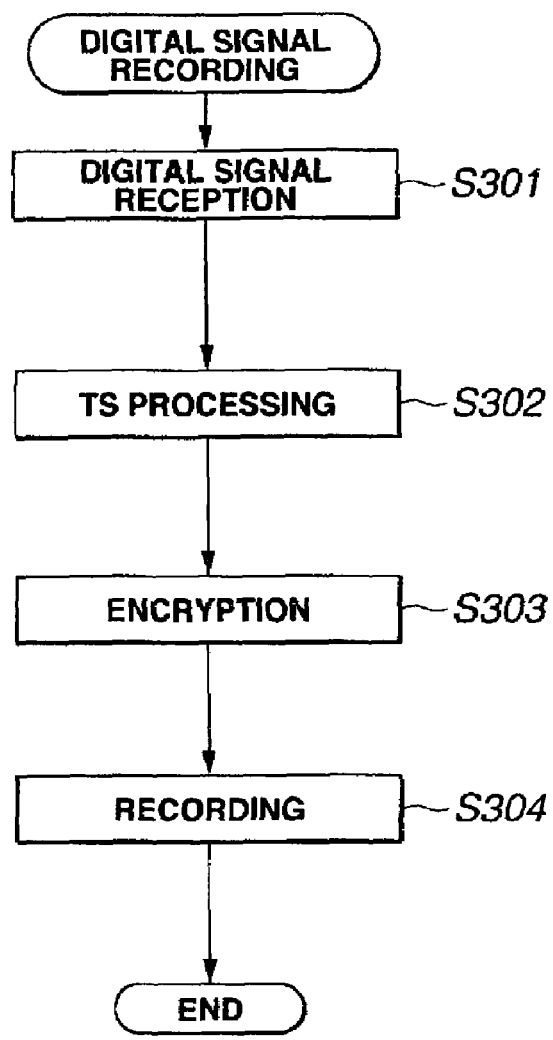
FIGS. 3A and 3B show flows of operations effected in a data recording process in the information recorder/player according to the present invention.

Referring now to FIGS. 3 and 4, there are shown flows of operations effected in data write to the recording medium in the recorder/player shown in FIG. 1 or 2, and in data read from the recording medium. For recording digital signals as a content from outside to the recording medium 195, operations are effected as shown in the flow chart in FIG. 3A. Namely, when digital signals as a content (digital content) is supplied to the input/output I/F 120 via an IEEE (Institute of Electrical and Electronics Engineers) 1394 serial bus or the like, the input/output I/F 120 will receive the digital content and outputs the data to the TS processor 300 via the bus 110 in step S301.

In step S302, the TS processor 300 generates block data in which an ATS is appended to each of transport packets in a transport stream, and outputs the data to the cryptography unit 150 via the bus 110.

In step S303, the cryptography unit 150 encrypts the received digital content, and outputs the encrypted content to the drive 190 or recording medium I/F 210 via the bus 110. In step S304, the encrypted digital content is recorded to the recording medium 195 via the drive 190 or recording medium I/F 210. Here the recorder/player exits the recording procedure. The encryption by the cryptography unit 150 will further be described later.

It should be reminded that as a standard to protect the digital content transmitted between the devices via the IEEE 1394 serial bus, "5CDTCP (Five Company Digital Transmission Content Protection)" (will be referred to as "DTCP" hereunder) was established by the five companies including the Sony Corporation being the Applicant of the present invention. It prescribes that in case a digital content not being any "copy-free" one is transmitted between devices, the transmitter and receiver sides should mutually authenticate, before the transmission, that copy control information can correctly be handled, then the digital content be encrypted at the transmitting side for transmission thereof and the encrypted digital contact (encrypted content) be decrypted at the receiving side.

In data transmission and reception under this DTCP standard, the input/output I/F 210 at the data receiver side receives the encrypted content via the IEEE 1394 serial bus, decrypts the encrypted content in conformity with the DTCP standard, and then outputs the data as a plain or unencrypted content to the cryptography unit 150 (in step S301).

For the DTCP-based encryption of a digital content, a time-varying key is to be generated. The encrypted digital content including the encryption key having been used for the encryption is transmitted over the IEEE 1394 serial bus to the receiver side, and the receiver side decrypts the encrypted digital content with the key included in the content.

More precisely, the DTCP standard prescribes that an initial value of the key and a flag indicative of a time of changing the key for encryption of digital content are included in the encrypted content. At the receiving side, the initial value of the key included in the encrypted content is changed with the timing indicated by the flag, included in the encrypted content, to generate a key having been used for the encryption, and the encrypted content is decrypted with the key thus generated. Namely, it may be considered that the encrypted content includes a key used to decrypt it, and so this consideration shall also be true in the following description. According to the DTCP standard, an informational version is available from for example a Web page identified by URL (uniform resource locator) of http://www.dtcp.com.

Figure 3B:
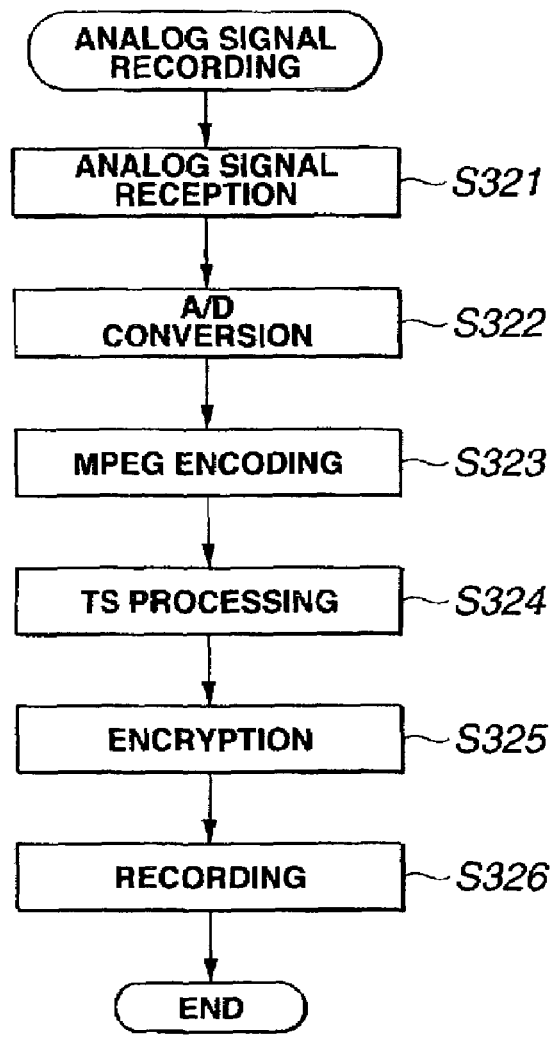

Next, writing of external analog signals as a content to the recording medium 195 will be described with reference to the flow chart in FIG. 3B. When the input/output I/F 140 receives analog signals as a content (analog content) in step S321, it goes to step S322 where the A/D converter and D/A converter combination 141 will make A/D conversion of the analog content to provide digital signals as a content (digital content).

The digital content is supplied to the MPEG codec 130 which will make MPEG encoding of the digital content, namely, encoding of the digital content by MPEG compression, in step S323 and supply the encoded content to the cryptography unit 150 via the bus 110.

In subsequent steps S324, S325 and S326, similar operations to those in S302 and S303 in FIG. 3A are effected. That is, the TS processor 300 appends ATS to each of transport packets, the cryptography unit 150 encrypts the content, and the encrypted content thus obtained is recorded to the recording medium 195. Here the recorder/player exists the recording procedure.

Next, a flow of operations effected for playing back the content from the recording medium 195 and outputting it as a digital or analog content to outside will be described with reference to the flow chart in FIG. 4. This is done as in the flow chart in FIG. 4A. First in step S401, an encrypted content is read from the recording medium 195 by the drive 190 or recording medium I/F 210, and outputted to the cryptography unit 150 via the bus 110.

In step S402, the cryptography unit 150 decrypts the encrypted content supplied from the drive 190 or recording medium I/F 210, and outputs the decrypted data to the TS processor 300 via the bus 110.

In step S403, the TS processor 300 determines the timing of output based on the ATS appended to each of the transport packets included in the transport stream to make a control corresponding to the ATS, and supplies the data to the input/output I/F 120 via the bus 110. Note that the processing operations of the TS processor 300 and decryption of the digital content in the cryptography unit 150 will further be described later.

Note that when the digital content is outputted via the IEEE 1394 serial bus, the input/output I/F 120 makes a mutual authentication with a counterpart device as previously mentioned in conformity with the DTCP standard in step S404, and then encrypts the digital content for transmission.

Figure 4A:
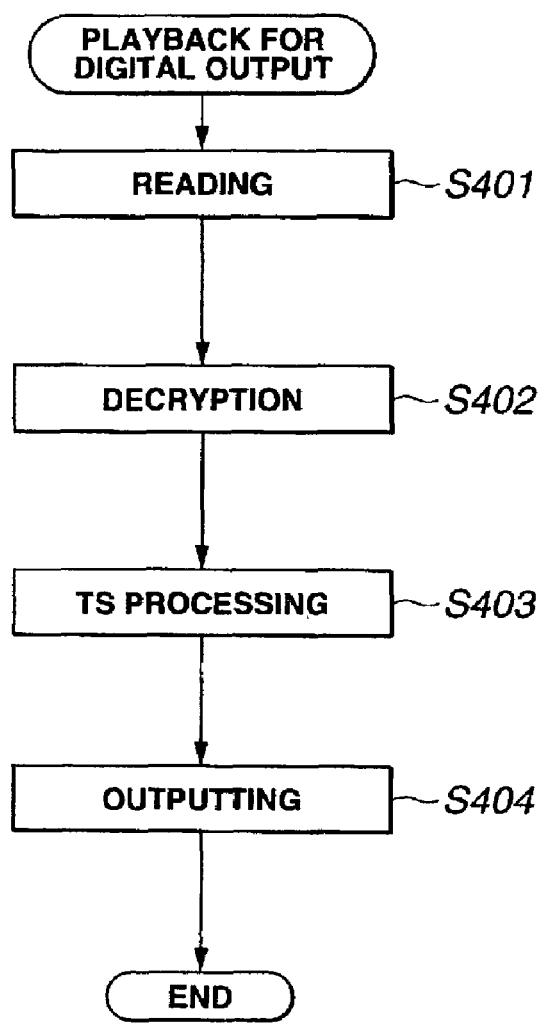
FIGS. 4A and 4B show flows of operations effected in a data playback process in the information recorder/player according to the present invention.
Figure 4B:
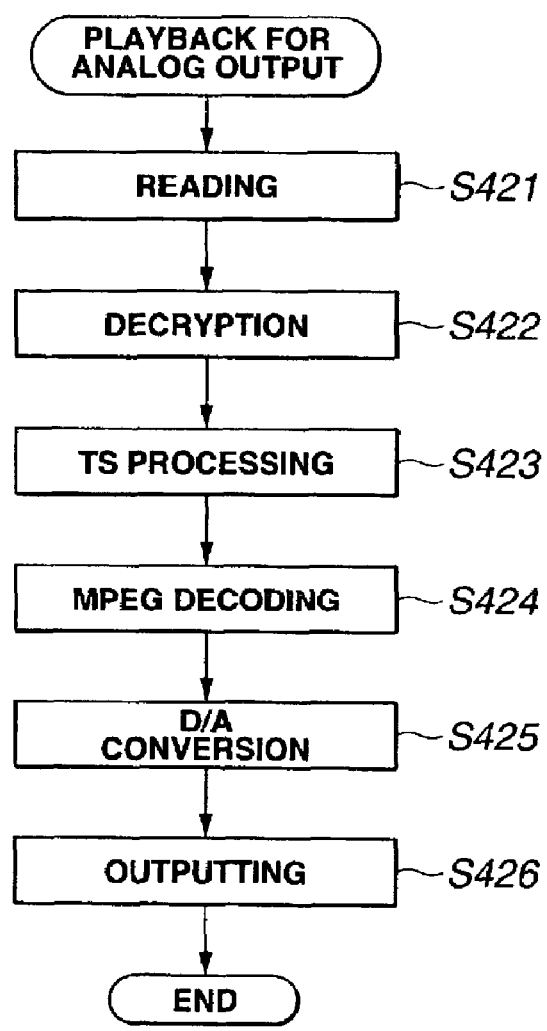

For reading a content from the recording medium 195 and outputting it as an analog content to outside, playback operations are done as in the flow chart shown in FIG. 4B.

Namely, similar operations to those in steps S401, S402 and S403 in FIG. 4A are effected in subsequent steps S421, S422 and S423. Thereby, the decrypted digital content provided from the cryptography unit 150 is supplied to the MPEG codec 130 via the bus 110.

In step S424, the MPEG codec 130 makes MPEG decoding of the digital content, namely, expands the digital data, and supplies the data to the input/output I/F 140. In step S425, the input/output I/F 140 makes D/A conversion of the digital content having been subjected to the MPEG decoding in the MPEG codec 130 in step S424 by the A/D converter and D/A converter combination 141. Then the input/output I/F 140 goes to step S426 where it will output the analog content to outside. Here the recorder/player exits the playback procedure.

[Data Format]

Next, the format of data written to or read from the recording medium according to the present invention will be described with reference to FIG. 5. The minimum unit in which data is read from or written to the recording medium according to the present invention is called "block". One block has a size of 192*X bytes (e.g., X=32).

According to the present invention, an ATS is appended to each MPEG2-defined TS (transport stream) packet (of 188 bytes) to provide a data of 192 bytes, and a number X of such data are taken as one block. The ATS is a data of 24 to 32 bits indicating an arrival time. ATS stands for "arrival time stamp" as having previously been described. The ATS is a random data corresponding to an arrival time of each packet. One block (sector) of the recording medium records a number X of TS (transport stream) packets each having an ATS appended thereto. According to the present invention, an ATS appended to the first one of TS packets in each of blocks included in a transport stream is used to generate a block key which is used to encrypt the data in the block (sector).

A unique key for each of the blocks is generated by generating an encrypting block key based on the random ATS. The block-unique key thus generated is used to encrypt each block. Also, by generating a block key based on the ATS, it is made unnecessary to provide an area in the recording medium for storage of the encryption key for each block and it becomes possible to effectively use the main data area in the recording medium. Further, during data playback, it is not necessary to access data other than in the main data area, which will assure a more efficient data recording or playback.

Note that a block seed shown in FIG. 5 is additional information including ATS. The block seed may also include copy control information (CCI) in addition to ATS. In this case, ATS and CCI are used to generate a block key.

Note that according to the present invention, the majority of data in a content stored into the recording medium such as a DVD is encrypted. As shown in the bottom of FIG. 5, m bytes (e.g., m=8 or 16 bytes) in the leading portion of a block are recorded as plain or unencrypted data, namely, not encrypted, while the remaining data (m+1 and subsequent) is encrypted because the encrypted data length is limited since the encryption is made in units of 8 bytes. Note that if the encryption may be effected in 1-byte units for example, not in 8-byte units, all the data except for the block seed may be encrypted with four bytes set in the leading portion of the block (m=4).

[Operations by the TS Processor]

The function of ATS will be described in detail hereblow. As having previously been described, the ATS is an arrival time stamp appended to each of transport packets included in an input transport stream to preserve a timing of appearance of the TS packet.

That is, when one or some is extracted from a plurality of TV programs (contents) multiplexed in a transport stream, for example, transport packets included in the extracted transport stream appear at irregular intervals (see FIG. 7A). A timing in which each of the transport packets in a transport stream appears is important for the transport stream, and the timing of appearance is determined during encoding not to cause any failure of T-STD (transport stream system target decoder) being a virtual decoder defined in the MPEG-2 Systems (ISO/IEC 13818-1).

During playback of the transport stream, the timing of appearance is controlled based on the ATS appended to each transport packet. Therefore, when recording the transport packets to the recording medium, the input timing of the transport packet has to be preserved. When recording transport packets to a recording medium such as a DVD, an ATS indicative of the input timing of each transport packet is appended to the transport packet which is to be recorded to the recording medium.

Figure 6:
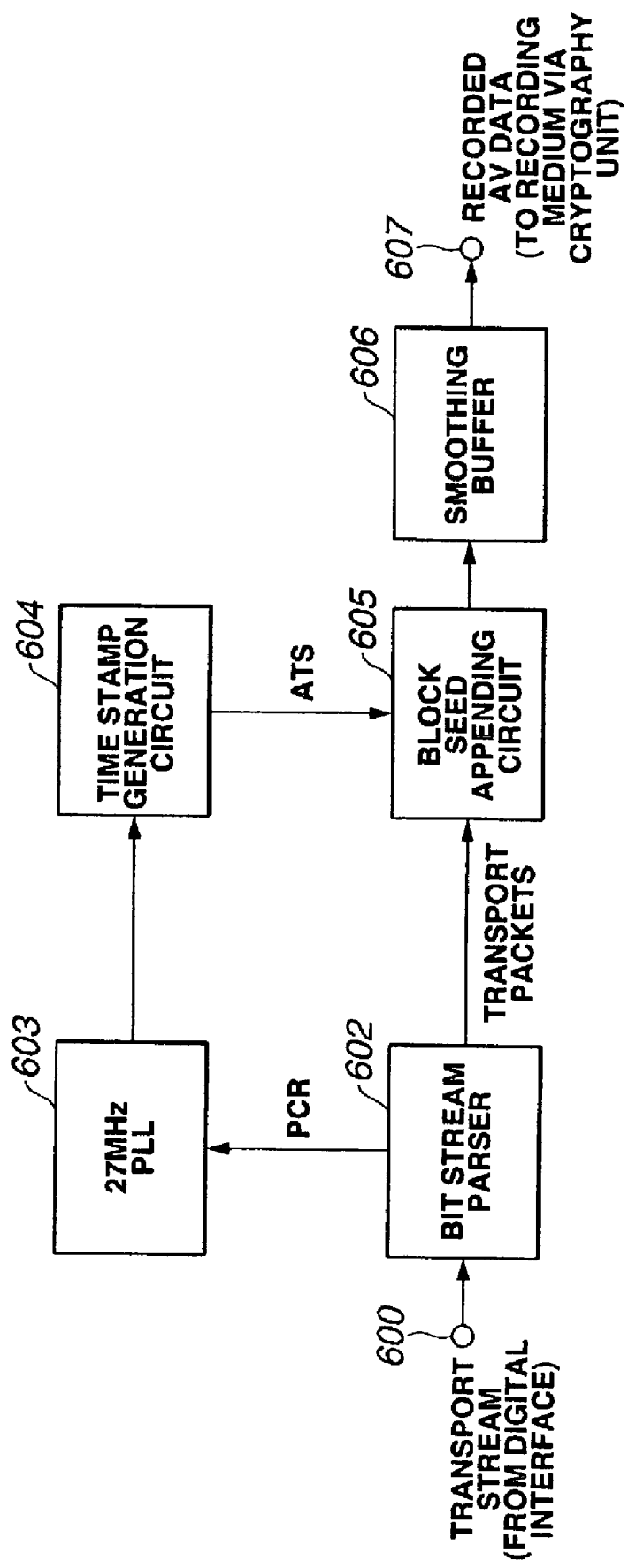
FIG. 6 is a block diagram showing the construction of a transport stream (TS) processing means in the information recorder/player according to the present invention.

FIG. 6 is a block diagram explaining the operations effected in the TS processor 300 when recording a transport stream supplied via a digital interface to a recording medium such as a DVD. As shown, the transport stream is supplied as digital data such as digital broadcast signals from a terminal 600 to the TS processor 300. As shown in FIG. 1 or 2, the transport stream is supplied from the terminal 600 via the input/output I/F 120 or the input/output I/F 140 and MPEG codec 130.

The transport stream is supplied to a bit stream parser 602 which will detect a PCR (program clock reference) packet in the input transport stream. The PCR packet is a packet in which PCR defined in the MPEG-2 Systems is encoded. The PCR packets have been encoded at time intervals of less than 100 msec. The PCR represents a time when a transport packet arrives at the receiving side with an accuracy of 27 MHz.

Then, a 27-MHz PLL 603 locks a 27-MHz clock of the recorder/player to the PCR of the transport stream. A time stamp generation circuit 604 generates a time stamp based on a count of 27-MHz clocks. A block seed appending circuit 605 appends a time stamp, indicative of a time when the first byte of the transport packet is inputted to a smoothing buffer 606, as ATS to the transport packet.

The transport packet having ATS appended thereto is outputted from a terminal 607 through the smoothing buffer 606 to the cryptography unit 150 where it will be encrypted as will further be described, and then recorded to the recording medium 195 via the drive 190 (in FIG. 1) and recording medium I/F 210 (in FIG. 2).

FIG. 7 shows, by way of example, operations effected for recording an input transport stream to the recording medium. FIG. 7A shows input of transport packets included in a certain program (content). The horizontal axis in the FIG. 7A is a time base indicative of a time of the transport stream. In this embodiment, transport packets in the input transport stream appear at irregular times as shown in FIG. 7A.

FIG. 7B shows an output of the block seed appending circuit 605. This block seed appending circuit 605 appends a block seed including an ATS indicating an arrival time of each of transport packets in a transport stream to the transport packet, and outputs a source packet. FIG. 7C shows source packets recorded in the recording medium. The source packets are recorded to the recording medium with no space between successive packets as shown in FIG. 7C. Owing to this arrangement of the source packets with no space between them, the recording area in the recording medium can be used effectively.

Figure 8:
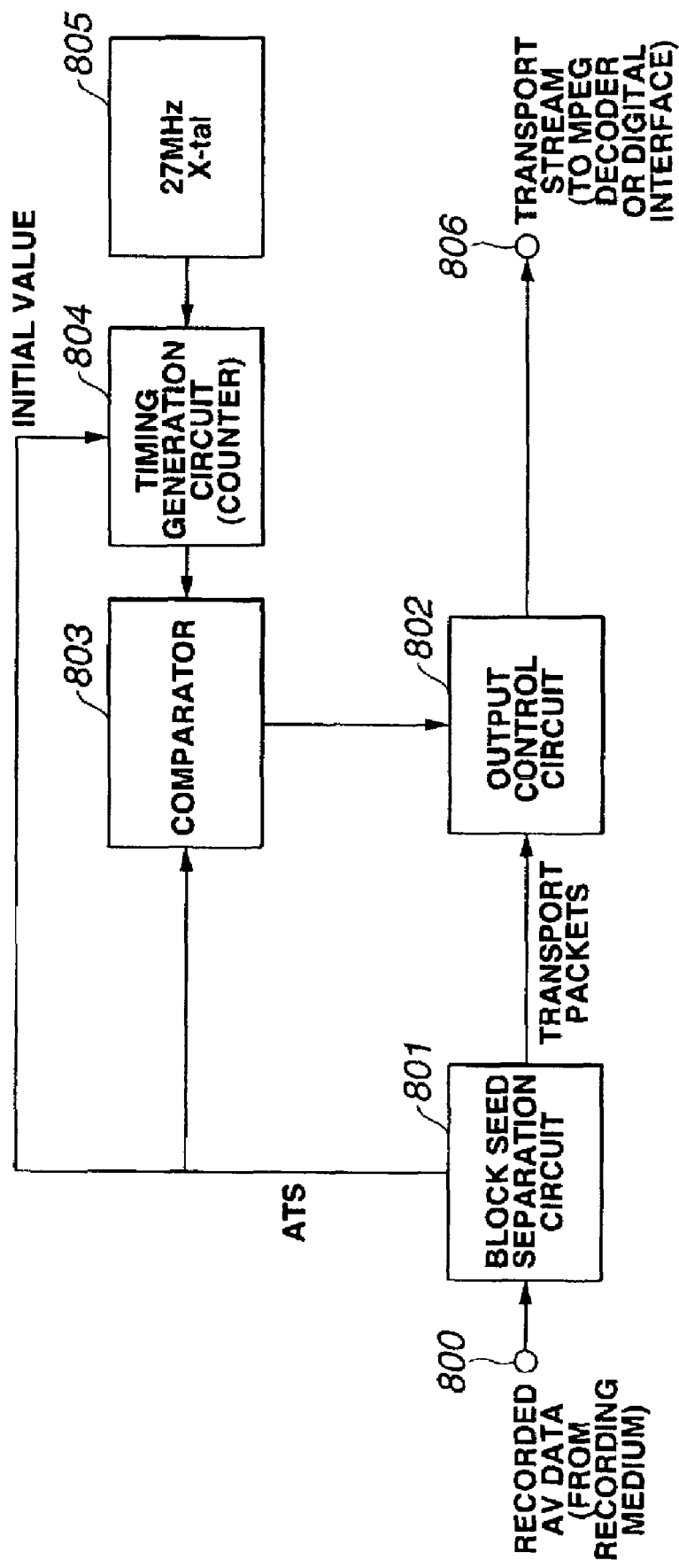
FIG. 8 is a block diagram showing the construction of a transport stream (TS) processing means in the information recorder/player according to the present invention.

FIG. 8 is a block diagram of the TS processor 300, showing a data processing procedure to read a transport stream from the recording medium 195. A transport packet having been decrypted in a cryptography unit which will further be described later and having an ATS appended thereto is supplied from a terminal 800 to a block seed separation circuit 801 where the ATS and transport packet will be separated from each other. There is provided a timing generation circuit 804 to compute a time based on a clock count of a 27-MHz clock 805 of the player.

Note that the first ATS is set as an initial value in the timing generation circuit 804. There is also provided a comparator 803 to compare the ATS with a current time supplied from the timing generation circuit 804. Also an output control circuit 802 is provided to output the transport packet to the MPEG codec 130 or digital input/output I/F 120 when a timing generated by the timing generation circuit 804 becomes equal to the ATS.

Figure 9:
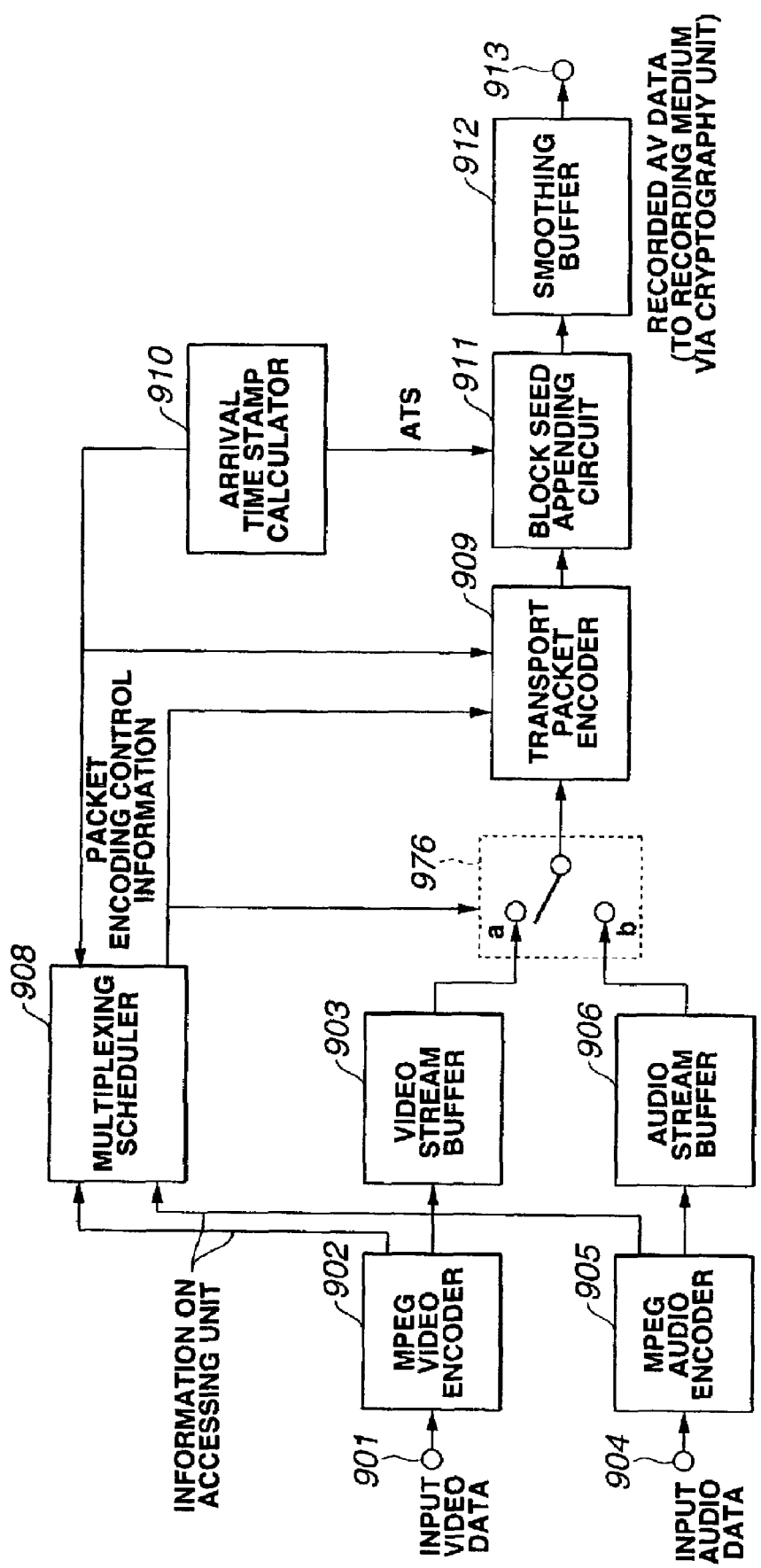
FIG. 9 is a block diagram showing the construction of a transport stream (TS) processing means in the information recorder/player according to the present invention.

FIG. 9 shows MPEG encoding of input AV signals in the MPEG codec 130 of the recorder/player 100 and encoding of the transport stream in the TS processor 300. Namely, FIG. 9 is a block diagram of operations effected in both the MPEG codec 130 in FIG. 1 or FIG. 2 and TS processor 300. Video signals are supplied from a terminal 901 to an MPEG video encoder 902.

The MPEG video encoder 902 encodes the input video signals to an MPEG video stream, and outputs the data to a video stream buffer 903. Also, the MPEG video encoder 902 outputs access unit information on the MPEG video stream to a multiplexing scheduler 908. The "access unit" of video stream includes a type, encoded bit amount and decode time stamp of each picture. The "picture type" is information on an I/P/B picture, and the "decode time stamp" is information defined in the MPEG-2 Systems.

There are supplied audio signals from an terminal 904 to an MPEG audio encoder 905. The MPEG audio encoder 905 encodes the input audio signals to an MPEG audio stream and outputs the data to a buffer 906. The MPEG audio encoder 905 outputs also access unit information on the MPEG audio stream to the multiplexing scheduler 908. The "access unit" of the audio stream is an audio frame, and the access unit information includes an encoded bit amount and decode time stamp of each audio frame.

The multiplexing scheduler 908 is supplied with both the video and audio access information, and controls encoding of the video and audio streams based on the access unit information. The multiplexing scheduler 908 incorporates a clock to generate a reference time with an accuracy of 27 MHz, and thus determines packet encoding control information for the transport packet according to the T-STD which is a virtual decoder model defined in the MPEG-2. The packet encoding control information includes the type and length of a stream to be packetized.

In case the packet encoding control information is video packets, a switch 976 is placed at a side a thereof to read, from the video stream buffer 903, video data of a payload data length designated by the packet encoding control information and supply the data to a transport packet encoder 909.

In case the packet encoding control information is audio packets, the switch 976 is placed at a side b thereof to read, from the audio stream buffer 906, audio data of a designated payload data length, and supply the data to the transport packet encoder 909.

In case the packet encoding control information is PCR packets, the transport packet encoder 909 acquires PCR supplied from the multiplexing scheduler 908 and outputs PCR packets to outside. To indicate that the packet encoding control information will not encode packets, nothing is supplied to the transport packet encoder 909.

For an indication that the packet encoding control information will not encode packets, the transport packet encoder 909 outputs no packets. In other case, transport packets are generated based on the packet encoding control information and outputted. Therefore, the transport packet encoder 909 outputs transport packets intermittently. Also there is provided an arrival time stamp calculator 910 to calculate ATS indicative of a time at which the first byte of a transport packet arrives at the receiving side, based on the PCR supplied from the multiplexing scheduler 908.

Since PCR supplied from the multiplexing scheduler 908 indicates a time at which the tenth byte of a transport packet defined in the MPEG-2 arrives at the receiving side, so the value of an ATS is a time at which a byte 10 bytes before the time indicated by PCR.

A block seed appending circuit 911 appends an ATS to each of packets outputted from the transport packet encoder 909. An ATS-appended transport packet outputted from the block seed appending circuit 911 is supplied to the cryptography unit 150 through a smoothing buffer 912 where it will be encrypted as will further be described later and then stored into the recording medium 195.

For storage into the recording medium 195, the ATS-appended transport packets are arranged with no space between them as shown in FIG. 7C and then stored into the recording medium 195 before subjected to encryption in the cryptography unit 150. Even if the transport packets are arranged with no space between them, reference to the ATS appended to each of the packets makes it possible to control the time of supplying the transport packets to the receiving side.

Note that the size of ATS is not fixed to 32 bits but it may be within a range of 24 to 31 bits. The longer the bit length of ATS, the longer the operating cycle of the ATS time counter is. For instance, in case the ATS time counter is a binary counter whose ATS counting accuracy is 27 MHz, an ATS of 24 bits in length will appear again in about 0.6 sec. This time interval is long enough for an ordinary transport stream because the packet interval of a transport stream is defined to be 0.1 sec at maximum by the MPEG-2. However, the bit length of ATS may be more than 24 bits for a sufficient allowance.

By varying the bit length of ATS as in the above, the block seed being an additional data to a block data can be configured in some types. Example configurations of the block seed are shown in FIG. 10. Example 1 shown in FIG. 10 is a block seed using an ATS of 32 bits in length. Example 2 in FIG. 10 is a block seed using an ATS of 30 bits and copy control information (CCI) of 2 bits. The copy control information indicates a controlled state of copying of data having the CCI appended thereto. SCMS (serial copy management system) and CGMS (copy generation management system) are most well-known as copy control information. These copy control information indicate that data having the copy control information appended thereto is allowed to limitlessly be copied (copy-free), the data is allowed to be copied only for one generation (one-generation-copy-allowed) or that the data is prohibited from being copied (copy-prohibited).

An example 3 shown in FIG. 10 is a block seed using ATS of 24 bits, CCI of 2 bits and other information of 6 bits. The other information may be selected from various kinds of information such as information indicating on/off operation of a Macrovision which is a copy control mechanism for analog video data when the block seed data is outputted in an analog form.

[Tree Structure for Key Distribution]

Figure 11:
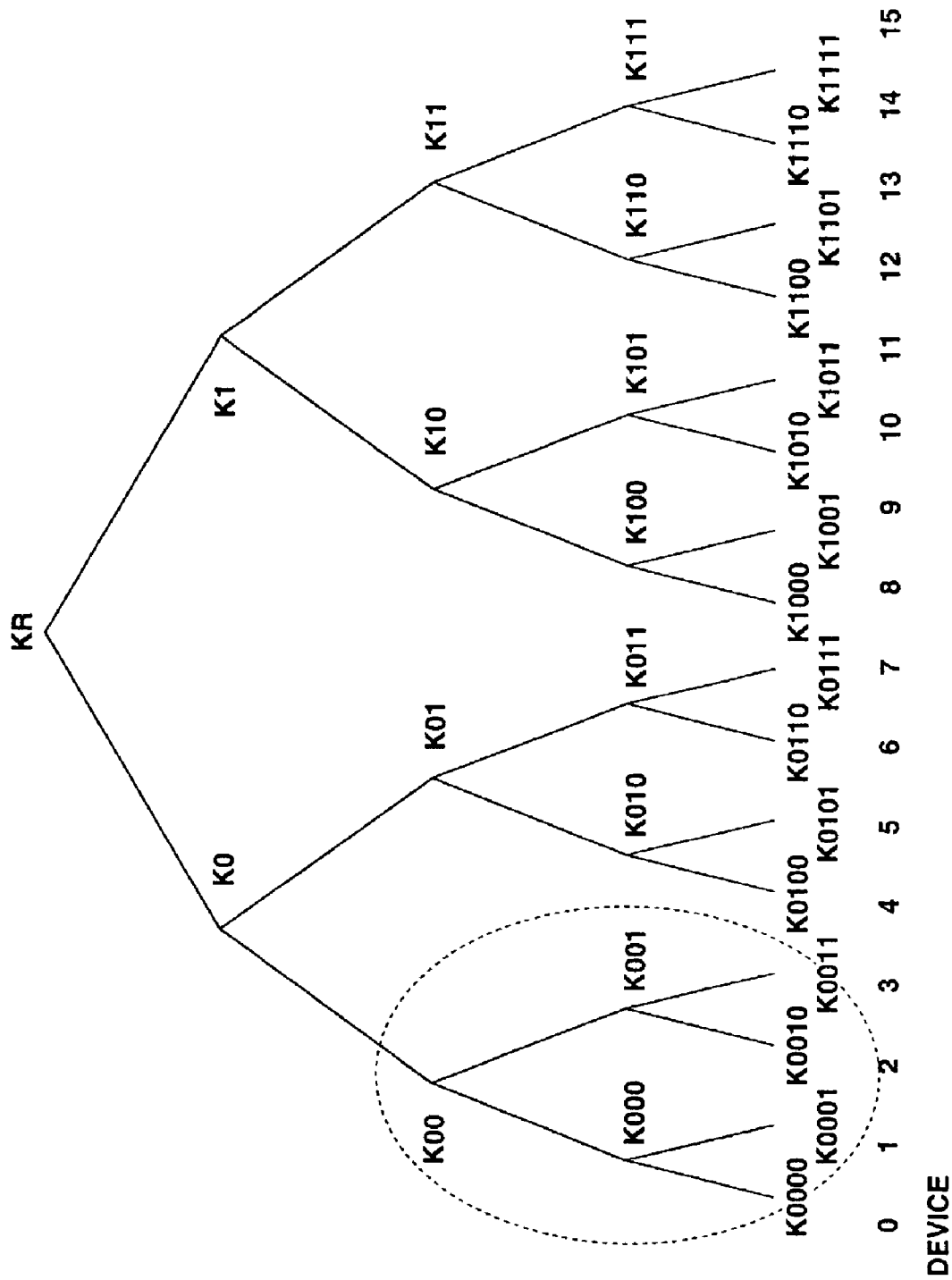
FIG. 11 is a tree-structure diagram explaining the encryption of keys such as a master key, medium key, etc. for the information recorder/player according to the present invention.

The recorder/player shown in FIG. 1 or 2 distributes, to each of the other recorder/players included in the system, a master key necessary for recording data to the recording medium or for playback of data from the recording medium as will be described herebelow. FIG. 11 shows the key distribution in the recorder/player in a tree-structured recording system. The numbers 0 to 15 shown at the bottom in FIG. 11 indicate individual recorder/players. That is, in FIG. 11, each of the leaves of the tree structure corresponds to each of the recorder/players (will be referred to as "device" hereunder wherever appropriate).

During production (or at shipment), there is stored in each of the devices 0 to 15 a node key assigned to a node from its own leaf to a route and a leaf key for each leaf in a predetermined initial tree. "K0000" to "K1111" in the next lowest portion in FIG. 11 are leaf keys assigned to the devices 0 to 15, respectively, and "KR" at the highest node to "K111" at the bottom nodes are node keys.

In the tree structure shown in FIG. 11, for example, the device 0 owns a leaf key K0000 and node keys K000, K00, K0 and KR. The device 5 owns a leaf key K0101 and node keys K010, K01, K0 and KR. The device 15 owns a leaf key K1111 and node keys K111, K11, K1 and KR. Note that the tree shown in FIG. 11 includes only 16 devices 0 to 15 laid in 4 stages and well-balanced in horizontal symmetry but it may include more devices laid therein and be varied in number of stages from one part to another thereof.

The recorder/players (device) included in the tree structure shown in FIG. 11 include various types of recorder/players using a variety of recording media, such as DVD, CD, MD, memory stick (trademark), etc. Further, various application services are coexistent with each other in the tree structure. The key distribution system shown in FIG. 11 is applied while such different devices and applications are coexistent with each other.

In the system in which such devices and applications are coexistent, a portion of the tree, shown as encircled with a dotted line in FIG. 11 and including the devices 0, 1, 2 and 3, is set as a group in which the devices use the same recording medium. For example, each of the devices included in the encircled group will receive an encrypted common content sent from a content provider or a common master key or will output an encrypted content-fee payment data to the provider or a settlement institution. The content provider, settlement institution or an institution for data communications with each of the devices collectively sends data to the encircled portion in FIG. 11, that is, the devices 0, 1, 2 and 3 as one group. More than one such group exist in the tree shown in FIG. 11.

Note that the node key and leaf key may collectively be managed by a certain key management center or by each of groups including the provider, settlement institution, etc. which make a variety of data communications with each group. If these node and leaf keys have been uncovered for example, they are renewed by the key management center, provider, settlement institution, etc.

In the tree structure shown in FIG. 11, the four devices 0, 1, 2 and 3 included in one group own common keys K00, K0 and KR as node keys. Owing to this common use of the node keys, for example a common master key can be served to only the devices 0, 1, 2 and 3. For example, by setting the node key K00 itself owned in common as a master key, it is possible only for the devices 0, 1, 2 and 3 to set a common master key without receiving any new key. Also, by distributing, to the devices 0, 1, 2 and 3 via a network or as stored in a recording medium, a value Enc (K00, Kmaster) obtained by encrypting a new master key Kmaster with the node key K00, only the devices 0, 1, 2 and 3 can analyze the value Enc (K00, Kmaster) with the common node key K00 owned by each of the devices to acquire the master key Kmaster. Note that Enc (Ka, Kb) is a data derived from encryption of Kb with Ka.

If at a time t, it has been revealed that the keys K0011, K001, K00, K0 and KR owned by the device 3 for example were analyzed and uncovered by any attackers (hacker), it becomes necessary to disconnect the device 3 from the system in order to protect data transferred to and from a system (group including the devices 0, 1, 2 and 3) after that. To this end, it the node keys K001, K00, K0 and KR have to be changed to new keys K(t)001, K(t)00, K(t)0, K(t)R respectively and the new keys have to be passed to the devices 0, 1 and 2. Note that K(t)aaa is a renewed one of a key Kaaa in a generation t.

The distribution of renewed key will be described herebelow. A key will be renewed by supplying a table composed of block data called key renewal block (KRB) as shown in FIG. 12A to each of the devices 0, 1 and 2 via a network or as stored in a recording medium.

As shown in FIG. 12, the renewal key block (KRB) is formed as a block data having a data structure which only a device needing renewal of a node key can renew. The example shown in FIG. 12A is a block data formed in order to distribute a renewed node key of the generation t to the devices 0, 1 and 2 included in the tree structure shown in FIG. 11. As apparent from FIG. 11, the devices 0 and 1 need renewed node keys K(t)00, K(t)0 and K(t)R while the device 2 needs renewed node keys K(t)001, K(t)00, K(t)0 and K(t)R.

As seen from FIG. 12A, the KRB includes a plurality of encryption keys. The bottom encryption key is Enc(K0010, K(t)001). This is a renewed node key K(t)001 encrypted with a leaf key K0010 of the device 2. The device 2 can decrypt this encryption key with its own leaf key to acquire K(t)001. Also, the device 2 can decrypt an encryption key Enc(K(t)001, K(t)00) on the next bottom stage with K(t)001 it has acquired by the decryption, thereby to acquire a renewed node key K(t)001. After that, the device 2 decrypts an encryption key Enc(K(t)00, K(t)0) on the next top stage in FIG. 12A to acquire a renewed node key K(t)0, and decrypts encryption key Enc(K(t)0, K(t)R) on the top stage in FIG. 12A to acquire a renewed encryption K(t)R. On the other hand, for the devices 0 and 1, a node key K000 is not to be renewed but node keys to be renewed are K(t)00, K(t)0 and K(t)R. The devices 0 and 1 decrypt an encryption key Enc(K000, K(t)00) on a third top stage in FIG. 12A to acquire a renewed node key K(t)00. Subsequently, the devices 0 and 1 decrypt an encryption key Enc(K(t)00, K(t)0) on the second top stage in FIG. 12A to acquire a renewed node key K(t)0, and decrypts an encryption key Enc(K(t)0, K(t)R) on the top stage in FIG. 12A to acquire a renewed node key K(t)R. In this way, the devices 0, 1 and 2 can acquire the renewed node keys K(t)00, K(t)0 and K(t)R. Note that "Index" in FIG. 12A shows an absolute address of a node key or leaf key used as a decryption key.

The node keys K0 and KR on the top stage of the tree structure shown in FIG. 11 have not to be renewed. In case only the node key K00 has to be renewed, use of the key renewal block (KRB) in FIG. 12B enables to distribute the renewed node key K(t)00 to the devices 0, 1 and 2.

KRB shown in FIG. 12B is usable for distribution of a new master key for common use in a specific group for example. More particularly, the devices 0, 1, 2 and 3 in the group shown in a dotted-line circle in FIG. 11 uses a certain recording medium and need a new common master key K(t)master. At this time, a node key K(t)00 derived from renewal of the node key K00 common to the devices 0, 1, 2 and 3 is used to distribute data Enc(K(t), K(t)master) derived from encryption of the new common master key K(t)master along with KRB shown in FIG. 12B. With this distribution, data which cannot be decrypted in the devices included in another group, for example, device 4, can be distributed.

That is, the devices 0, 1 and 2 can acquire the master key K(t)master at a time t by decrypting the encrypted data with K(t)00 acquired by processing KRB.

[Master Key Distribution Using KRB]

Figure 13:
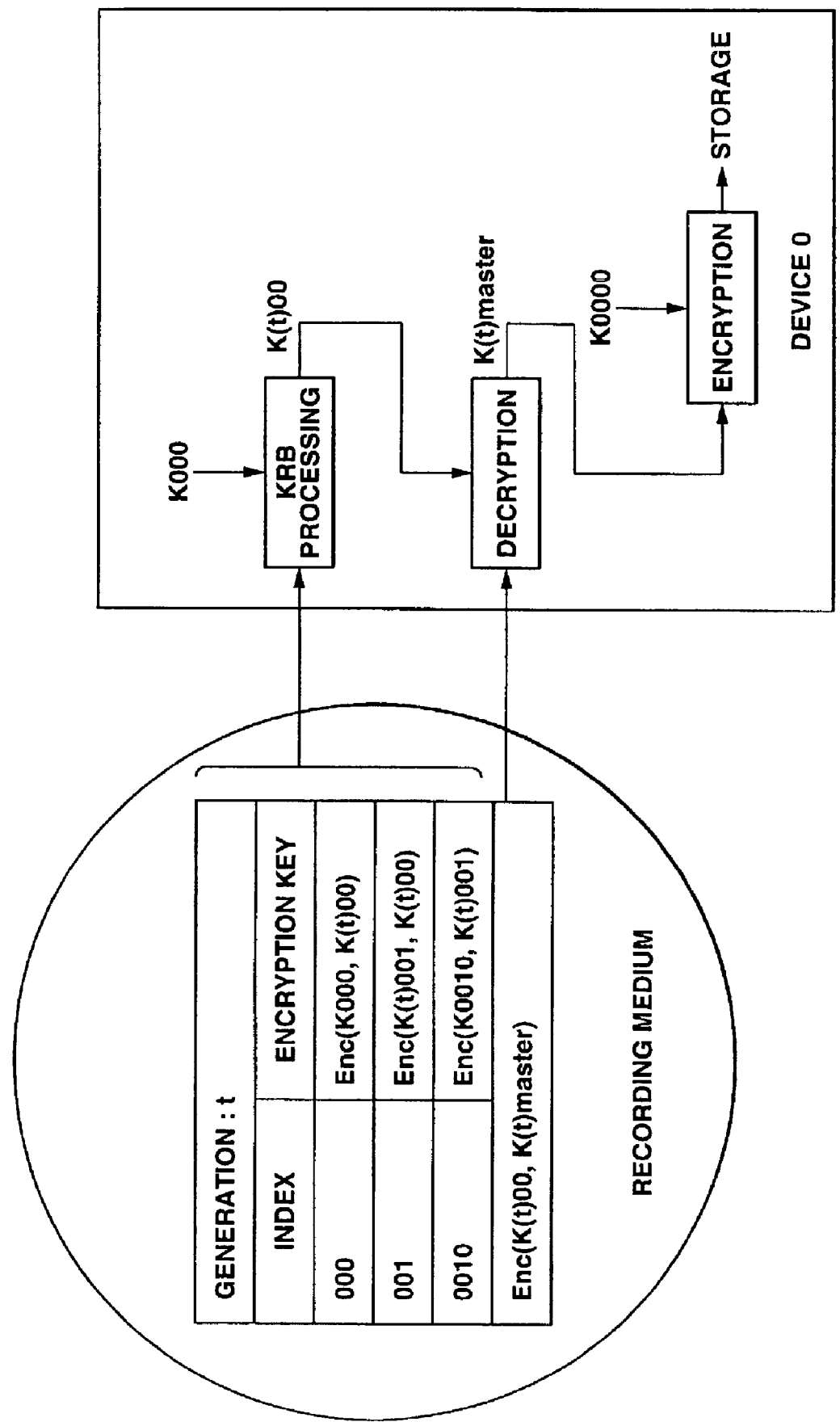
FIG. 13 shows examples of key distribution and decryption, respectively, using the key renewal block (KRB) for the master key in the information recorder/player according to the present invention.

FIG. 13 shows the procedure for acquisition of a master key K(t)master at the time t by the device 0 having acquired a data Enc(K(t)00, K(t)master) derived from encryption of a new common master key K(t)master with K(T)00, and KRB shown in FIG. 12B.

As shown in FIG. 13, the device 0 generates a node key K(t)00 by a similar processing of KRB to the above from KRB at a time t (generation in which KRB is stored) and node K000 prestored in itself. Further, the device 0 decrypts the renewed master key K(t)master with the decrypted renewed node key K(t)00, encrypts it with its own leaf key K0000 for later use, and stores it. Note that in case the device 0 can safely store the renewed master key K(t)master therein, it is not necessary to encrypt it with the leaf key K0000.

Also, the acquisition of the renewed master key will be described with reference to the flow chart shown in FIG. 14. It is assumed here that the recorder/player is granted the latest master key K(c)master at the time of shipment and has it safely stored in its own memory (more precisely, as encrypted with its own leaf key).

When the recoding medium having the renewed master key K(n)master and KRB stored therein is set in the recorder/player, the latter will read, first in step S1401, the generation number $n$ of the master key K(n)master (will be referred to as "pre-recording generation information Generation #n" hereunder) from the recording medium. The recording medium has a generation number $n$ of a master key K(n)master prestored there. Then, the recorder/player reads the encrypted master key C from its own memory. In step S1402, it compares the generation number $c$ of its own encrypted master key and a generation $n$ indicated by the pre-recording generation information Generation#n to judge which is younger or older, the generations $c$ or $n$.

If the recorder/player has judged in step S1402 that the generation $n$ indicated by the pre-recording generation information Generation#n is not younger than the generation $c$ of the encrypted master key stored in its own the memory, that is, if the generation $c$ of the encrypted master key C stored in the memory is the same as or older than the generation $n$ indicated by the pre-recording generation information Generation#n, the recorder/player will skip over steps S1403 to 1408 and exit the master key renewing procedure. In this case, since it is not necessary to renew the master key K(c)master (encrypted master key C) stored in the memory of the recorder/player, so the renewal will not be done.

On the other hand, if the recorder/player has judged in step S1402 that the generation $n$ indicated by the pre-recording generation information Generation#n is younger than the generation $c$ of the encrypted master key C stored in the memory, that is, if the generation $c$ of the encrypted master key C stored in the memory is older than the generation $n$ indicated by the pre-recording generation information Generation#n, the recorder/player will go to step S1403 where it will read a key renewal block (KRB) from the recording medium.

In step S1404, the recorder/player calculates a key K(t)00 for the node 00 at a time (time $t$ in FIG. 13) indicated by the pre-recording generation information Generation#n from KRB having been read in step S1403, leaf key (K0000 for the device 0 in FIG. 11) and node keys (K000 and K00, . . . for the device 0 in FIG. 11), stored in the memory thereof.

In step S1405, it is examined whether K(t)00 has been acquired in step S1404. If not, it means that the recorder/player has been revoked from the group in the tree-structure at that time, and so the recorder/player will skip over steps S1406 to 1408 and exits the master key renewing procedure.

If K(t)00 has been acquired, the recorder/player goes to step S1406 where it will read a value derived from encryption of the master key at the time $t$ with Enc(K(t)00, K(t)master), namely, K(t)00, read from the recording medium. In step S1407, the recorder/player calculates K(t) master by decrypting the encrypted value with K(t)00.

In step S1408, the recorder/player encrypts K(t)master with its own leaf key (K0000 for the device 0 in FIG. 11) and stores it into the memory. Here, the recorder/player will exit the master key renewing procedure.

It should be reminded here that the master key is used in the ascending order from the time (generation) 0 but each of devices in the system should desirably be able to acquire, by calculation, an older-generation master key from a new-generation master key. That is, the recorder/player should own a one-way function $f$ and generate a master key in an examined generation by applying its own master key to the one-way function $f$ for a number of times corresponding to a difference between the generation of the master key and that of a necessary master key.

More particularly, for example, in case the generation of a master key MK stored in the recorder/player is i+1 while the generation of a masker key MK necessary for playback of a data (having been used when recording the data) is i−1, the recorder/player generates a master key K(i−1)master by using the one-way function $f$ twice and calculating f(f(K(i+1)master)).

Also, in case the generation of the master key stored in the recorder/player is i+1 while that of the necessary master key is i−2, the recorder/player generates a master key K(i−2)master by using the one-way function $f$ twice and calculating f(f(f(K(i+1)master))).

The one-way function may be a hash function for example. More particularly, the hash function may be MD5 (message digest 5), SHA-1 (secure hash algorithm-1) or the like for example. A key issuing institution should determine master keys K(0)master, K(1)master, K(2)master, . . . , K(n)master with which a generation older than the current generation can be pre-generated using these one-way functions. That is, first of all, a master key K(N)master of the N generation should be set and the one-way function be applied once to the master key K(N)master, thereby generating master keys K(N-1)master, K(N-2)master, . . . , K(1) master, K(0)master of the preceding generations one after another. The master keys should be used one after another starting with the master key K(0)master of the earliest generation. Note that it is assumed that the one-way function used to generation a master key of a generation older than the current generation is set in all the recorder/players.

Also, as the one-way function, there may be used the public key cryptography for example. In this case, the key issuing institute should own a private key which is based on the public key cryptography, and issue a public key corresponding to the private key to each of all the players. The key issuing institute should set a 0-th generation master key K(0)master and use master keys starting with K(0)master. That is, when the key issuing institute needs a master key K(i)master younger than the first-generation master key, it converts a master key K(i−1)master one generation before K(i)master with the private key to generate the master key K(i)master for use. Thus, the key issuing institute has not to pre-generate an N-th generation master key using the one-way function. With this way of key generation, it is theoretically possible to generate a master key over all generations. Note that if the recorder/player has a master key for a generation, it will be able to convert the master key with the public key to acquire master keys for generations older than that generation.

Figure 15:
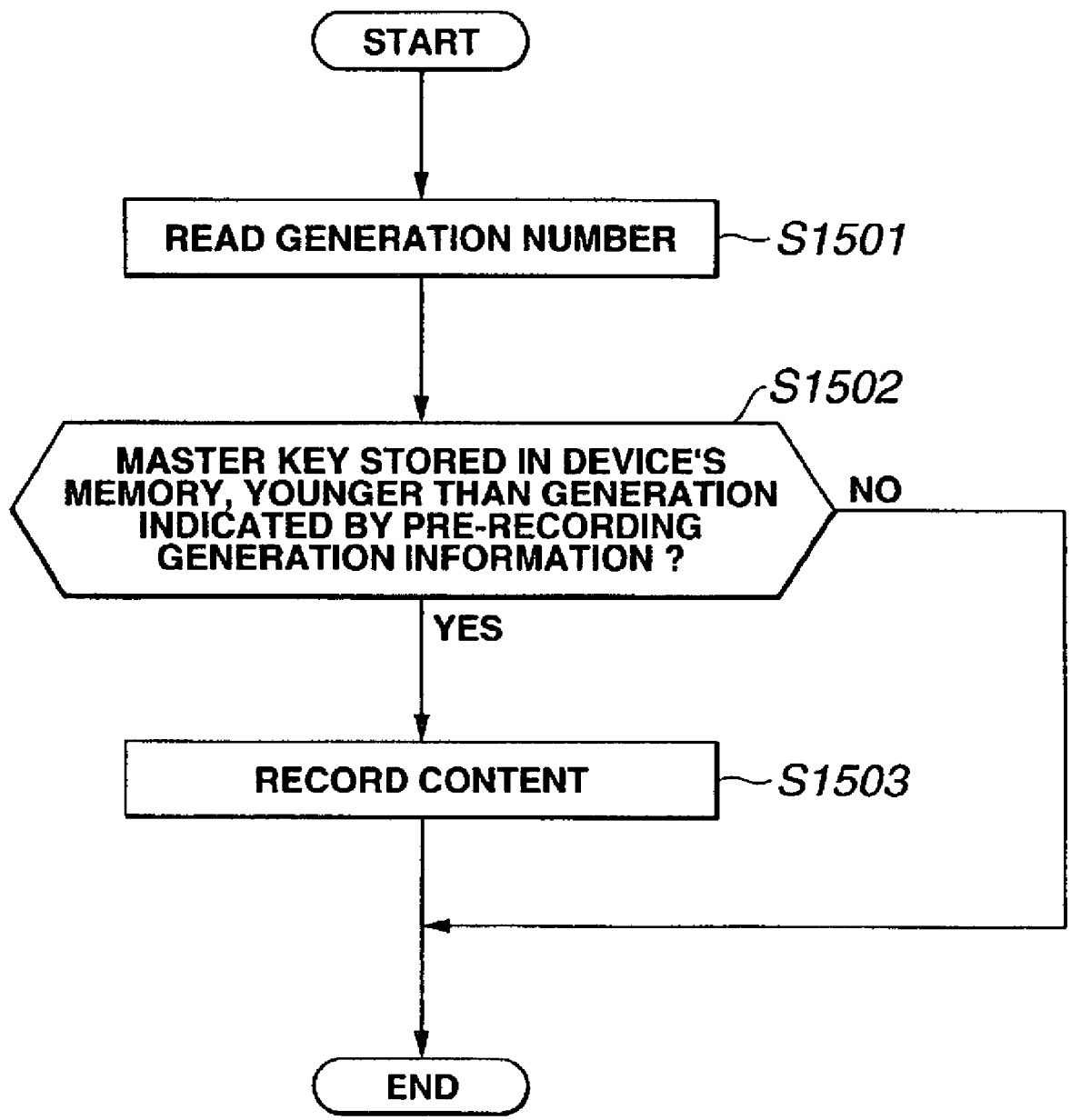
FIG. 15 shows a flow of operations made in the comparison of master key generation in the content recording in the information recorder/player according to the present invention.

Next, operations of the recorder/player for recording a content into its own recording medium will be described with reference to the flow chart shown in FIG. 15. The content data will be encrypted with a master key of a generation and distributed from the content provider to each of the recorder/players via a network or a recording medium.

First in step S1501, the recorder/player reads the pre-recording generation information Generation#n from the recording medium. It acquires the generation $c$ of rill the encrypted master key C stored in its own memory. In step S1502, the recorder/player makes a comparison between the generation c of the encrypted master key C and the generation n indicated by the pre-recording generation information G#n to judge which is younger or older, the generations $c$ or $n$.

If the result of judgment in step S1502 is that the generation $c$ of the encrypted master key C stored in the memory is not younger than the generation $n$ indicated by the pre-recording generation information Generation#n, namely, if the generation $c$ of the encrypted master key C stored in the memory is older than the generation $n$ indicated by the pre-recording generation information Generation #n, the recorder/player skips over step S1503, that is, exits the procedure without recording the content data.

On the other hand, if the result of judgment in step S1502 is that the generation c of the encrypted master key C stored in the memory of the recorder/player is younger than the generation $n$ indicated by the pre-recording generation information Generation#n, namely, if the generation $c$ of the encrypted master key C stored in the memory is the same as, or younger than, the generation $n$ indicated by the pre-recording generation information Generation#n, the recorder/player goes to step S1503 where it will record the content data.

[Encryption and Recording of Content Data by Generation-managed Master Key]

In the following, there will be described a procedure for encrypting a content data with the generation-managed master key and storing the data into the recording medium in the recorder/player. Note that a block key is generated based on data including a generation-managed master key, and a content data formed from a transport stream as having previously been described is encrypted with the block key and stored into a recording medium as will be described herebelow. Also, there will be taken two examples: one is such that data recorded to a recording medium by a recorder/player can be played back in another player, and the other is such that such data cannot be played back in another player.

The description will be made with reference to the block diagrams in FIGS. 16 and 17 and the flow chart shown in FIG. 18. It is assumed here that the recording medium is an optical disc for example. In this embodiment, to prevent bit-by-bit copying of data in the recording medium, an disc ID as identification information unique to the recording medium is made to act on a key for encryption of the data.

Figure 16:
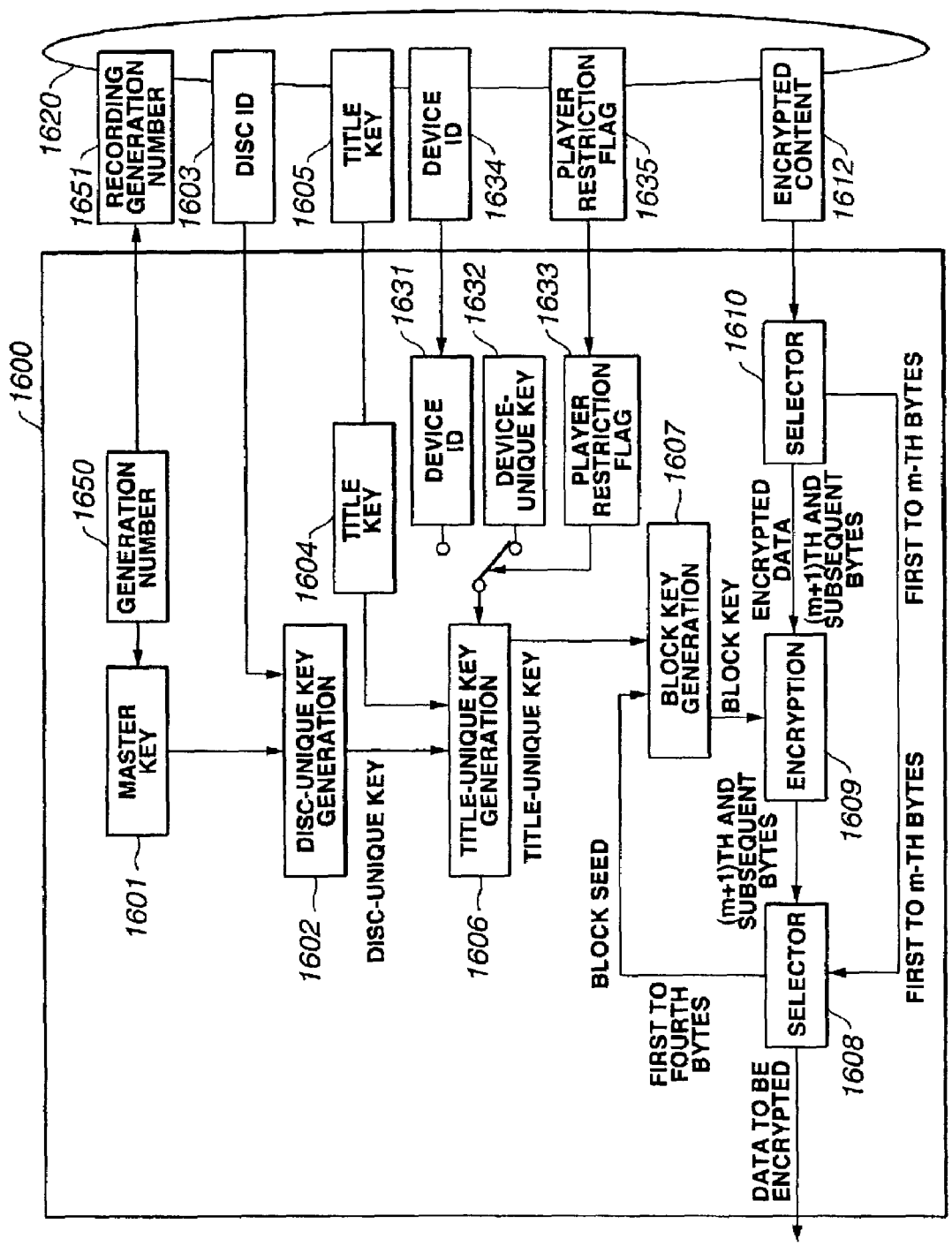
FIG. 16 is a block diagram (1) explaining the encryption for data recording in the information recorder/player according to the present invention in a system in which a player restriction can be set.
Figure 17:
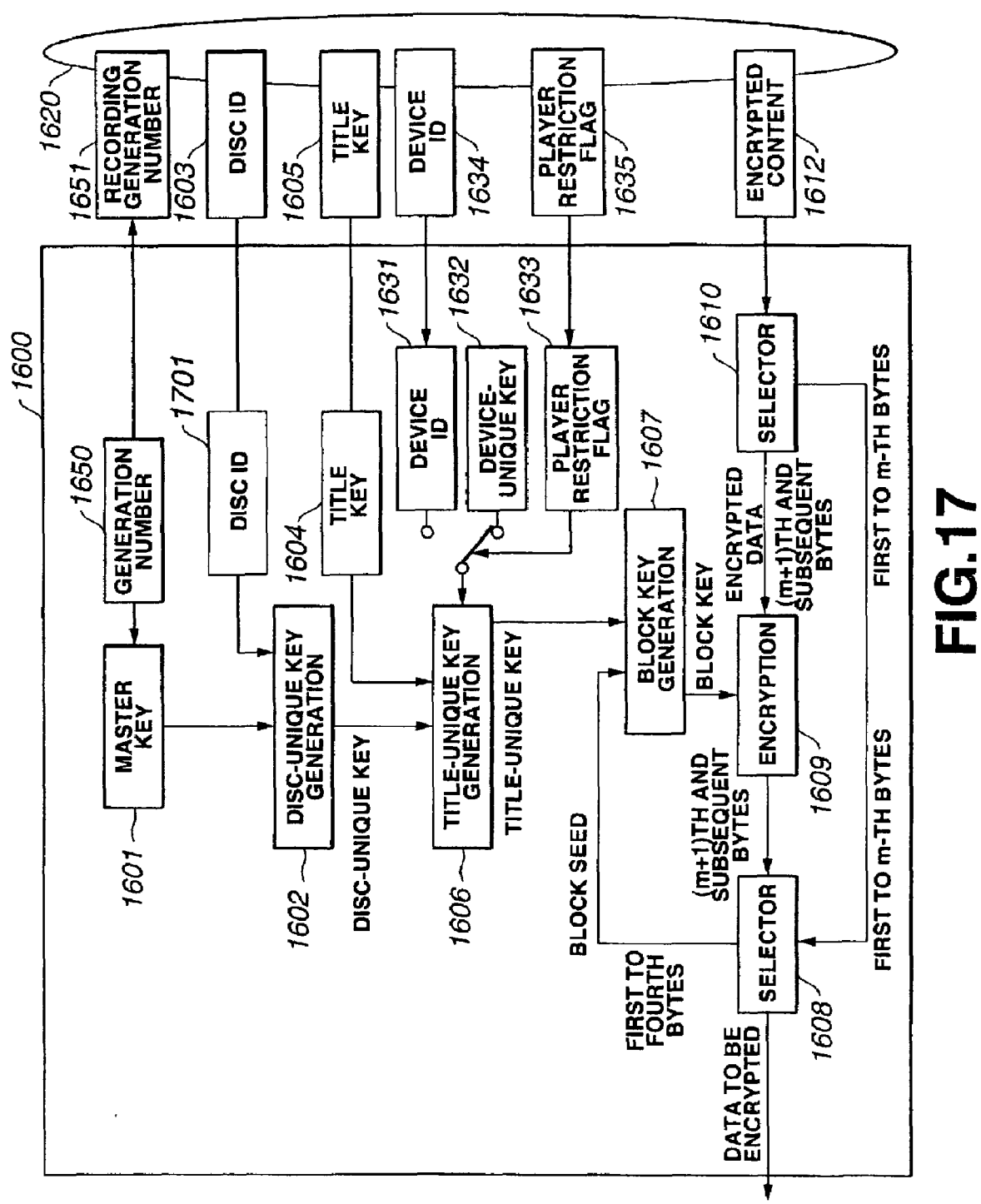
FIG. 17 is a block diagram (2) explaining the encryption for data recording in the information recorder/player according to the present invention in a system in which the player restriction can be set.

First referring to the block diagrams in FIGS. 16 and 17, data encryption by the cryptography unit 150 will be outlined.

A recorder/player 1600 reads a master key 1601, a device ID 1631 as a device identifier and a device-unique key 1632 stored in its own memory 180 (see FIGS. 1 and 2). The master key 1601 is a private key stored in a licensed recorder/player. It is generation-managed as having been described in the foregoing and has a generation number correlated thereto. The master key is a key common to a plurality of recorder/players, namely, the devices enclosed in the dotted-line circle shown in FIG. 11 for example. The device ID is an identifier for the recorder/player 1600. It is an identifier such as serial number, prestored in the recorder/player. The device ID may be opened. The device-unique key is a private ley unique to the recorder/player 1600. It is preset to vary from one recorder/player to another. These keys are stored in the memory of the recorder/player 1600.

The recorder/player 1600 checks whether the disc ID 1603 as identification information is already been recorded to the recording medium 1620 which is an optical disc for example. If the disc ID 1603 is found recorded there, the recorder/player 1600 reads it (as in FIG. 16). If not, the recorder/player 1600 will generate a disc ID 1701 at random or by a predetermined random number generation method for example by the cryptography unit 150, and record it to the optical disc (as in FIG. 17). There should be available only one disc ID (1603) for one disc. So, it may be stored in a lead-in area or the like of the disc.

Next, the recorder/player 1600 generates a disc-unique key 1602 from the master key and disc ID (as indicated at a reference 1602). As shown in FIG. 19, the disc-unique key is generated by either of the following two methods. Namely, in one the methods (Example 1), the master key and disc ID are placed in a hash function using a block encryption function and a result of the placement is used. In the other method (Example 2), data derived from a bit-by-bit combination of the master key and disc ID is placed in a hash function SHA-1 defined in FIPS 180-1 to provide an output of 160 bits and only data of a necessary length from the 160-bit output is used.

Then, a title key unique to each record is generated (as indicated at a reference 1604) at random or by a predetermined random-number generation in the cryptography unit 150 (see FIGS. 1 and 2), and recorded to the disc 1620.

Further, a flag indicating which the title (data) is a data playable only in a recorder/player having recorded (player restriction is set) or a data also playable in any other recorder/player (player restriction is not set), namely, a player restriction flag, is set (as indicated at a reference 1633) and recorded to a disc 1620 (as indicated at a reference 1635). Further, the recorder/player 1600 takes out the device ID as device identification information (as indicated at a reference 1631) and records it to the disc 1620 (as indicated at a reference 1634).

Moreover, the recorder/player 1600 acquires the generation number of the master key it uses, namely, the generation number (recording generation number Generation#n) of the master key stored in its own memory (as indicated at a reference 1650) and stores it as a recording generation number 1651 into the recording medium (disc) 1620.

The disc has provided therein a data management file having stored therein information on what title is formed from data and where the data is from, and which can store a title key 1605, player restriction flag 1635, device ID 1634 and a master-key generation number (recording generation number G#n) 1651.

Note that the recording medium 1620 has a pre-recording generation number prestored therein and only a content having been encrypted with a master key of a generation younger than, or same as, that the pre-generation number and stored in the recording medium 1620 can be played back. This system will further be described in the description of data playback which will be made later.

Next, a title-unique key is generated from either a combination of the disc-unique key, title key and device ID or a combination of the disc-unique key, title key and device-unique key.

Namely, in case the player restriction is not set, the title-unique key is generated from the disc-unique key, title key and device ID. On the other hand, in case the player restriction is set, the title-unique key is generated from the disc-unique key, title key an device-unique key.

Figure 21:
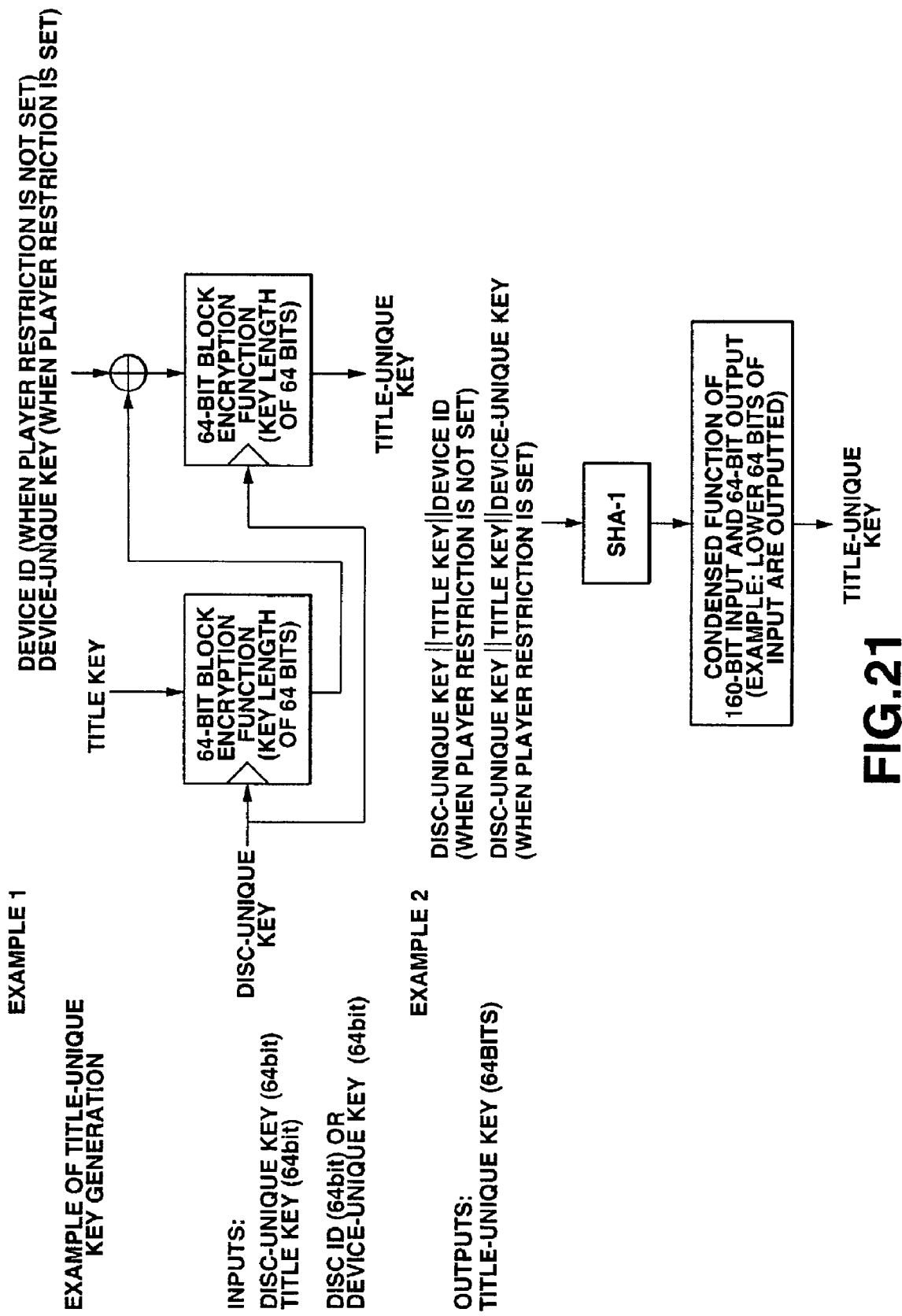
FIG. 21 shows an example of title-unique key generation for data recording in the information recorder/player according to the present invention in a system in which the player restriction can be set.

More particularly, the title-unique key is generated is generated as in either Example 1 or Example 2 shown in FIG. 21. In Example 1, a title key, disc-unique key and a device ID (when the player restriction is not set) or a device-unique key (when the player restriction is set) are placed in a hash function based on a block encryption function, and a result of the placement is used as a title-unique key. In Example 2, data generated by bit-by-bit combination of a master key, disc ID and a device ID (when the player restriction is not set) or a device-unique key (when the player restriction is set) is placed in a hash function SHA-1 defined in FIPS 180-1, and only a necessary data length of an output of 160 bits resulted from the placement is used as a title-unique key.

In the above, a disc-unique key is generated from a master key and disc ID, and then a title-unique key is generated from the disc-unique key, title key and device ID or from the title key and device-unique key. Note however that the title-unique key may be generated directly from the master key, disc ID, title key and device ID or device-unique key without using the disc-unique key or a key equivalent to the title-unique key may be generated from the master key, disc ID and a device ID (when the player restriction is not set) or a device-unique key (when the player restriction is set) without using the title key.

It should be reminded that in case one of the transmission formats defined in the above 5CDTCP standard for example is used, data is transmitted as MPEG-2 TS packets in some cases. For example, when a set top box (STB) having received a satellite broadcast transmits the broadcast to a recorder without using the 5CDTCP transmission format, the STB should preferably transmit, also on the IEEE 1394 serial data bus, the MPEG-2 TS packets transmitted on the satellite broadcasting transmission path since data conversion is not required.

The recorder/player 1600 receives to-be-recorded content data in the form of TS packets, and the aforementioned TS processor 300 appends, to each TS packet, an ATS being a time at which the TS packet has been received. Note that as in the above, a block seed appended to block data may be composed of an ATS, copy control information and other information in combination.

A number X (e.g., X=32) of TS packets each having an ATS appended thereto are arranged side by side to form one block of block data (shown in the upper portion of FIG. 5). As shown in the lower portions of FIGS. 16 and 17, the first to fourth bytes in the leading portion of the block data supplied for encryption are separated (in a selector 1608) to output a block seed including an ATS of 32 bits. A block key being an encryption key for data in the block is generated (as indicated at a reference 1607) from the block seed and the previously generated title-unique key.

FIG. 22 shows an example of the block key generation. FIG. 22 shows two examples of generation of a 64-bit block key from a 32-bit block seed and 64-bit title-unique ley.

In Example 1 shown in the upper half of FIG. 22, there is used an encryption function whose key length is 64 bits and input and output are of 64 bits, respectively. A title-unique key is taken as a key to this encryption function, a combination of a block seed and 32-bit constant is placed in the encryption function, and a result of the placement is taken as a block key.

Example 2 uses a hash function SHA-1 defined in FIPS 180-1. A combination of a title-unique key and block seed is placed in the hash function SHA-1, and an output of 160 bits is reduced to 64 bits by using for example only low-order 64 bits. The 64 bits are used as a block key.

In the above, there have been described the examples of the block key generation in which the disk-unique key, title-unique key and block key are generated. However, the block key may be generated from a masker key, disc ID, title key, block seed for each block and a device ID (when the player restriction is not set) or a device-unique key (when the player restriction is set) without generating the disc-unique key and title-unique key.

The block key, thus generated, is used to encrypt the block data. As shown in the lower portions of FIGS. 16 and 17, the first to m-th bytes (m=8 for example) in the leading portion of the block data including a block seed are separated (in the selector 1608) not to be encrypted, and the (m+1)th to the last bytes are encrypted (as indicated at a reference 1609). Note that the $m$ bytes not to be encrypted include the first to fourth bytes as a block seed. The (m+1)th and subsequent bytes of the block data, selected in the selector 1608, are encrypted (as indicated at a reference 1609) according to an encryption algorithm preset in the cryptography unit 150. The encryption algorithm may be DES (Data Encryption Standard) defined in FIPS 46-2 for example.

When the block length (input/output data size) in the encryption algorithm used is 8 bytes as in DES, the entire block data including the (m+1)th and subsequent bytes with no fraction can be encrypted by taking X as 32 and $m$ as a multiple of 8 for example.

Namely, in case a number X of TS packets are stored in one block, input/output data size of the encryption algorithm is L bytes and $n$ is an arbitrary natural number, determining X, $m$ and L so that 192*X=m+n*L makes it unnecessary to process any fraction.

The encrypted (m+1)th and subsequent bytes of the block data are combined with the unencrypted first to m-th bytes of the block data by a selector 1610, and stored as an encrypted content 1612 into the recording medium 1620.

With the above operations, the content will be encrypted block by block with a block key generated from a block seed including a generation-managed master key and ATS, and stored into the recording medium.

As in the above, since a content data is encrypted with a generation-managed master key and stored in a recording medium, so the data can be decrypted, or the recording medium can be played in any other recorder/player, only when the generation of the other recorder/player is at least the same as that of the recorder/player having recorded the content data to the recording medium or younger than the generation of the master key used when recording the content data.

When the player restriction is not set, a block key is generated based on a device ID. On the other hand, when the player restriction is set, the block key is generated based on a device-unique key. When the player restriction is set, these encrypted data can be played back only in the very recorder/player that has recorded the data.

More particularly, when the player restriction is not set, a block key being a key for use to encrypt block data is generated from data including a device ID and the device ID is stored into the recording medium. Therefore, a player going to play back a content in the recording medium can acquire the device ID from the recording medium set therein and thus generate a similar block key. Thus the block data can be decrypted. However, in case the player restriction is set, a block key being a key for use to encrypt block data is generated from data including a device-unique key. Since this device-unique key is a private key which varies from one device to another, so it cannot be acquired by the other device. In case block data is encrypted for storage into a recording medium, data write is not made to a recording medium having the device-unique key stored therein. Therefore, since the same device-unique key cannot be acquired even with a recording medium having encrypted block data stored therein, set in the other player, so any decryption key for decryption of the block data cannot be generated and thus the block data cannot be decrypted for playback. Note that the playback operations will further be described later.

Next, there will be described with reference to FIG. 18 a flow of operations effected in appending ATS in the TS processor 300 and a flow of operations effected in encryption by the cryptography unit 150, when recording data. In step S1801 in FIG. 18, the recorder/player reads a master key, device ID which identifies the recorder/player and a device-unique key stored in its own memory 180.

In step S1802, the recorder/player checks whether the disc ID as identification information has already been recorded in the recording medium. If it is found so recorded, the recorder/player reads the disc ID in step S1803. If not, the recorder/player generates a disc ID at random or by a predetermined method, and records it in the disc in step S1804. Next in step S1805, the recorder/player generates a disc-unique key from the master key and disc ID. A disc-unique key is generated by the use of the function SHA-1 defined in FIPS 180-1 or the hash function based on a block encryption function, for example, as in the above.

The recorder/player goes to step S1806 where it will extract a title key unique to each record, player restriction flag, device ID as identification information for the device and the generation number of the master key, and record them to the disc. Next in step S1807, the recorder/player generates a title-unique key from the disc-unique key, title key and a device ID (when the player restriction is not set) or a device-unique key (when the player restriction is set).

Figure 20:
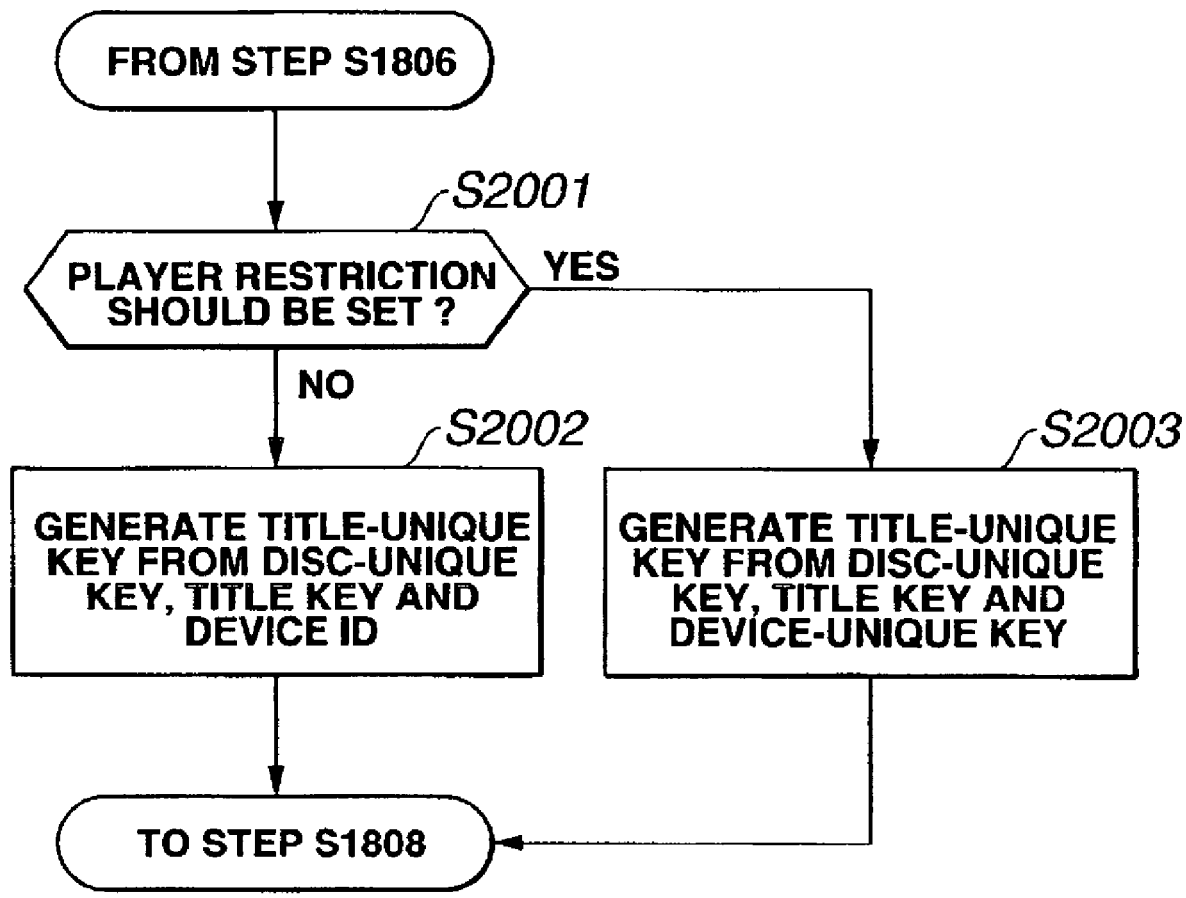
FIG. 20 shows a flow of operations effected in generation of title-unique key in the information recorder/player according to the present invention in a system in which the player restriction can be set.

FIG. 20 shows the flow of operations effected in generation of a title-unique key in detail. In step S2001, the cryptography unit 150 judges if the player restriction should be set, based on instructive data entered by the user of the recorder/player or use-limiting information appended to content.

If the judgment made in step S2001 is "NO", namely, if the player restriction is not set, the recorder/player goes to step S2002 where it will generate a title-unique key from a disc-unique key, title key and device ID.

If the judgment made in step S2001 is "YES", namely, if the player restriction is set, the recorder/player goes to step S2003 where it will generate a title-unique key from a disc-unique key, title key and device-unique key, by the use of the hash function SHA-1 or the hash function based on a block encryption function.

In step S1808, the recorder/player receives to-be-encrypted data of a to-be-recorded content data in the form of TS packets. In step S1809, the TS processor 300 will append, to each of the TS packets, ATS being information indicative of a time at which the packet has been received. Alternatively, the TS processor 300 will append, to each TS packet, a combination of copy control information CCI, ATS and other information. Next in step S1810, the recorder/player receives TS packets each having ATS appended thereto one after another, and judges whether a number X (e.g., X=32) of the TS packets forming one block have been received or identification data indicating the last packet has been received. When either of the above conditions is fulfilled, the recorder/player goes to step S1811 where it will arrange the number X of TS packets or TS packets down to the last one side by side to form one block of data.

Next in step S1812, the cryptography unit 150 generates a block key being a key for use to encrypt the data in the above block from 32 bits (block seed including ATS) in the leading portion of the block data and the title-unique key having been generated in step S1807.

In step S1813, the block data formed in step S1811 is encrypted with the block key. As having previously been described, the (m+1)th to the last bytes in the block data are subjected to the encryption. The encryption algorithm is DES (Data Encryption Standard) defined in FIPS 46-2 for example.

In step S1814, the encrypted block data is recorded to a recording medium. In step S1815, it is judged whether or not all the data have been recorded to the recording medium. When all the data have been recorded, the recorder/player exits the recording procedure. If not, the recorder/player goes back to step S1808 where it will process the remaining data.

[Decryption are Playback of Content Data with Generation-managed Master Key]

Next, there will be described with reference to the block diagram in FIG. 23 and flow charts in FIGS. 24 to 26 the operations effected for decryption, for playback, of encrypted content recorded in a recording medium as having been described in the foregoing.

A flow of operations effected in decryption and playback will be described with reference to the block diagram in FIG. 23 and flow chart in FIG. 24. In step S2401 in FIG. 24, the recorder/player 2300 reads a disc ID 2302 and pre-recording generation number from a disc 2320, and a master key 2301, device ID 2331 as a device identifier and device-unique key 2332 from its own memory. As apparent from the description of the recording having been made in the foregoing, the disc ID is a disc-unique identifier previously recorded in the disc or a one generated in the recorder/player and recorded to the disc.

The pre-recording generation number 2360 is generation information unique to the disc as a recording medium, prestored in the disc. The pre-recording generation number is compared with the generation number of the master key with which the data has been recorded, namely, a recording generation number 2350, for judgment of whether the data can be played back. The master key 2301 is a private key stored in a licensed recorder/player and of which the generation is managed. The device ID is an identifier unique to the recorder/player, and the device-unique key is a private key unique to the recorder/player.

Next in step S2402, the recorder/player 2300 reads a title key for data to be read from the disc, and also a device ID for a recorder/player having recorded the data, a player restriction flag set correspondingly to the data and a generation number (Generation #) of a master key used when recording the data, that is, the recording generation number 2350. Then in step S2403, the recorder/player judges whether the data to be read can be played back. The flows of operations for this judgment is shown in detail in FIG. 25.

Figure 25:
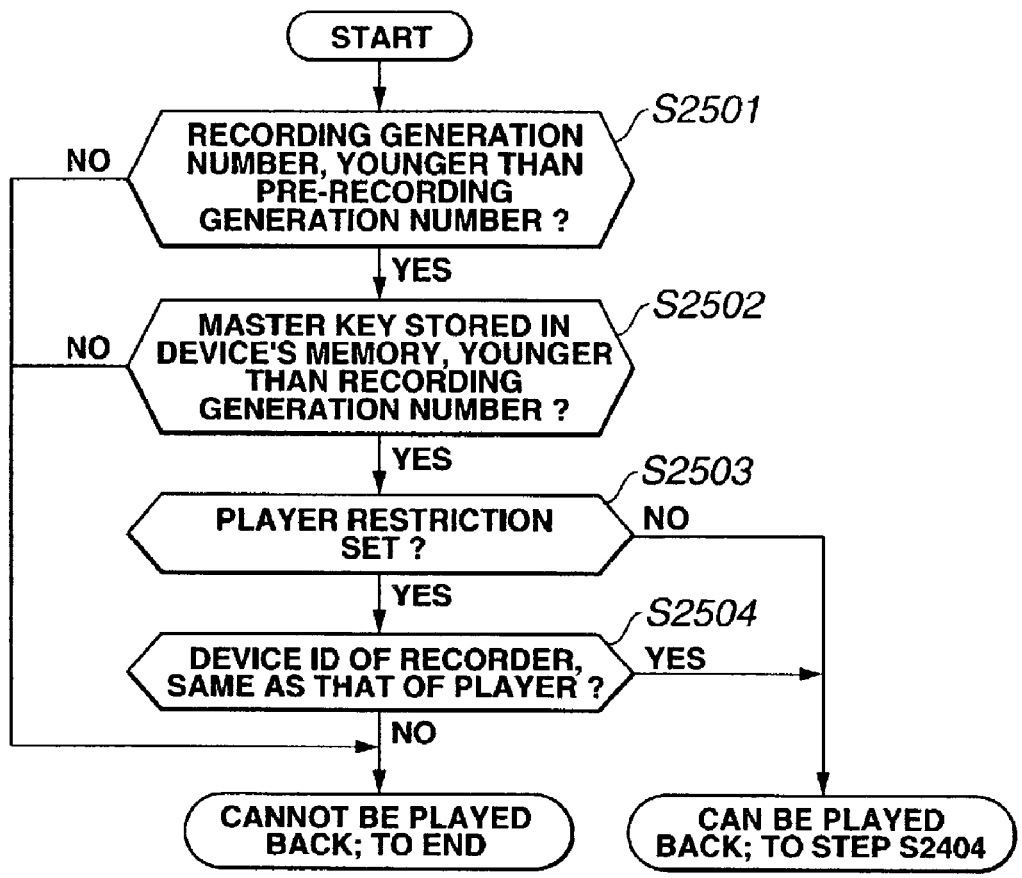
FIG. 25 is a flow chart showing in detail a judgment, in data playback, of whether or not data can be played back in the information recorder/player according to the present invention in a system in which the player restriction can be set.
Figure 26:
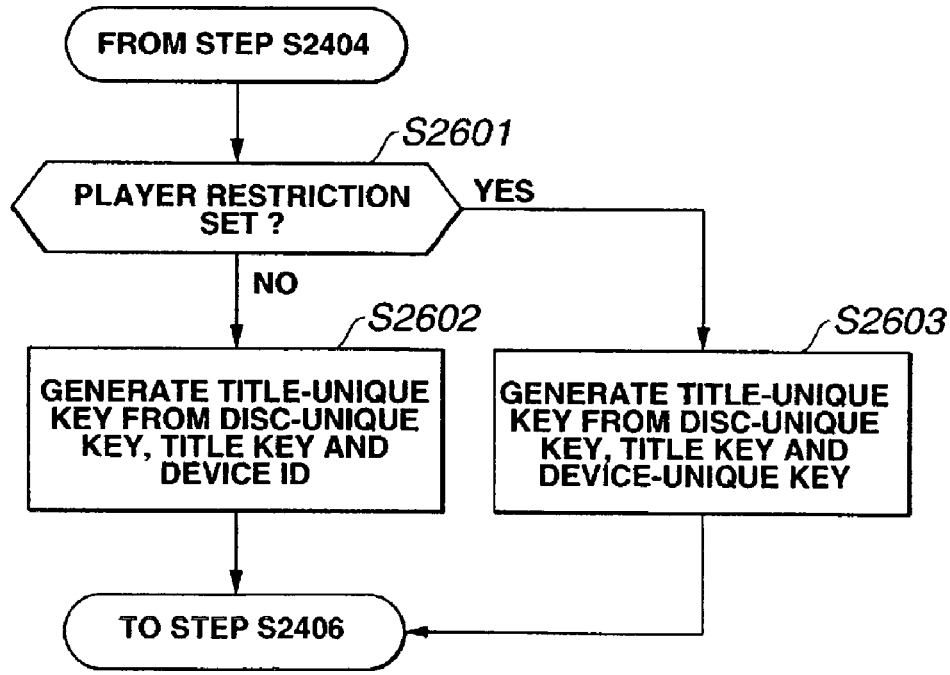
FIG. 26 shows a flow of operations effected in generation of title-unique key for data playback in the information recorder/player according to the present invention in a system in which the player restriction can be set.

In step S2501 in FIG. 25, the recorder/player judges which is younger or older, the pre-recording generation read in step S2401 or the recording generation number read in step S2402. In case the result of judgment is that the generation indicated by the recording generation number is not younger than that indicated by the pre-recording generation number, that is, if the generation indicated by the data recording generation information is older than that indicated by the pre-recording generation information, the recorder/player judges that the data cannot be played back, and will skip over steps S2404 to S2409 and exit the procedure without playing back the data. Therefore, in case the content recorded in the recording medium has been encrypted with a master key whose generation is older than that indicated by the pre-recording generation information, the playback of the data is not allowed and no playback is done.

That is to say, the above procedure is to judge that the data has been encrypted and recorded to the recording medium with an old-generation master key by a recorder which has not been granted any latest-generation master key because its illegality had been uncovered, and prohibit playing of any recording medium to which data has been recorded by such an illegal recorder. Thus, it is possible to eliminate use of an illegal recorder.

On the other hand, if the result of judgment in step S2501 is that the generation indicated by the recording generation number is younger than that indicated by the pre-recording generation number, namely, in case the generation indicated by the recording generation number is the same as, or younger than, that indicated by the pre-recording generation number and therefore the content recorded in the recording medium has been encrypted with a master key of which the generation is younger than that indicated by the pre-recording generation number, the recorder/player will go to step S2502 where it will acquire the generation information on an encrypted master key C stored in its own memory, and make a comparison between the generation of the encrypted master key and that of the generation indicated by the encryption generation information to judge which one of the generations is younger or older than the other.

If the result of judgment in step S2502 is that the generation of the master key C stored in the memory is not younger than that indicated by the recording generation information, namely, if the generation of the master key C stored in the memory is older than that indicated by the recording generation information, the recorder/player will judge that the content cannot be played back, skip over steps S2404 to S2409 and exit the procedure without playing back the content.

If the result of judgment in step S2502 is that the generation of the master key C stored in the memory is younger than that indicated by the recording generation information, that is, if the generation of the master key C is the same as, or younger than that indicated by the recording generation information, the recorder/player goes to step S2503 where it will check whether data it is going to read is recorded in the player-restricted mode.

In step S2503, the recorder/player judges whether the player restriction information indicated by the read player restriction flag is "Player restriction is set". If the "player restriction" is found set, the recorder/player goes to step S2504 where it will judge whether "Device ID read from the recording medium coincides with a device ID of the player itself". In case the "coincidence" is found, the recorder/player judges that the data in consideration can be played back. Also, if the result of judgment in step S2503 is "Player restriction is not set", the recorder/player will judge that the data can be played back. If the player restriction information indicated by the read player restriction flag is "The player restriction is set" and when "Device ID read from the recording medium does not coincide with a device ID of the player itself", the recorder/player will judge that the data cannot be played back.

If the result of judgment is that the data can be played back, the recorder/player goes to step S2404 where it will generate a disc-unique key from a disc ID and master key (as indicated at a reference 2303) as will be described below. Data generated by bit-by-bit combination of the master key and disc ID is placed in a hash function SHA-1 defined in FIPS 180-1 for example and only necessary data length of a 160-bit output resulted from the placement is used as a disc-unique key. Alternatively, the master key and disc ID are placed in a hash function using a block encryption function, and a result of the placement is used as the disc-unique key. The master key used here is a one read from the recording medium in step S2402 and whose generation is indicated the recording generation number of the data. If the recorder/player has a master key of which the generation is younger than that of the master key, it may generate, by any of the methods discussed just above, a master key of a generation indicated by the recording generation number and further generate a disc-unique key with the master key thus generated.

Next in step S2405, the recorder/player generates a title-unique key as will be described herebelow with reference to FIG. 26. In step S2601, the cryptography unit 150 judges whether the player restriction has been set or not, based on the player restriction flag read form the disc.

The recorder/player reads a device ID 2334 for a recorder/player having recorded the data and a player restriction flag 2335 having been set correspondingly to the data. If the player restriction information indicated by the player restriction flag 2335 thus read is "Player restriction is set" and "Device ID 2334 read from the recording medium coincides with a device ID 2331 of the player itself" or if the player restriction information indicated by the read player restriction flag 2333 is "Player restriction is not set", the data can be played back. If the player restriction information indicated by the player restriction flag 2333 is "Player restriction is set" and "Device ID 2334 read from the recording medium does not coincide with a device ID 2331 of the player itself", the data cannot be played back.

The reason why the data cannot be played back is that a block key for decryption of the data cannot be generated since the data has been encrypted with a block key generated from a device-unique key for a recorder/player having recorded the data and the recorder/players other than the recorder/player having recorded the data have not the same device-unique key.

In case the data can be played back, a title-unique key is generated from a combination of the disc-unique key, title key and device ID or a combination of the disc-unique key, title key and device-unique key.

That is, when the player restriction is not set, the title-unique key is generated from the disc-unique key, title key, device ID and title-unique key. When the player restriction is set, the title-unique key is generated from the disc-unique key, title key and a device-unique key of the player itself. For generation of the title-unique key, the bash function SHA-1 or hash function based on a block encryption function can be used.

Further description will be made with reference to the flow chart shown in FIG. 26. If the result of judgment in step S2601 is "NO", namely, if it is that the player restriction is not set, the recorder/player goes to step S2602 where it will generate a title-unique key from the disc-unique key, title key and device ID.

If the result of judgment in step S2601 is "YES", namely, if it is that the player restriction is set, the recorder/player goes to step S2603 where it will generate a title-unique key from the disc-unique key, title key and device-unique key thereof, using the hash function SHA-1 or the hash function based on the block encryption function.

In the above, the disc-unique key is generated from the master key and disc ID and the title-unique key is generated from a combination of the disc-unique key, title key and device ID or a combination of the title key and device-unique key. However, the title-unique key may be generated directly from the master key, disc ID, title key and device ID or device-unique key without using any disc-unique key or a key equivalent to the title-unique key may be generated from the master key, disc ID and device ID (when the player restriction is not set) or device-unique key (the player restriction is set) without using any title key.

Next in step S2406, the recorder/player will read block data one younger than another from an encrypted content 2312 from the disc, separate, in step S2407, a block seed forming four bytes in the leading portion of the block data in a selector 2310 and generate a block key from the block seed and the title-unique key generated in step S2405.

The block key may be generated as having previously been described in the foregoing with reference to FIG. 22. That is, a 64-bit block key can be generated from a 32-bit block seed and 64-bit title-unique key.

In the above, examples of generation of the disc-unique key, title-unique key and block key have been described. Note however that a block key may be generated, for each block, from a master key, disc ID, title key, block seed and a device ID (when the player restriction is not set) or a device-unique key (when the player restriction is set) without having to generate any disc-unique key and title-unique key.

In step S2408, the encrypted block data is decrypted with the block key thus generated (as indicated at a reference 2309) and outputted as decrypted data via a selector 2308. Note that the decrypted data includes ATS appended to each of transport packets included in the transport stream and the stream is processed based on the ATS in the aforementioned TS processor 300. Thereafter, the data can be used to display an image or play a music, for example.

Thus, the content encrypted in units of a block and stored in the recording medium can be decrypted, for playback, with the block key generated from the block seed including ATS in units of a block. The recorder/player decrypts the encrypted block data with the block key, and judges in step S2409 whether all the data have been read. If all the data have been read, the recorder/player will exit the procedure. If no, the recorder/player will go back to step S2406 where it will read the remaining data.

[Processing with a Medium Key Valid only for the Recording Medium]

In the aforementioned embodiment, the key renewal block (KRB) is used to transmit a master key to each recorder/player, and this master key is used to record or play back data to or from the recorder/player.

The master key is valid for every recording of data in the generation thereof. A recorder/player having acquired the master key of a generation can decrypt data having been recorded, in that generation and earlier generation, in the system to which the recorder/player belongs. However, because of the nature of the master key that it is valid for the entire system, successful uncovering of the master key by an attacker will disadvantageously affect the entire system.

As a key to be transmitted using the key renewal block (KRB) of a recording medium, however, a medium key which is valid only for the recording medium may be used, not any master key valid for the entire system. Use of a medium key in place of a master key (second embodiment) will be described herebelow. Note however that only differences of the second embodiment from the aforementioned first embodiment will be described.

Figure 27:
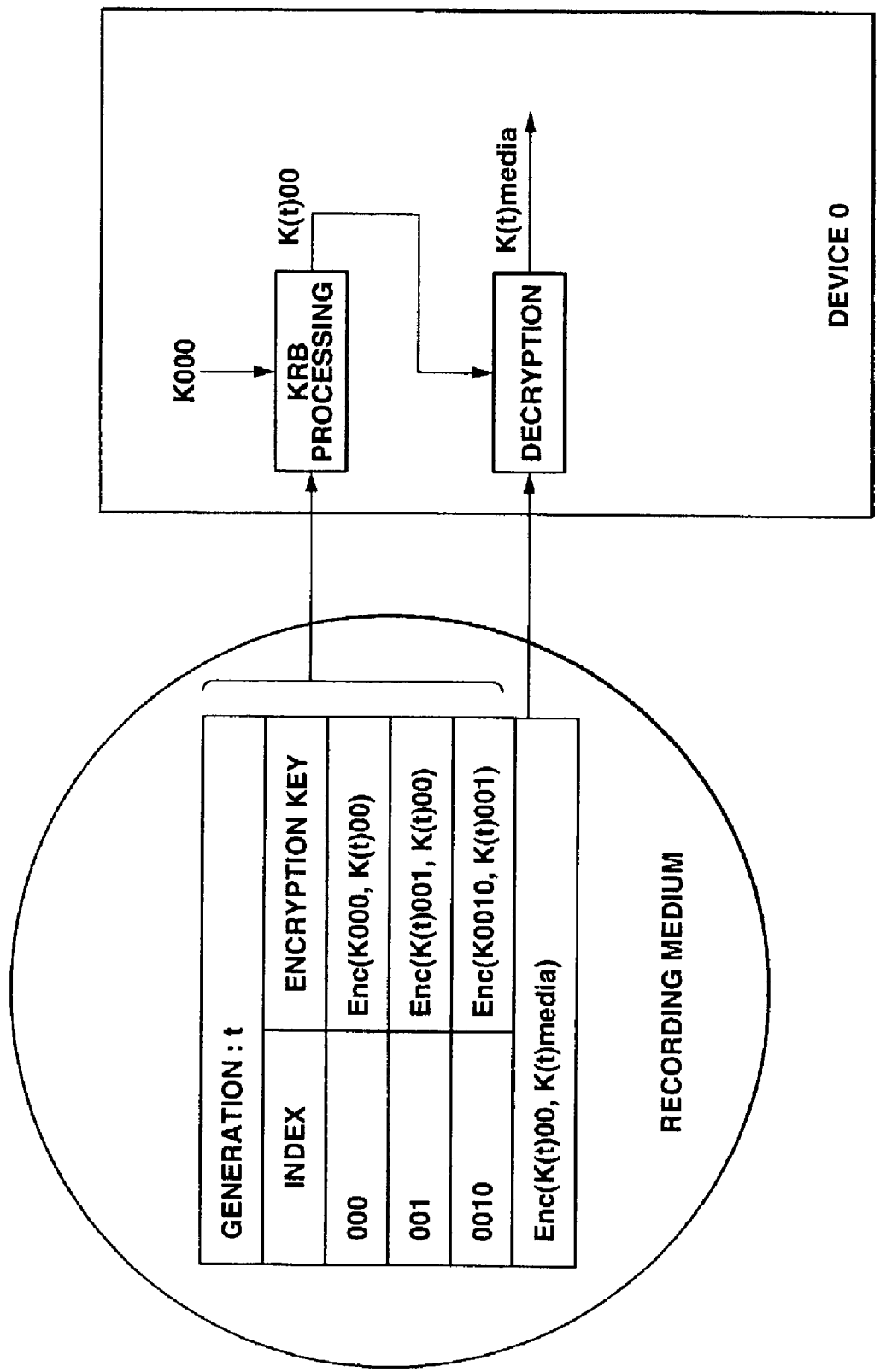
FIG. 27 shows examples of key distribution and decryption using the renewal key block (KRB) for the medium key in the information recorder/player according to the present invention.

Similarly to FIG. 13, FIG. 27 shows how the device 0 uses KRB at a time t, stored in the recording medium, leaf key K0000 prestored therein and node keys K000 and K00 to generate a renewed node key K(t)00, and acquires a new medium key K(t)media based on the renewed node key K(t)00. The medium key K(t)media is used in recording and playback of data to and from the recording medium.

Note that the pre-recording generation number Generation#n shown in FIG. 27 is not indispensable but set as an option because the medium key has no concept of a generation, younger or older, as with the master key.

For example, when a recording medium is inserted in each recorder/player for data recording or playback, the recorder/player calculates a medium key K(t)media for the recording medium and uses it for later access to the recording medium as in the flow chart shown in FIG. 28.

Figure 14:
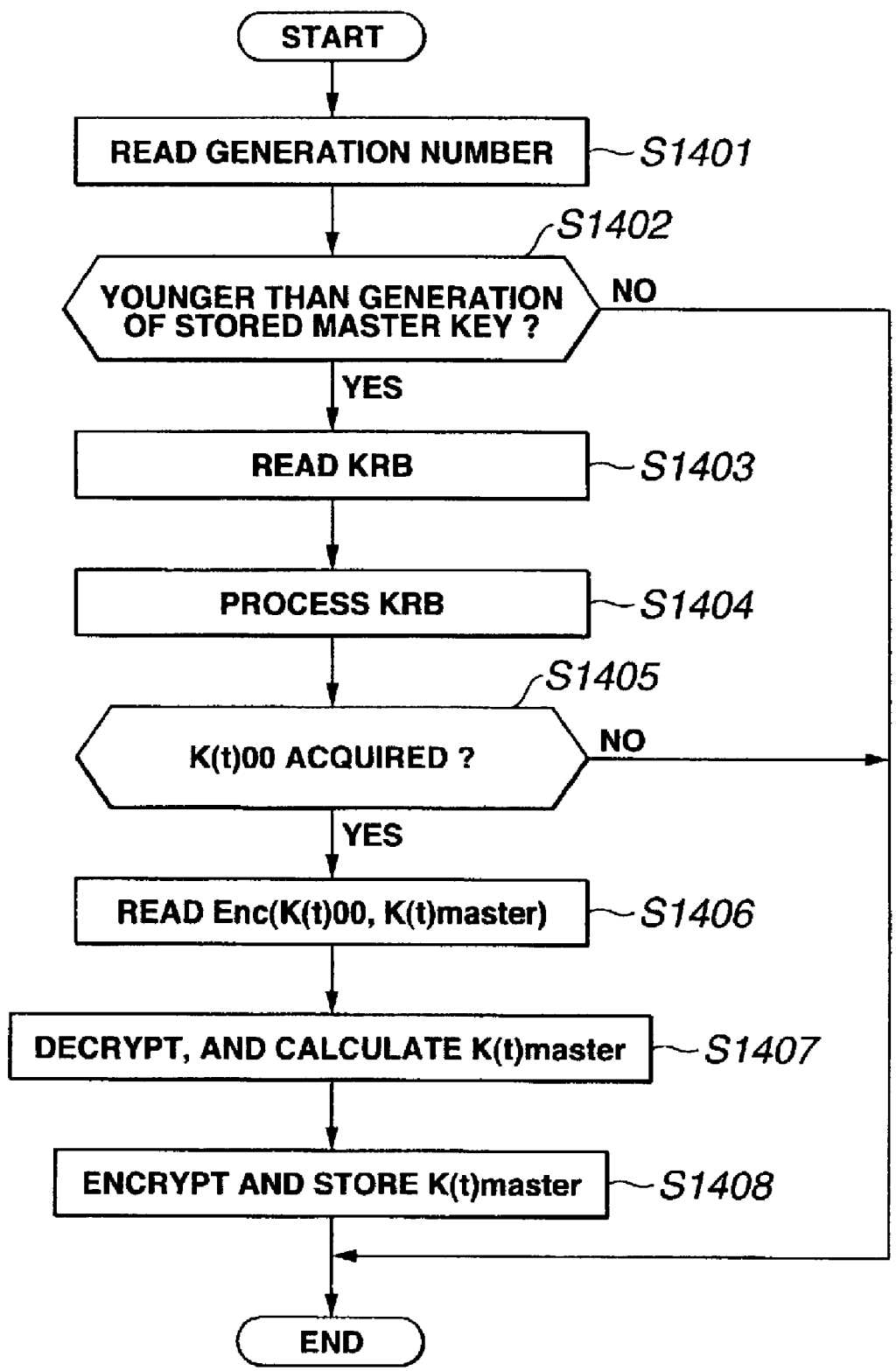
FIG. 14 shows a flow of operations made in the decryption using the key renewal block (KRB) for the master key in the information recorder/player according to the present invention.
Figure 28:
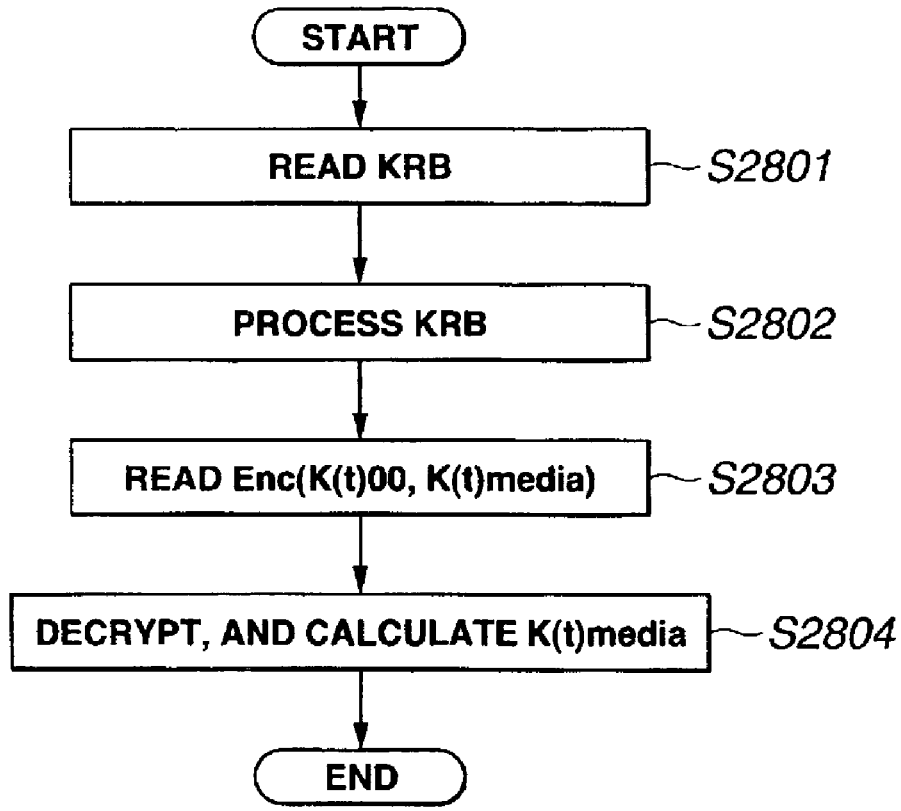
FIG. 28 shows a flow of operations made in the decryption using the key renewal block (KRB) for the medium key in the information recorder/player according to the present invention.

The KRB read in step S2801 and KRB processing in step S2802 in FIG. 28 are similar to those in steps S1403 and S1404 in FIG. 14.

In step S2803, the recorder/player reads, from the recording medium, encrypted data Enc(K(t)00 and K(t)media derived from encryption of the medium key K(t)media with the node key K(t)00, and decrypts the data in step S2804 to acquire a medium key. If the recorder/player is excluded or revoked from the group in the tree structure shown in FIG. 11, it will not be able to acquire any medium key and thus record or play back data to or from the recording medium.

Figure 29:
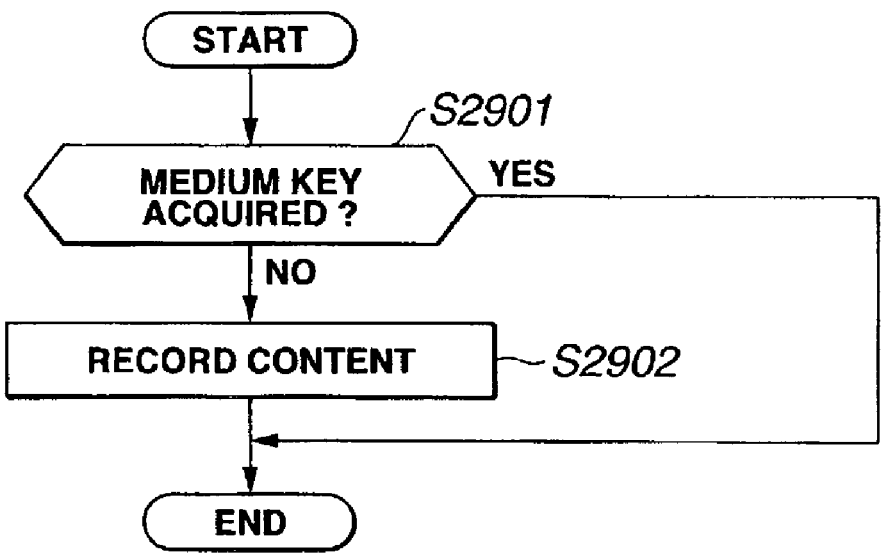
FIG. 29 shows a flow of operations made in the content recording using the medium key in the information recorder/player according to the present invention.

Next, recording of data to the recording medium will be described. However, since the medium key has no concept of a generation, younger or older, as with the master key, whether the data can be recorded will not be checked by the comparison in generation between the pre-recording generation information and the master key stored in the recorder/player itself, as in FIG. 15, but it will be judged, if a medium key has been acquired in the above processing, that the data can be recorded, as shown in the flow chart shown in FIG. 29. As in the flow chart in FIG. 29, it is judged in step S2901 whether a medium key has been acquired, and only when the medium key has been acquired, a content is recorded in step S2902.

[Data Recording with a Medium Key Valid only for the Recording Medium]

How a content data is recorded will be described herebelow with reference to the block diagrams in FIGS. 30 and 31 and the flow chart in FIG. 32.

As in the first embodiment, the recording medium is an optical disc in this second embodiment. Further, it is also true for the second embodiment that to prevent bit-by-bit copy of data from a recording medium, a disc ID as identification information unique to the recording medium is made to act on a key for encryption of the data.

Figure 30:
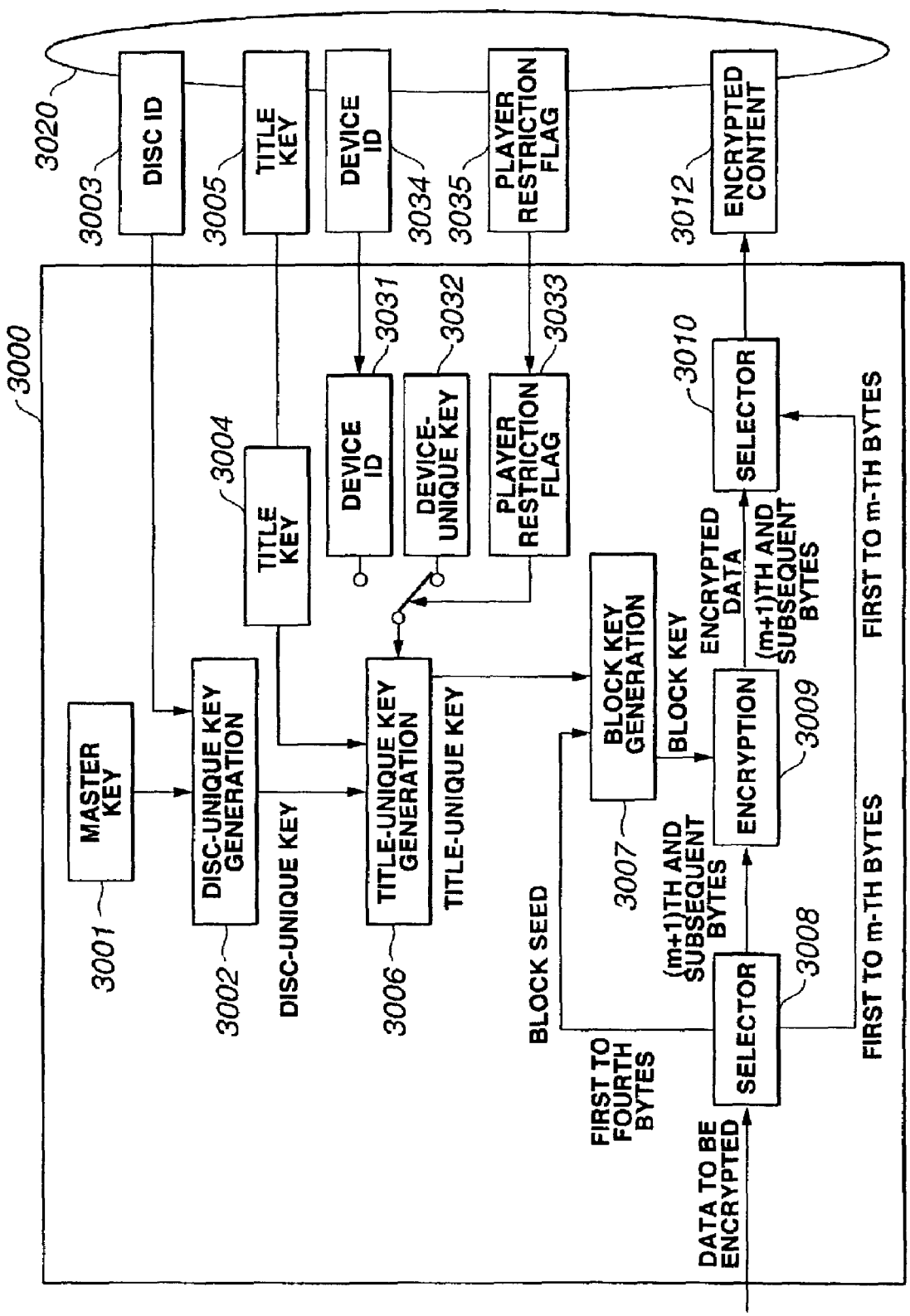
FIG. 30 is a block diagram (1) explaining the encryption for data recording using the medium key in the information recorder/player according to the present invention in a system in which the player restriction can be set.
Figure 31:
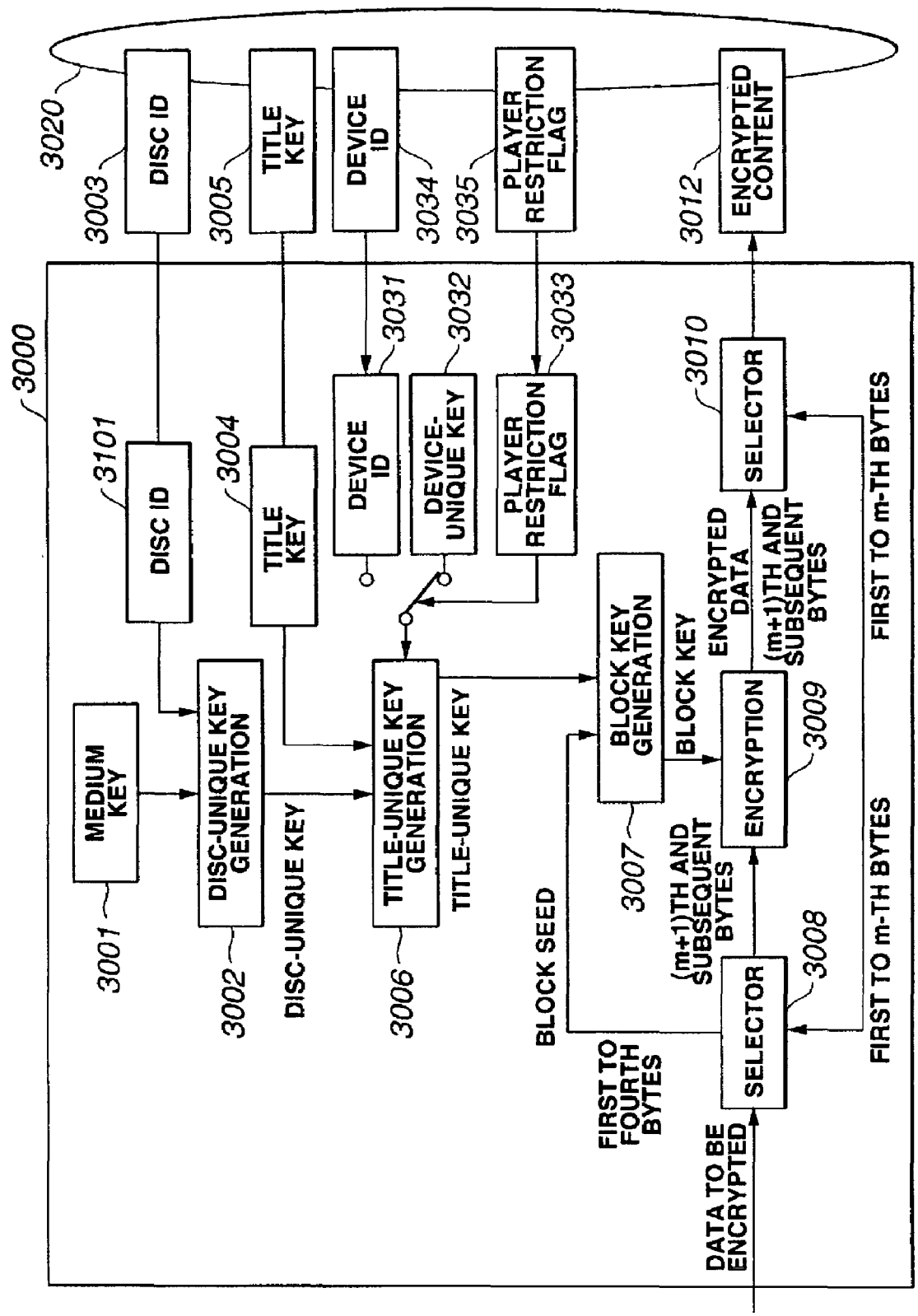
FIG. 31 is a block diagram (2) explaining the encryption for data recording using the medium key in the information recorder/player according to the present invention in a system in which the player restriction can be set.

FIGS. 30 and 31 are similar to FIGS. 16 and 17 for the first embodiment, except that a medium key is used in place of the master key and any recording generation number Generation# indicative of the generation of a master key is not used. The difference between FIGS. 30 and 31 is similar to that between FIGS. 16 and 17, and it concerns write of a disc ID. Namely, no disc ID is recorded in the data recording shown in FIG. 30 while a disc ID is recorded in the data recording shown in FIG. 31.

Figure 32:
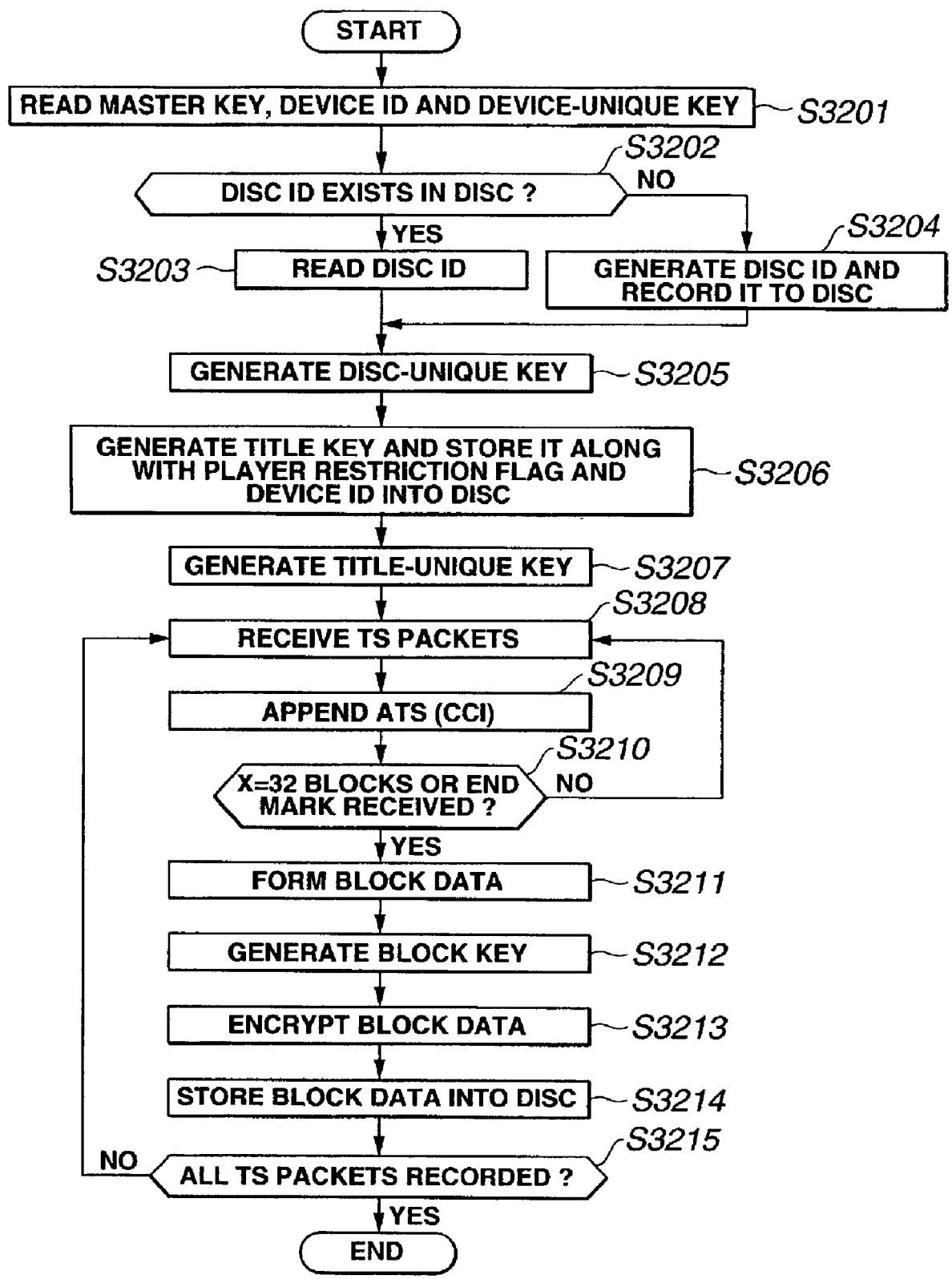
FIG. 32 shows a flow of operations made in th data recording using the medium key in the information recorder/player according to the present invention in a system in which the player restriction can be set.

FIG. 32 shows a data recording in this embodiment, in which a medium key is used. Namely, the block diagram in FIG. 32 corresponds to the flow chart for the first embodiment shown in FIG. 18. There will be described mainly differences of the operations in FIG. 32 from the operations effected in the first embodiment.

In step S3201 in FIG. 32, a recorder/player 3000 reads a device ID and device-unique key stored in its own memory, and a medium key K(t)media having been calculated and provisionally stored in step S2804 in FIG. 28.

In step S3202, the recorder/player 3000 checks if a disc ID is already stored in a recording medium (optical disc) 3020. If the disc ID is already stored, the recorder/player 3000 reads the disc ID in step S3203 (as in FIG. 30). If the disc ID is not stored, the recorder/player 3000 will generate a disc ID at random or by a predetermined method and record it to the disc in step S3204 (as in FIG. 31). There should be available only one disc ID for one disc. So, the disc ID may be stored in a lead-in area or the like of the disc. In any case, the recorder/player 3000 goes to step S3205.

In step S3205, the recorder/player 3000 uses the medium key and disc ID having been read in step S3201 to generate a disc-unique key. The disc-unique key may be generated by using a medium key instead of a master key in the same way as in the first embodiment.

Then the recorder/player 3000 goes to step S3206 where it will generate a title key unique to each record at random or by a predetermined method and record it to the disc. At the same time, the recorder/player 3000 records, to the disc, a player restriction flag as information indicative of whether the title (data) can be played back only in a device having recorded it (when the player restriction is set) or can be played back in any other device (when the player restriction is not set), and a device ID the recorder/player 3000 owns.

The disc has provided therein a data management file having stored therein information on what title is formed from data and where the data is from, and which can store a title key, player restriction flag and a device ID.

Figure 18:
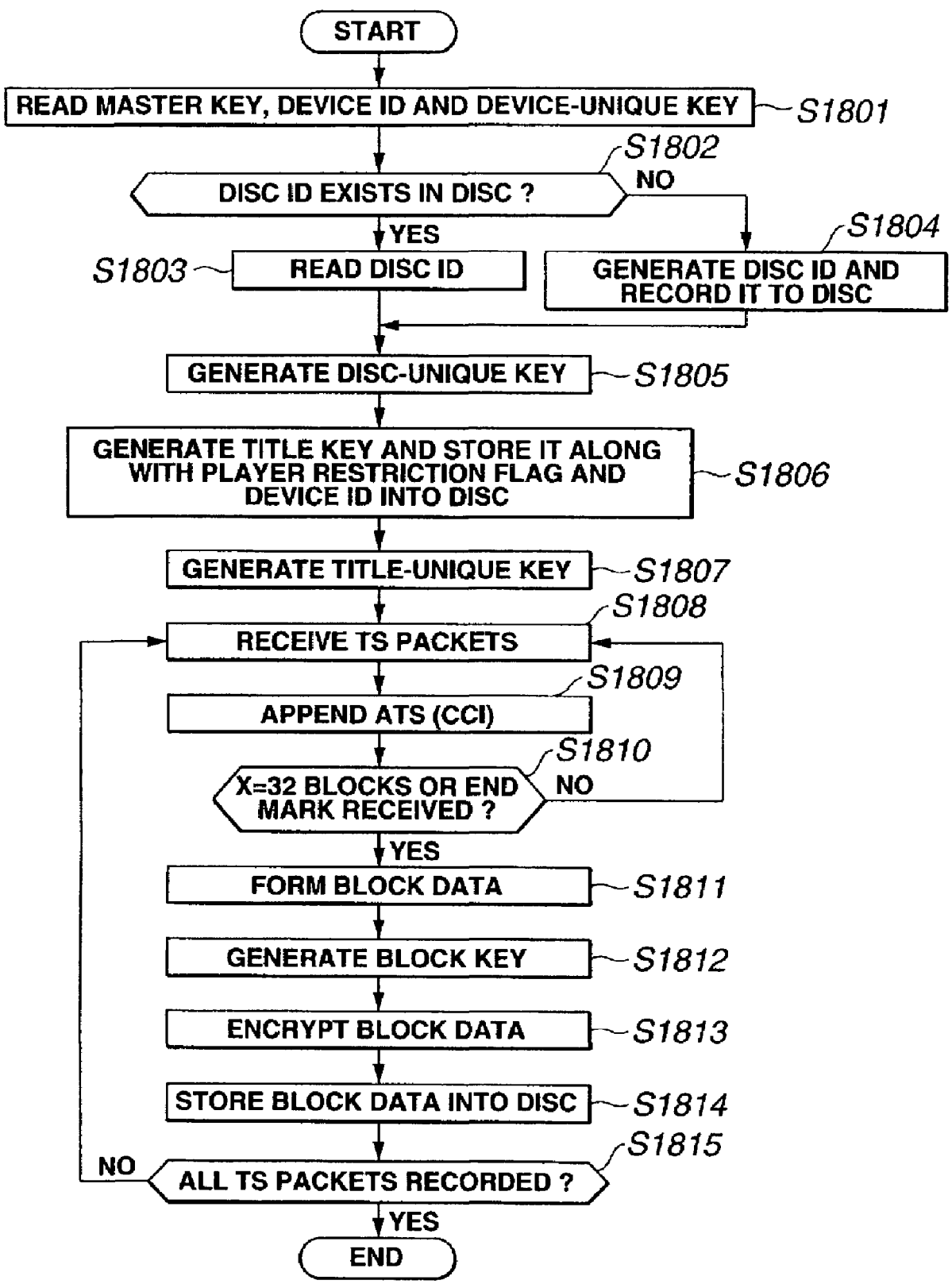
FIG. 18 shows a flow of operations effected in the data recording in the information recorder/player according to the present invention in a system in which the player restriction can be set.

Operations in steps S3207 to S3215 are similar to those in steps S1807 to 1815 in FIG. 18, and so will not be described any longer.

Note that in the foregoing, it has been described that the disc-unique key is generated from the medium key and disc ID and the title-unique key is generated from the disc-unique key, title key and device ID or from the title key and device-unique key, but the title-unique key may be generated directly from the medium key, disc ID, title key and device ID or device-unique key without having to use the device-unique key and a key equivalent to the title-unique key may be generated from the medium key, disc ID and device ID (when the player restriction is not set) or device-unique key (when the player restriction is set) without using the title key.

The medium key can be used as in the above to record data to the recording medium.

[Data Playback with a Medium Key Valid only for the Recording Medium]

Next, playback of data recorded as in the above will be described with reference to the block diagram in FIG. 33 and the flow chart in FIG. 34.

Figure 23:
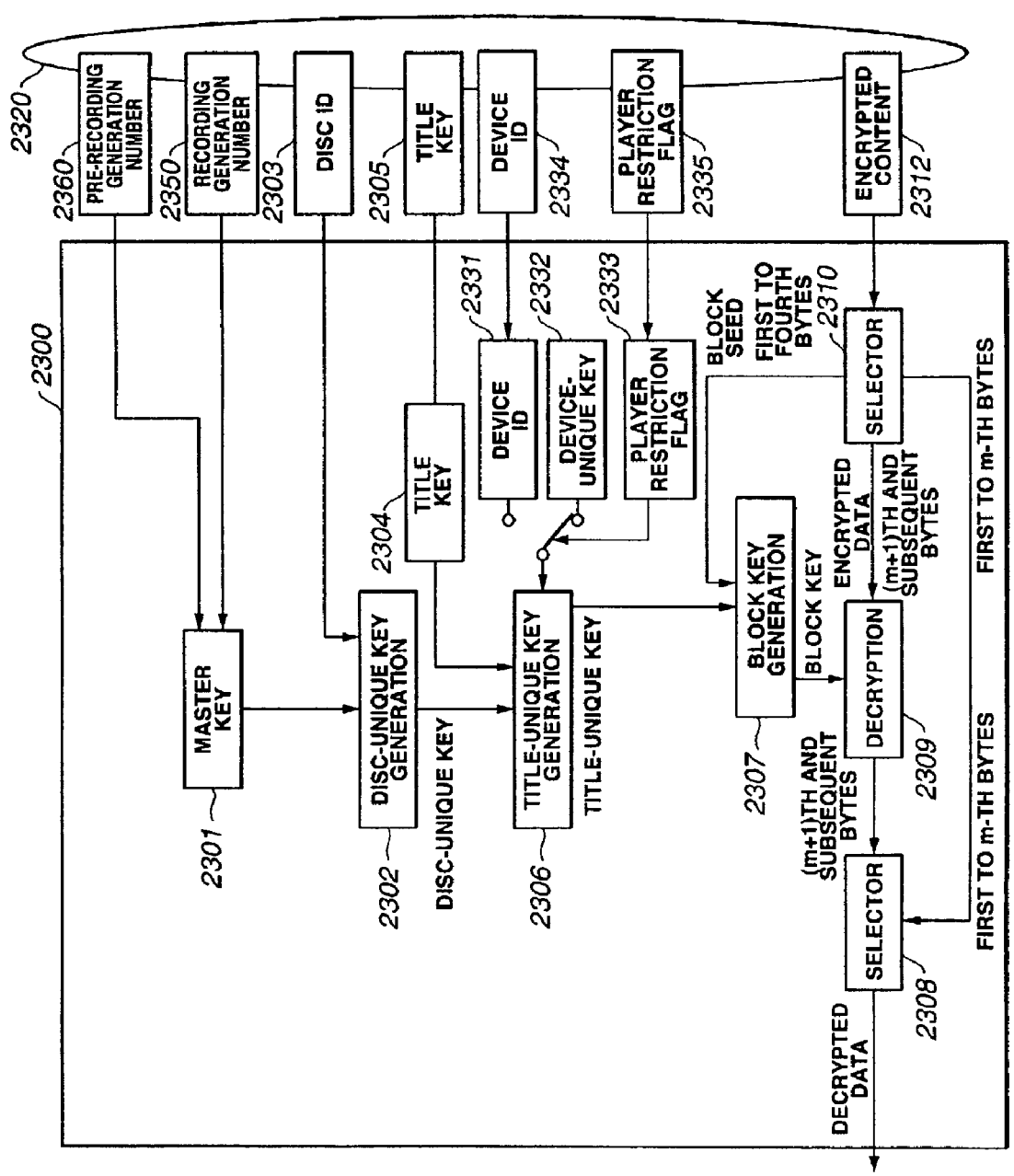
FIG. 23 is a block diagram explaining the decryption for data playback in the information recorder/player according to the present invention in a system in which the player restriction can be set.
Figure 33:
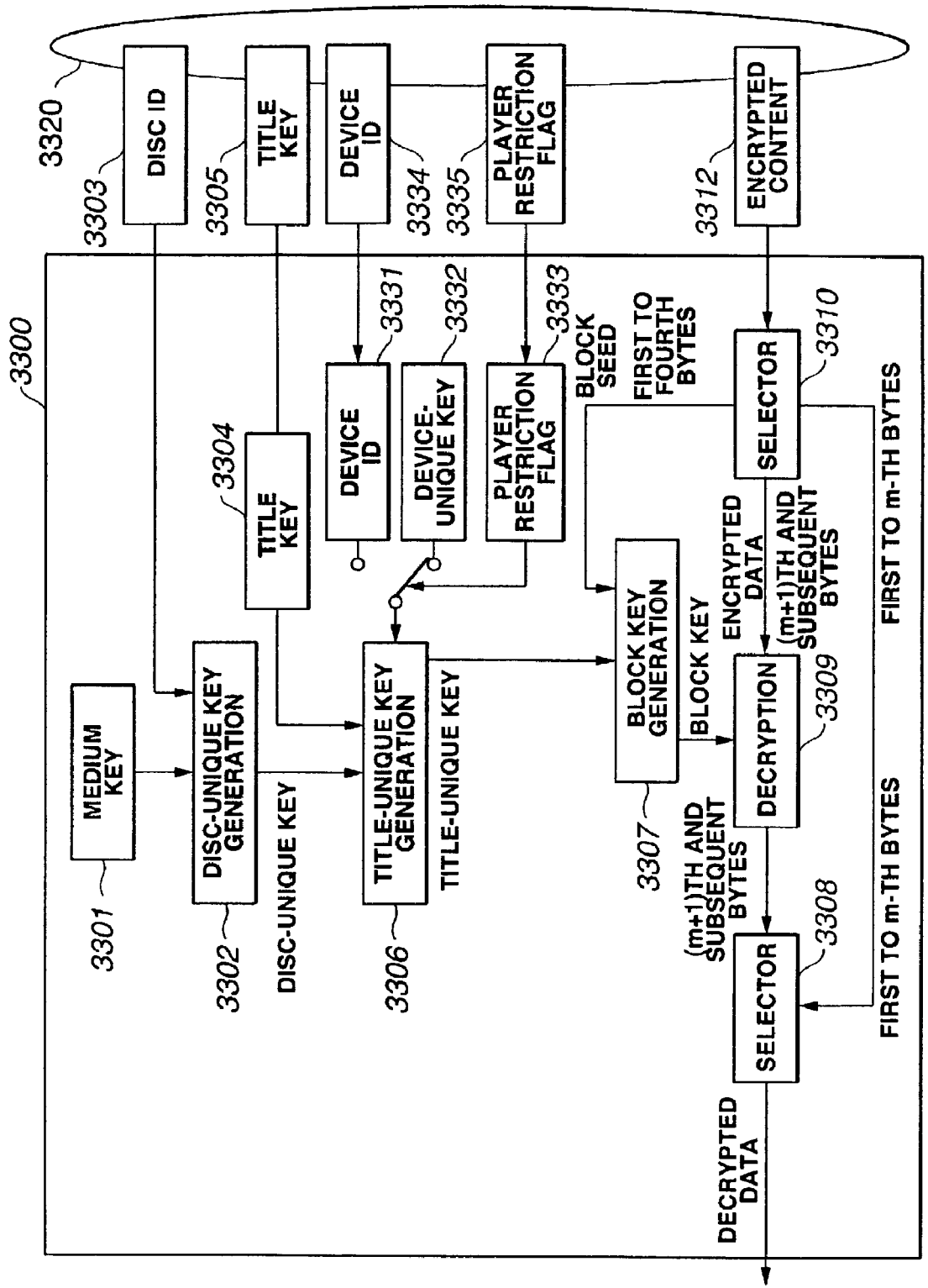
FIG. 33 is a block diagram explaining the encryption for data playback using the medium key in the information recorder/player according to the present invention in a system in which the player restriction can be set.

FIG. 33 is similar to FIG. 23 for the first embodiment except that a medium key is used instead of the master key and thus the recording generation number Generation# is omitted.

Figure 34:
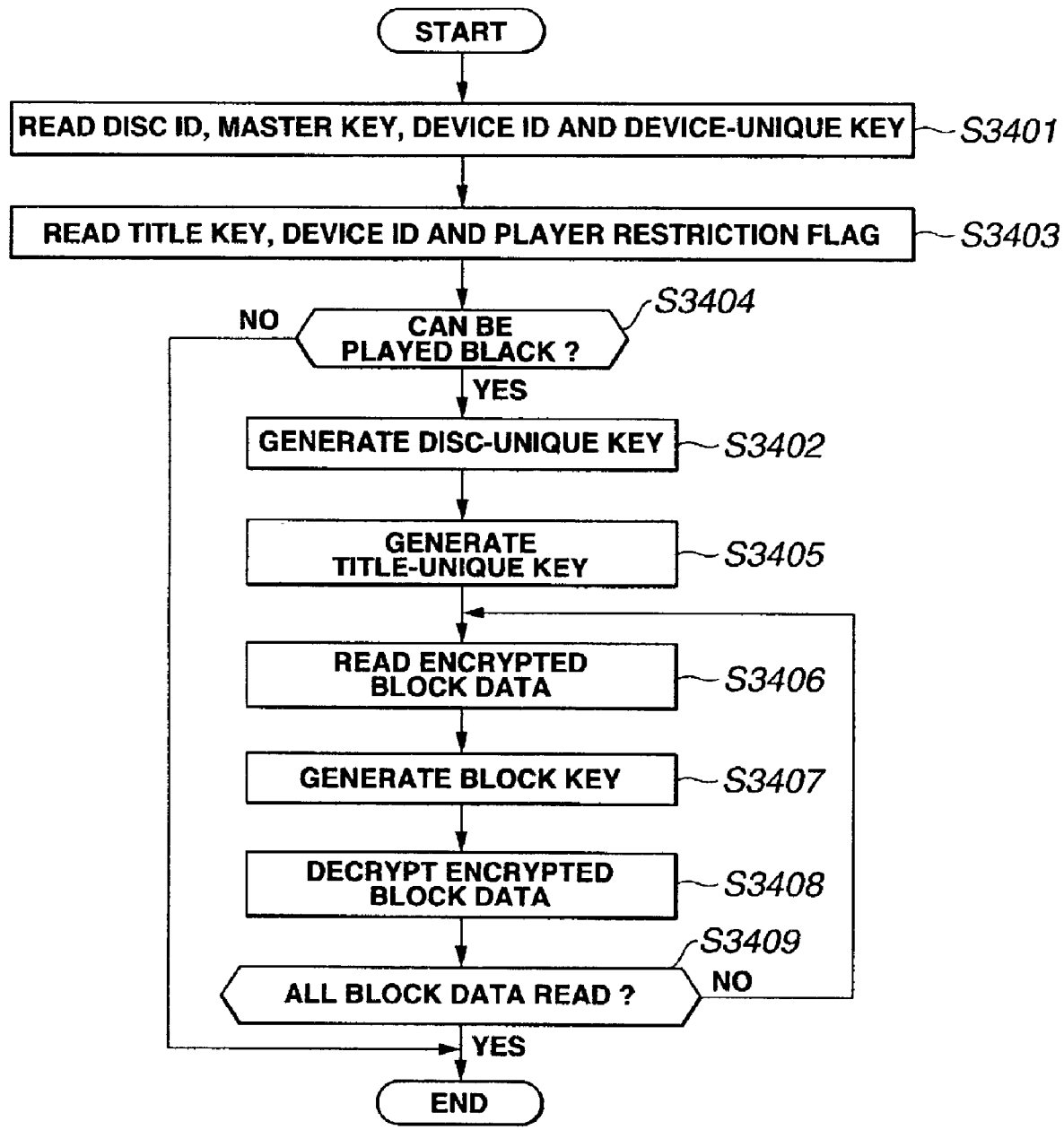
FIG. 34 shows a flow of operations made in the data playback using the medium key in the information recorder/player according to the present invention in a system in which the player restriction can be set.

In step S3401 in FIG. 34, a recorder/player 3400 reads a disc ID from a disc 3420 being a recording medium, and a device ID unique to itself, device-unique key being a key unique to itself and a medium key having been calculated and provisionally stored in step S2804 in FIG. 28 from its own memory.

Note that if the recorder/player 3400 cannot acquire any medium key even after effecting the operations as in FIG. 28 with the recording medium inserted into itself, it will exit the procedure without trying any data playback.

Next in step S3402, the recorder/player 3400 reads a title key for data to be read from the disc, device ID for a device having recorded the data and a player restriction flag for the data.

Figure 35:
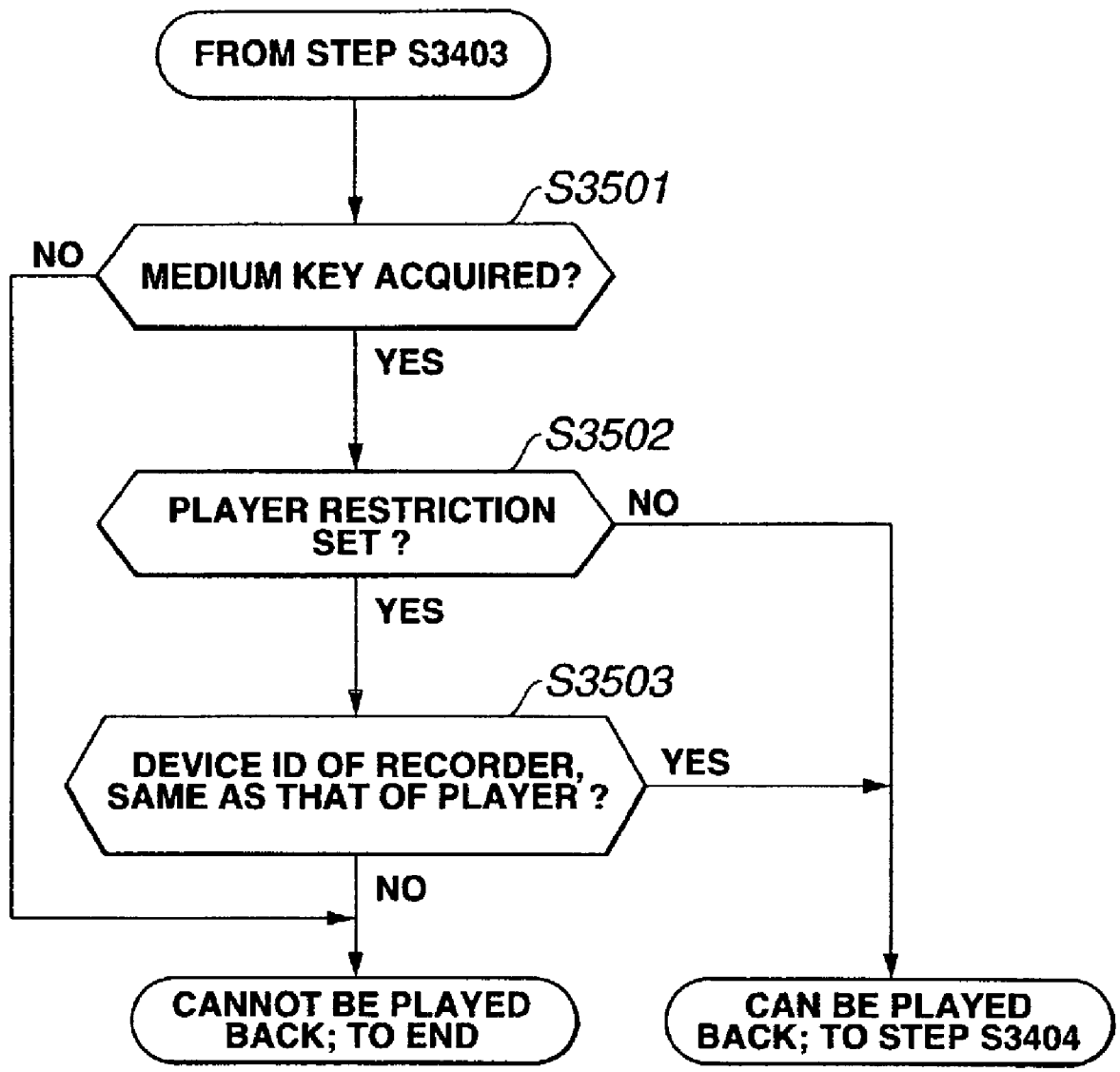
FIG. 35 is a flow chart showing in detail a judgment, in a data playback using the medium key, of whether or not data can be played back in the information recorder/player according to the present invention in a system in which the player restriction can be set.

Next in step S3403, the recorder/player 3400 judges whether the data can be played back. The operation in step S3403 is detailed in FIG. 35.

In step S3501, the recorder/player 3400 judges whether a medium key could be acquire. If no medium key could not be acquired, data cannot be played back. If a medium key could be acquired, the recorder/player 3400 goes to step S3502. The operations in steps S3502 and S3503 are similar to those in steps S2503 and S2504 in FIG. 25. When the player restriction flag means "Player restriction is set" and also the device key for the device having read the data, read from the recording medium in step S3503, and device ID for the recorder/player 3400, read from the memory in step S3401 mean together "Device having recorded data is not the player", the recorder/player 3400 will judge that "Data cannot be played back", skip over steps S3404 to S3409, and exit the procedure without playing back the data. In any other case than the above, the recorder/player 3400 will make a judgment that "Data cant be played back" and go to step S3404.

Figure 24:
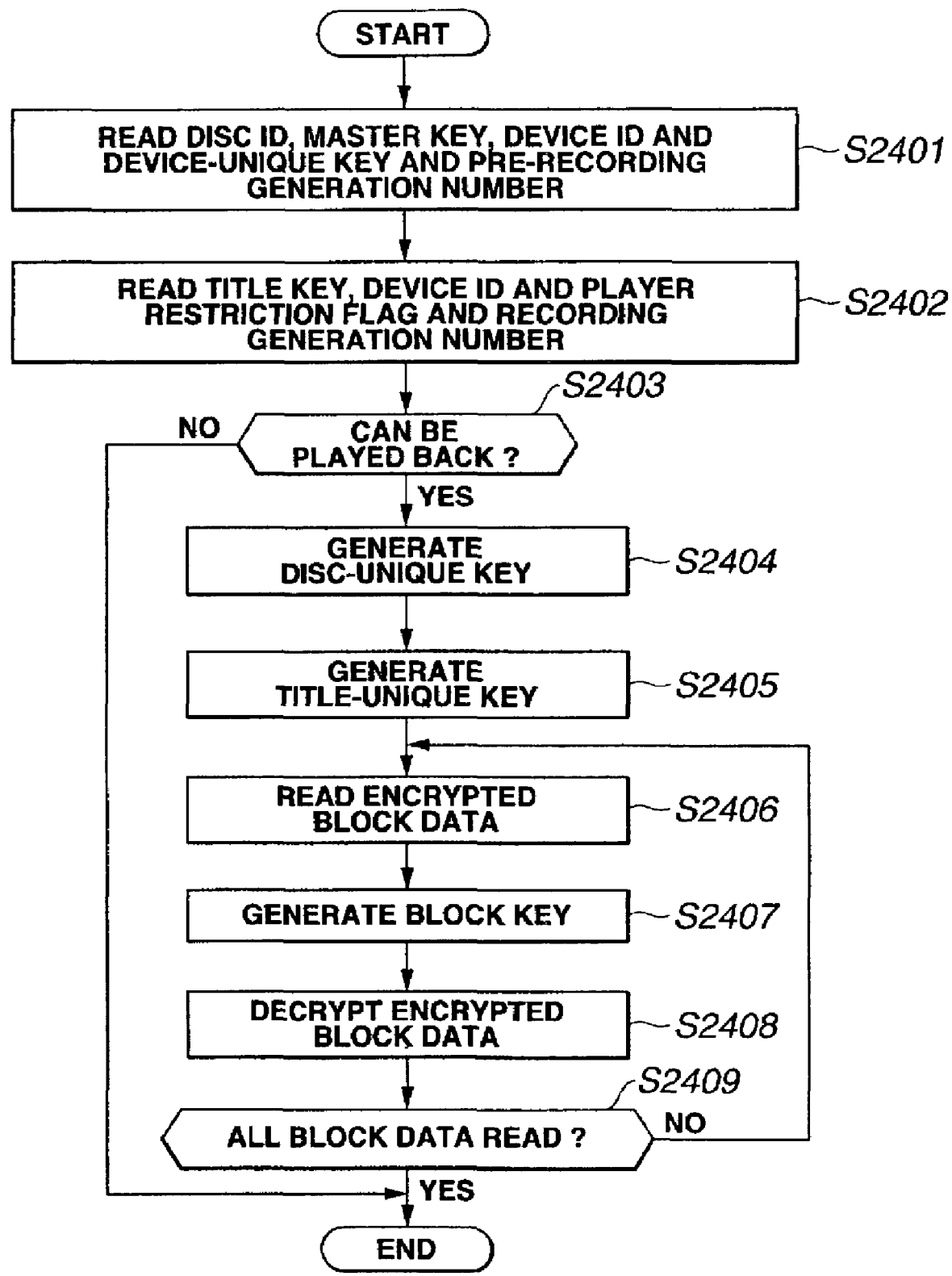
FIG. 24 shows a flow of operations effected in the data playback in the information recorder/player according to the present invention in a system in which the player restriction can be set.

The operations in steps S3404 to S3409 are similar to those in steps S2404 to S2409 in FIG. 24 and so will not be described any longer.

Note that in the foregoing, it has been described that the disc-unique key is generated from the medium key and disc ID and the title-unique key is generated from the disc-unique key, title key and device ID or from the title key and device-unique key, but the title-unique key may be generated directly from the medium key, disc ID, title key and device ID or device-unique key without having to use the device-unique key and a key equivalent to the title-unique key may be generated from the medium key, disc ID and device ID (when the player restriction is not set) or device-unique key (when the player restriction is set) without using the title key.

Data can be recorded to, and played back from, the recording medium as in the above.

[Storage by the Recorder/Player of Key Renewal Block (KRB) into the Recording Medium]

Figure 36:
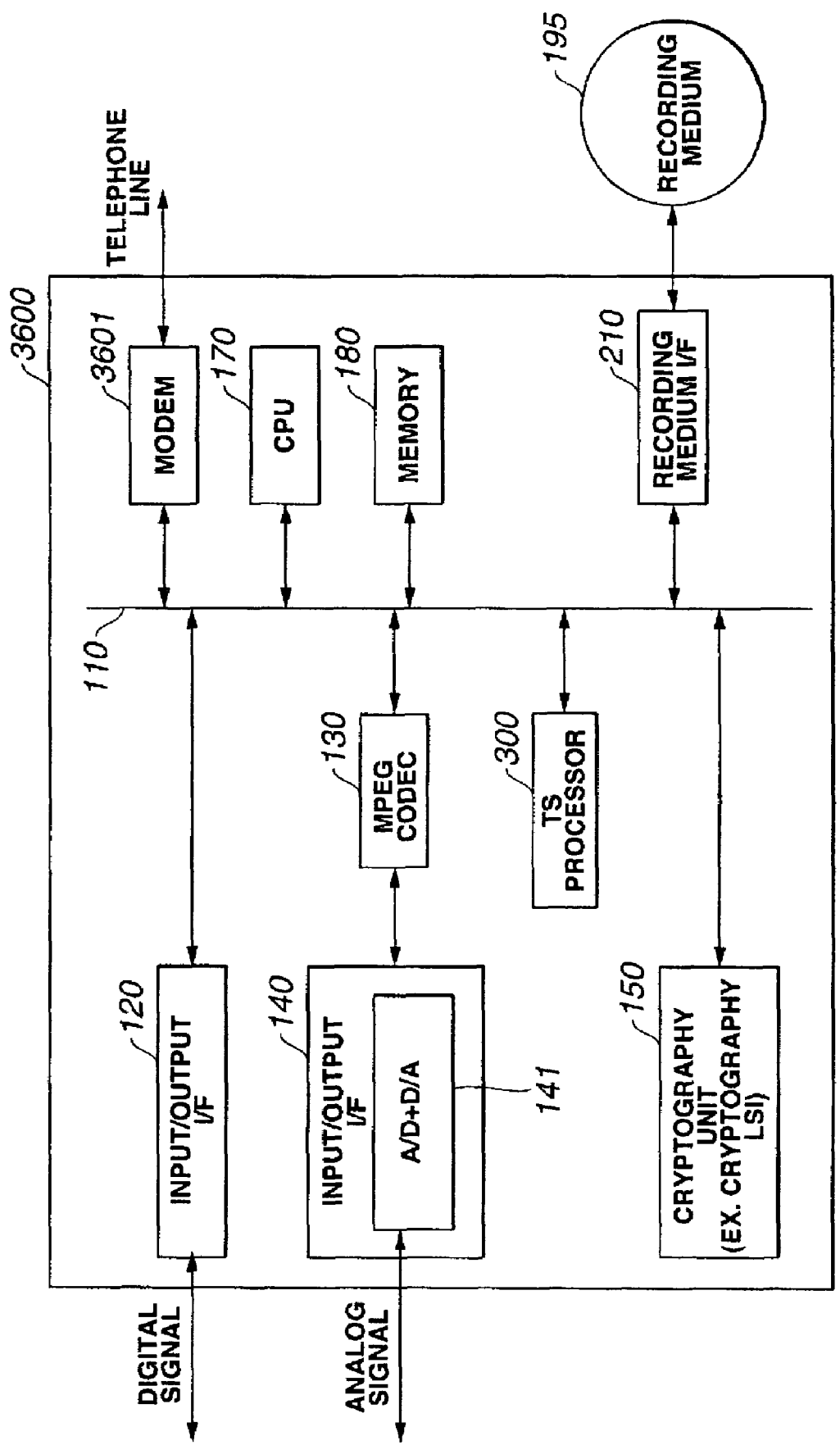
FIG. 36 is a block diagram showing the construction of the information recorder/player according to the present invention, in which KRB is received from outside via a communications means or the like and stored into a recording medium.

It should be reminded that in the example having been illustrated and described in the above, KRB is prestored in the recording medium but a recorder/player 3600 may record a KRB it has received from any other device via the input/output I/F 120 or 140, a modem 3601 or the like to a recording medium when initially recording data to the recording medium or every time it records data to the recording medium, as shown in FIG. 36.

Figure 37:
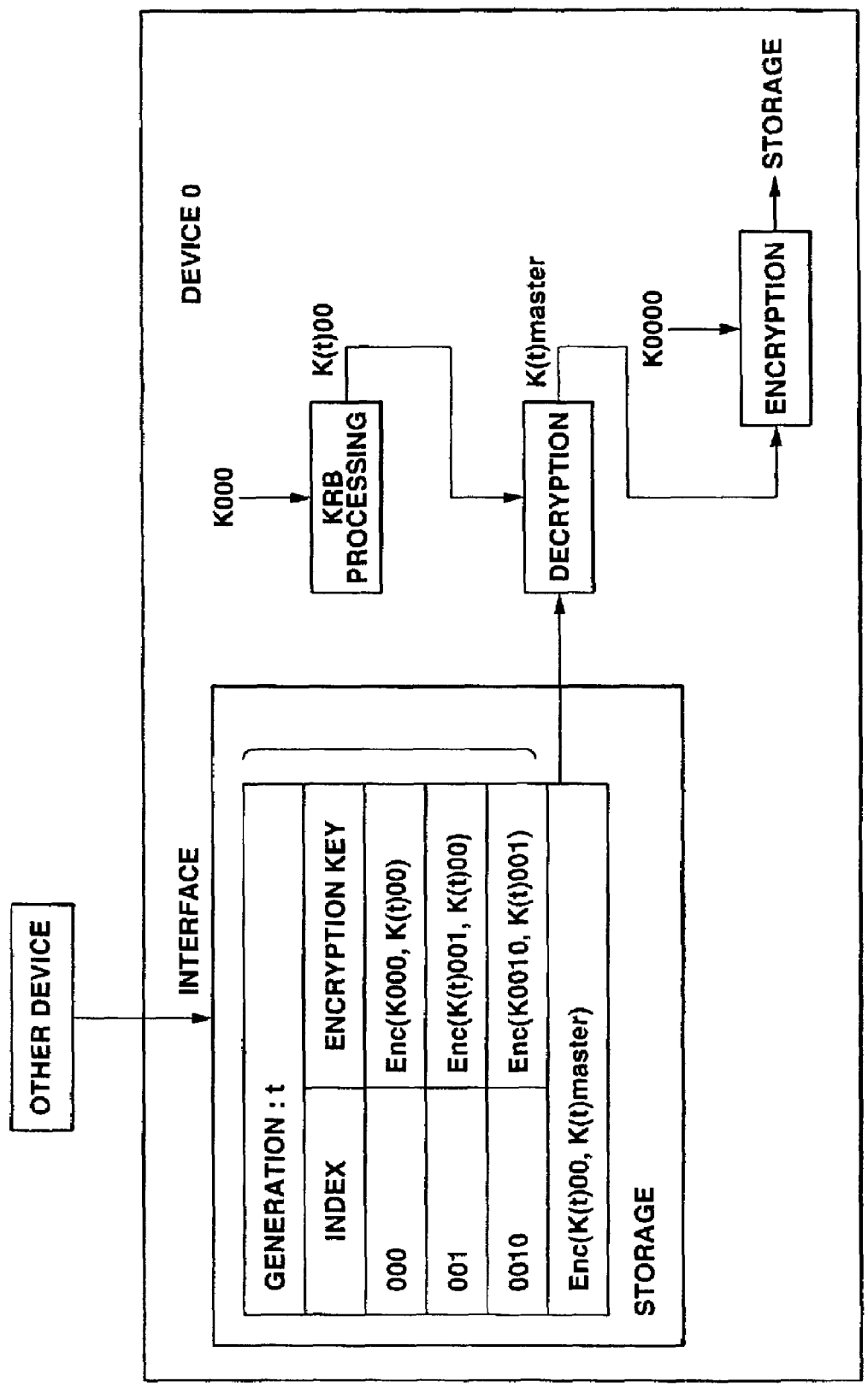
FIG. 37 is a block diagram explaining a procedure, followed in the information recorder/player according to the present invention, for receiving KRB from outside via a communications means or the like and storing it into a recording medium.
Figure 38:
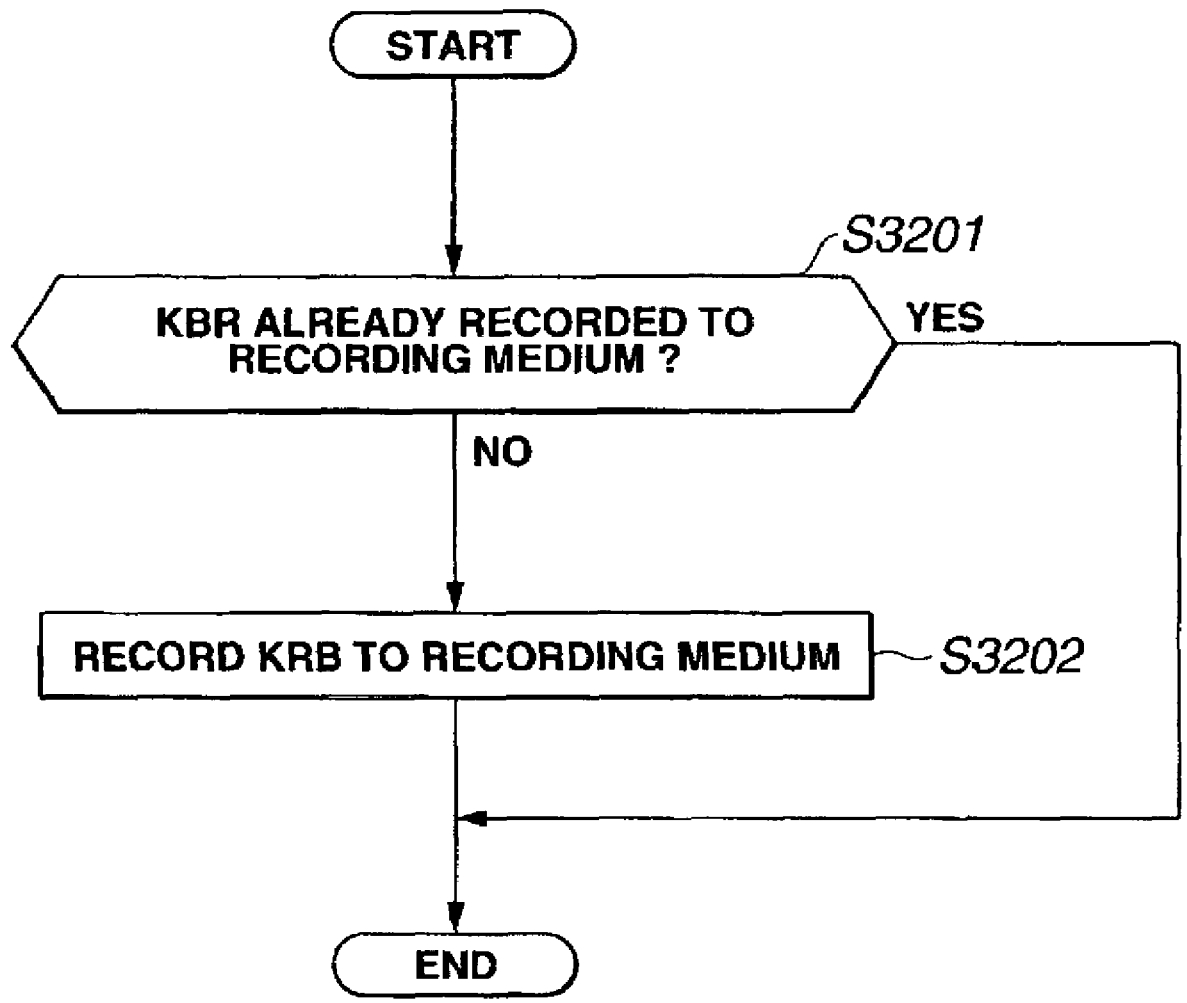
FIG. 38 shows a flow of operations effected in receiving KRB from outside via the communications means or the like and storing into a recording medium in the information recorder/player according to the present invention.

That is, in the first embodiment for example, the recorder/player may be adapted to acquire a KRB and a master key encrypted with node keys via the input/output I/F 120 or 140, modem 3601 or the like and store them into its own memory 180, in advance, as shown in FIG. 37, and then process the data when recording a content data to a recording medium as in the flow chart shown in FIG. 38.

Figure 39:
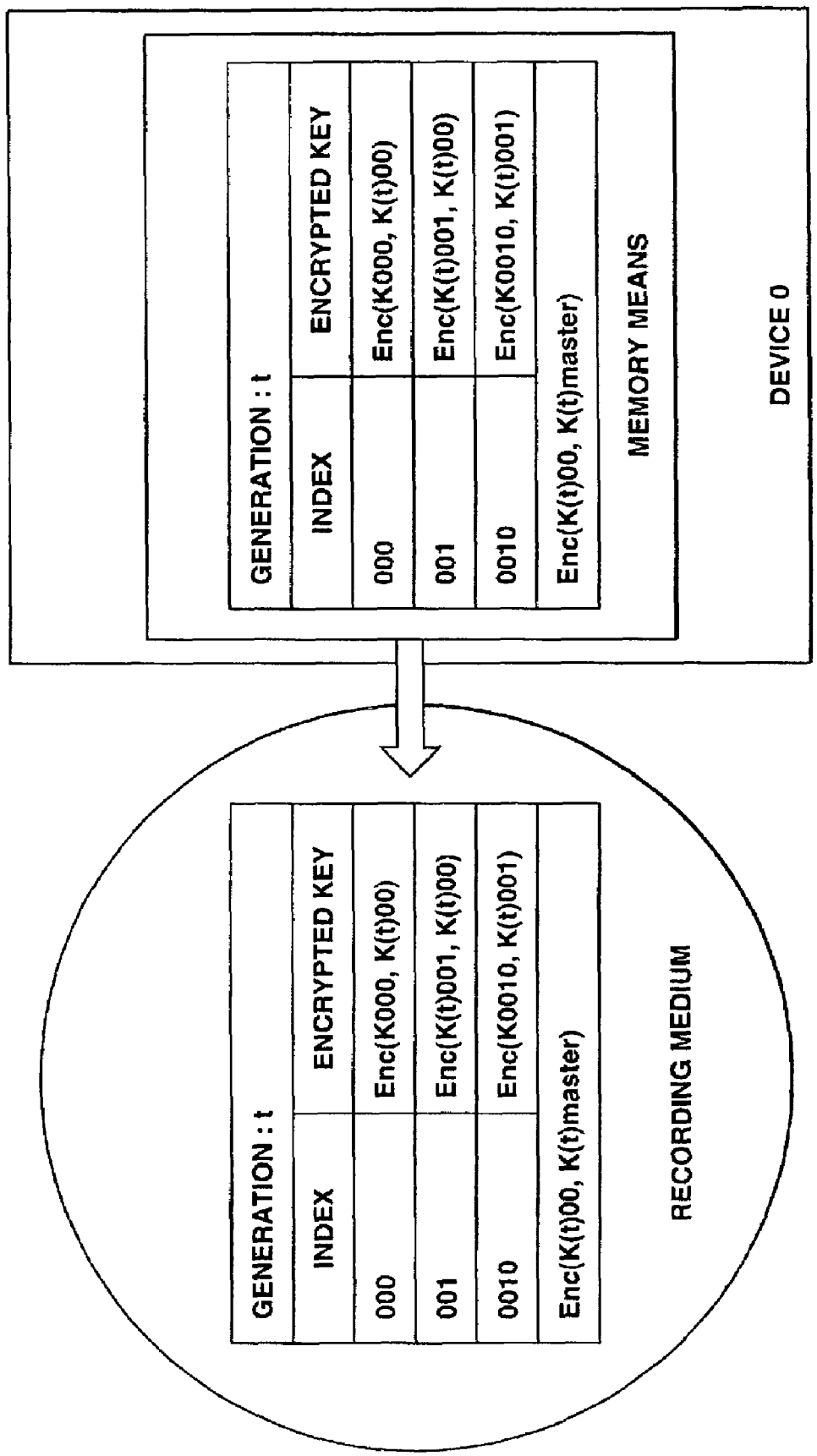
FIG. 39 explains the procedure, followed in the information recorder/player according to the present invention, for receiving KRB from outside via the communications means or the like and storing it into a recording medium.

Further description will be made with reference to the flow chart in FIG. 38. In step S3801, the recorder/player checks if KRB has already been recorded in a recording medium to which it is going to record data. If KRB is found already recorded in the recording medium, the recorder/ player will skip step S3802 and exit the procedure (goes to data recording procedure). If the result of checking is that no KRB has already been recorded in the recording medium, the recorder/player will go to step S3902 where it will record the KRB and encrypted master key stored in its own memory 180 to the recording medium as shown in FIG. 39. After making the recording, the recorder/player goes to recording of the content data.

The above method is not limited to data recording with the master key but may be applied to data recording with the medium key as in the second embodiment for example.

[Copy Control in Data Recording]

Now, to protect the profit of the copyrighter of a content, a licensed device has to control copying of the content.

That is to say, for recording a content to a recording medium, it is necessary to check whether the content may be copied or not and record only a data which may be copied. Also, for playing back a content from a recording medium and outputting the data, the content has to be prevented from illegally being copied subsequently.

The operations of the recorder/player shown in FIGS. 1 and 2 for recording or playing back such a content while controlling copying of the content will be described with reference to the flow charts shown in FIGS. 40 and 41.

Figure 40B:
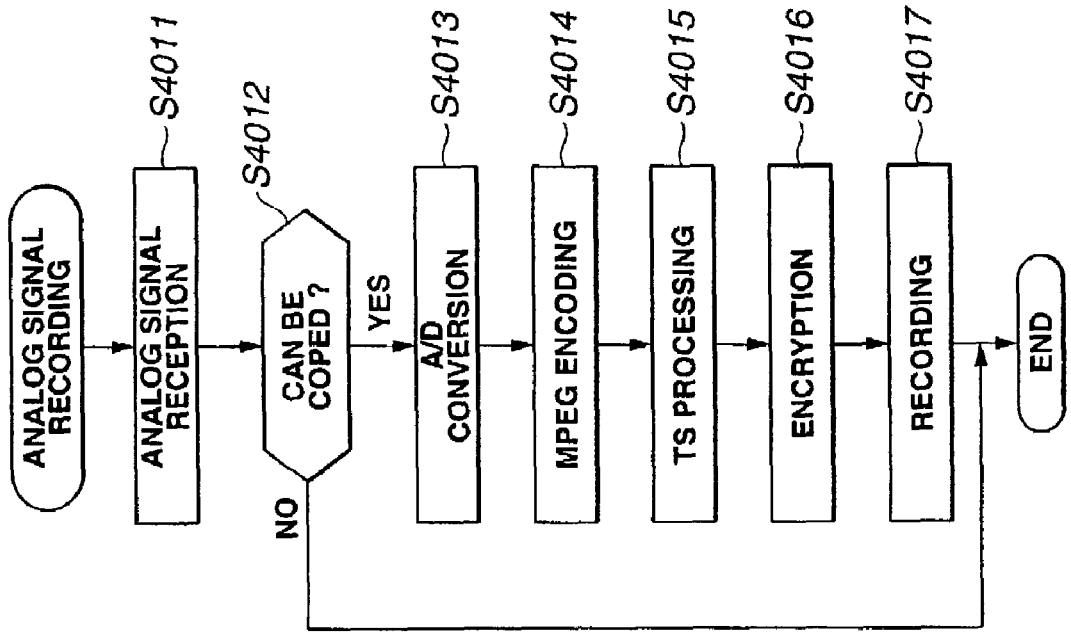
FIGS. 40A and 40B show flows of operations effected for copy control in the data recording in the information recorder/player according to the present invention.
Figure 40A:
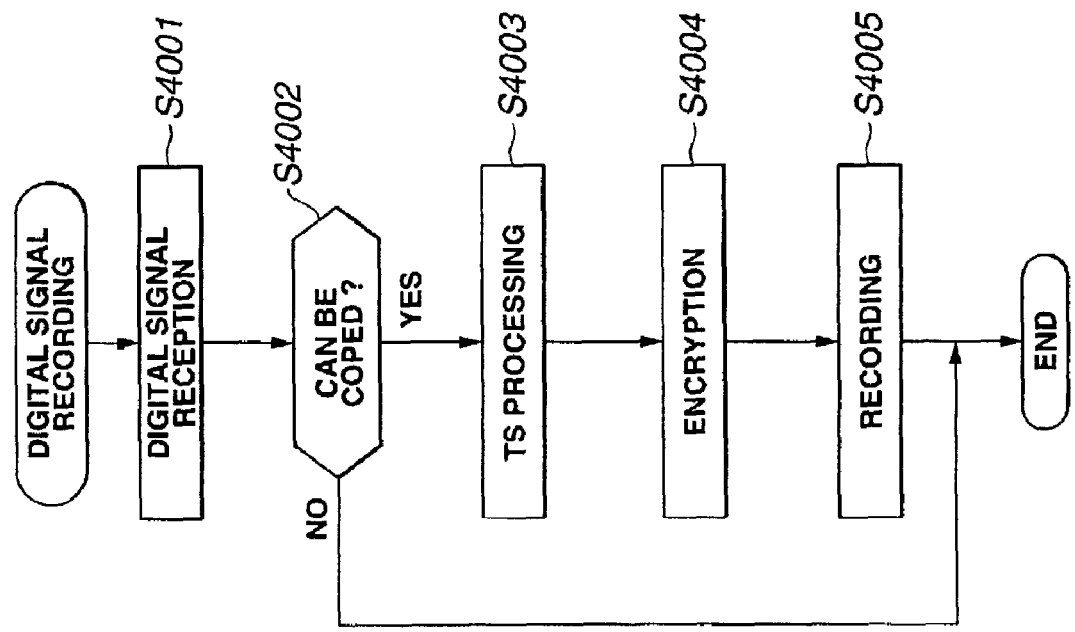

First, for recording an external content of digital signals to a recording medium, recording operations are effected as in the flow chart shown in FIG. 40A. The operations in FIG. 40A will be described herebelow concerning the recorder/player 100 shown in FIG. 1 as an example. The input/output I/F 120 receives a content of digital signals (digital content) via the IEEE 1394 serial bus or the like in step S4001 and the recorder/player goes to step S4002.

In step S4002, the input/output I/F 120 judges whether the supplied digital content can be copied. That is, in case the content received by the input/output I/F 120 has not been encrypted (for example, plain or unencrypted content is supplied to the input/output I/F 120 without applying the aforementioned DTCP standard), there will be made a judgment that the content can be copied.

Assume here that the recorder/player 100 is a device conforming to the DTCP standard and records data according to the DTCP standard. The DTCP standard defines 2-bit EMI (encryption mode indicator) as copy control information. When EMI is "00B" (B indicates that a preceding value is a binary number), it means that the content can be freely copied (copy-freely). When EMI is "01B", it means that the content cannot be copied more than a predetermined limit (no-more-copies). Further, when EMI is "10B", it means that the content can be copied once (copy-one-generation). When EMI is "11B", it means that the content is prohibited from being copied (copy-never).

Signals supplied to the input/output I/F 120 of the recorder/player 100 include EMI. When the EMI means "copy-free" or "copy-one-generation", it will be judged that the content can be copied. On the other hand, when EMI means "no-more-copies" or "copy-never", it will be judged that the content cannot be copied.

If the result of judgment in step S4002 is that the content cannot be copied, the recorder/player 100 skips over steps S4003 to S4005 and exits the recording procedure. Therefore, in this case, the content will not be copied to the recording medium 195.

If the result of judgment in step S4002 is that the content can be copied, the recorder/player 100 goes to step S4003. Subsequently, in steps S4003 to S4005, the recorder/player 100 will make similar operations to those in steps S302, S303 and S304 in FIG. 3A. That is, the TS processor 300 will append ATS to each TS packet included in a transport stream, the cryptography unit 150 will encrypt data, and the encrypted data from the cryptography unit 150 is recorded to the recording medium 195. Here, the recorder/player exits the recording procedure.

Note that EMI is included in the digital signals supplied to the input/output I/F 120. In case a digital content is recorded, ESI or information indicative of a copy control status similar to EMI (embedded CCI defined in the DTCP or the like for example) is recorded along with the digital content.

Generally, the information indicating "copy-one-generation" is converted to "no-more-copies" and recorded to prohibit more copies than a predetermined limit.

The recorder/player according to the present invention records copy control information such as EMI, embedded CCI, etc. as appended to TS packets. That is, as in Examples 2 and 3 in FIG. 10, 32 bits including 24 to 30 bits of ATS and copy control information are appended to each TS packet as shown in FIG. 5.

For recording an external content of analog signals to a recording medium, a recording procedure is effected as in the flow chart in FIG. 40B. The recording procedure shown in FIG. 40B will be described herebelow. A content of analog signals (analog content) is supplied to the input/output I/F 140 in step S4011. Then the recorder/player goes to step S4012 where it will judge whether the received analog content can be copied.

In step S4012, the judgment is done based on whether or not the signals received by the input/output I/F 140 include a Macrovision signal and CGMS-A (copy generation management system-analog) signal. When recorded in a VHS video cassette tape, the Macrovision signal will be a noise. When this Macrovision signal is included in signals received by the input/output I/F 140, the judgment will be such that the analog content cannot be copied.

The CGMS-A signal is a CGMS signal used in copy control of digital signals and applied to copy control of analog signals. It indicates that a content can be copied freely or once or cannot be copied (copy-freely, copy-one-generation or copy-never).

Therefore, if the CGMS-A signal is included in signal received by the input/output I/F 140 and means "copy-freely" or "copy-one-generation", it will be judged that the analog content can be copied. When the CGMS-A means "copy-never", the judgment will be such that the analog content cannot be copied.

Further, in case neither the Macrovision signal nor the CGMS-A signal is included in signals received by the input/output I/F 140, it will be judged that the analog content cannot be copied.

If the result of judgment in step S4012 is that the analog content cannot be copied, the recorder/player 100 will skip over steps S4013 to S4017 and exit the recording procedure. Therefore, in this case, the content will not be recorded to the recording medium 195.

Also, if the result of judgment in step S4012 is that the analog content can be copied, the recorder/player goes to step S4013. Subsequently, in steps S4013 to S4017, similar operations to those in steps S322 to S326 in FIG. 3B are effected, whereby the content is converted to a digital content, and then subjected to MPEG encoding, TS processing and encryption for recording to the recording medium. Here, the recorder/player exits the recording procedure.

Note that when the analog signals received by the input/output I/F 140 includes the CGMS-A signal, the CGMS-A signal will also be recorded to the recording medium when recording the analog content to the recording medium. Namely, the CGMS-A signal is recorded in the place of the CCI or other information shown in FIG. 10. Generally, information meaning "copy-one-generation" is converted to "no-more-copies" for recording to prohibit more copies than a predetermined limit. However, such information conversion will not be effected provided that there has been established for the system a rule that the copy control information "copy-one-generation" shall not be converted to "no-more-copies" for recording but shall be taken as "no-more-copies".

[Copy Control in Data Playback]

Next, the content is read from the recording medium, and outputted as a digital content to outside as shown in the flow chart in FIG. 41A. The operations shown in FIG. 41A will be described. First in steps S4101, S4102 and S4103, there will be effected similar operations to those in steps S401, S402 and S403 in FIG. 4A, whereby the encrypted content read from the recording medium is decrypted by the cryptography unit 150 and subjected to TS processing. After subjected to these processes, the digital content is supplied to the input/output I/F 120 via the bus 110.

In step S4104, the input/output I/F 120 judges whether the digital content supplied thereto can be copied later. Namely, in case the digital content supplied to the input/output I/F 120 includes no EMI or information indicative of a copy control status (copy control information) like the EMI, it will be judged that the content can be copied later.

Also, in case the digital content supplied to the input/output I/F 120 includes EMI for example, namely, in case an EMI has been recorded in conformity to the DTCP standard during data recording, and if the EMI (recorded EMI) means "copy-freely", it will be judged that the digital content can be copied later. Also, when the EMI means "no-more-copies", it will be judged that the content cannot be copied later.

It should be reminded that generally, the recorded EMI does not means "copy-one-generation" and "copy-never" because an EMI meaning "copy-one-generation" is converted to "no-more-copies" during data recording and a digital content having an EMI meaning "copy-never" will not be recorded to the recording medium. However, the EMI conversion will not be effected provided that there has been defined for the system a rule that the copy control information "copy-one-generation" shall not be converted to "no-more-copies" for recording but shall be taken as "no-more-copies".

If the result of judgment in step S4104 is that the content can be copied later, the input/output I/F 120 goes to step S4105 where it will output the digital content to outside and exit the playback procedure.

Also, if the result of judgment in step S4104 is that the content cannot be copied later, the input/output I/F 120 goes to step S4106 where it will output, according to the DTCP or the like, the digital content in such a form that cannot be copied and exit the playback procedure.

That is to say, in case the recorded EMI means "no-more-copies" as in the above (or if there has been defined for the system a rule that copy control information "copy-one-generation" for example shall not be converted to "no-more-copies" for recording but shall be taken as "no-more-copies" and the EMI recorded under this condition means "copy-one-generation"), the content will be prohibited from being further copied.

Thus, the input/output I/F 120 makes mutual authentication with a counterpart device according to the DTCP standard. If the counterpart device is a legal one (a device conforming to the DTCP standard herein), the input/output I/F 120 encrypts the digital content and outputs the data to outside.

Next, for playing back the content from the recording medium and outputting the data as an analog content, the playback is effected as in the flow chart in FIG. 41B. The operations for the playback will be described with reference to FIG. 41B. In steps S4111 to S4115, similar operations to those in steps S421 to S425 in FIG. 4B are effected. That is, an encrypted content is read, and subjected to decryption, TS processing, MPEG decoding and D/A conversion. An analog content thus provided is received by the input/output I/F 140.

In step S4116, the input/output I/F 140 judges whether a content supplied thereto can be copied later. Namely, in case no copy control information is found recorded along with the recorded content, it will be judged that the content can be copied later.

In case EMI or copy control information has been recorded during content recording in conformity to the DTCP standard for example, and if the EMI or copy control information means "copy-freely", it will be judged that the content can be copied later.

Also, in case the EMI or copy control information means "no-more-copies", or in case there has been defined for the system a rule that the copy control information "copy-one-generation" for example shall not be converted to "no-more-copies" for recording but shall be taken as "no-more-copies" and if the EMI or copy control information recorded under this condition means "copy-one-generation", it will be judged that the content cannot be copied later.

Further, in case an analog content supplied to the input/output I/F 140 includes a CGMS-A signal, namely, in case the CGMS-A signal has been recorded along the content during data recording, and if the CGMS-A signal means "copy-freely", it will be judged that the analog content can be copied later. Also, when the CGMS-A signal means "copy-never", it will be judged that the analog content cannot be copied later.

If the result of judgment in step S4116 is that the content can be copied later, the input/output I/F 140 goes to step S4117 where it will output the analog signals supplied thereto as they are and exit the playback procedure.

Also, if the result of judgment in step S4116 is that the analog content cannot be copied later, the input/output I/F 140 goes to step S4118 where it will output the analog content in such a form that the content cannot be copied, and exit the playback procedure.

Namely, in case copy control information such as recorded EMI means "no-more-copies as in the above (alternatively, in case there has been defined for the system a rule that copy control information "copy-one-generation" for example shall not be converted to "no-more-copies" for recording but shall be taken as "no-more-copies" and if copy control information like an EMI recorded under this condition means "copy-one-generation"), the content will be prohibited from be copied any more.

Thus, the input/output I/F 140 appends a signal and a CGMS-A meaning "copy-never" to the analog content, and outputs the analog signal to outside. Also in case recorded CGMS-A signal means "copy-never" for example, the content will be prohibited from being copied any more. Thus, the input/output I/F 140 modifies the CGMS-A signal to "copy-never" and outputs it along with the analog content to outside.

As in the above, by controlling copying of a content while recording or playing back the content, it is possible to prevent the content from being copied beyond a permitted range for the content (illegal copy).

[Construction of the Data Processor]

Figure 42:
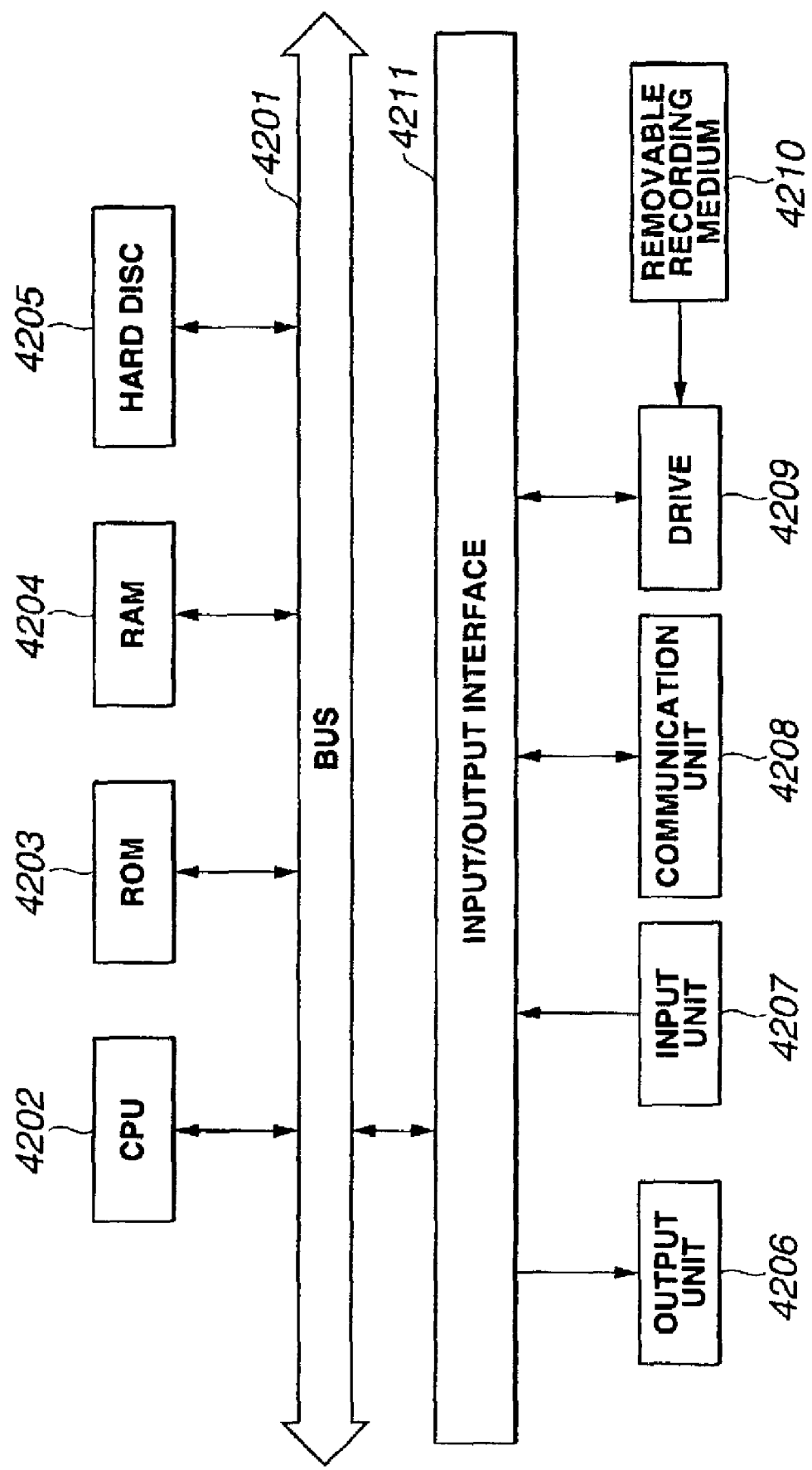
FIG. 42 is a block diagram of a data processing system to process data by software in the information recorder/player.

Note that the aforementioned series of operations can be done by a hardware or by a software. Namely, the cryptography unit 150 can be formed from an encryption/decryption LSI and also the cryptography, namely, the encryption/decryption, by the cryptography unit 150 can be done by having a general-purpose computer or a one-chip microcomputer execute a corresponding program. Similarly, the operations of the TS processor 300 can be done by a software. For effecting the series of operations for TS processing by a software, a program including the software is installed in a general-purpose computer, one-chip microcomputer or the like. FIG. 42 shows an example construction of one embodiment of a computer in which the program for the series of operations is installed.

The program can be prerecorded in a hard disc 4205 and ROM 4203 as recording media incorporated in the computer. Alternatively, the program may be stored (recorded) provisionally or permanently in a removable recording medium 4210 such as a floppy disc, CD-ROM (compact disc read-only memory), MO (magneto-optical) disc, DVD (digital versatile disc), magnetic disc, semiconductor memory or the like. Such a removable recording medium 4210 can be provided as a so-called package software.

It should be reminded that the program can be installed from the aforementioned removable recording medium 4210 to a computer, otherwise, transferred from a download site to the computer by a radio communication network over a digital broadcasting satellite or transferred to the computer over a cable via a network such as LAN (local area network), Internet or the like, the computer receives the program thus transferred by a communication unit 4208 thereof and install it into the built-in hard disc 4205.

The computer incorporates a CPU (central processing unit) 4202 as shown. The CPU 4202 is connected to an input/output interface 4211 via a bus 4201. When the CPU 4202 is supplied with an instruction from an input unit 4207 operated by the user, such as a keyboard, mouse or the like via the input/output interface 4211, it executes the program stored in a ROM (read-only memory) 4203.

Alternatively, the CPU 4202 loads, into a RAM (random-access memory) 4204 for execution, a program stored in the hard disc 4205, a program transferred from a satellite or network, received by the communication unit 4208 and installed into the hard disc 4205 or a program read from the removable recording medium 4210 set in a drive 4209 and installed into the hard disc 4205.

Thus, the CPU 4202 makes operations as in the aforementioned flow charts or operations as in the aforementioned block diagrams. The CPU 4202 outputs results of these operations from an output unit 4206 such as an LCD (liquid crystal display) or speaker, or transmits them from the communication unit 4208, or records them to the hard disc 4205, via the input/output interface 4211, as necessary.

Note that the operations or processes to describe a program which allows the computer to do a variety of operations may not always be done in the time sequence as in the flow charts but may include ones which are executed in parallel or individually (parallel processes or processes by objects, for example).

The program may be a one which can be executed by a single computer or in a decentralized manner by a plurality of computers. Further, the program may be a one which can be transferred to a remote computer for execution.

In the above, the present invention has been described concerning the example that a cryptography block formed from one-chip encryption/decryption LSI encrypts and decrypts a content. Note however that the content encryption/decryption block may also be a single software module which is to be executed by the CPU 170 shown in FIGS. 1 and 2, for example. Similarly, the operations of the TS processor 300 may be done by a single software module which is to be executed by the CPU 170.

[Recording Medium Producing Apparatus and Method]

The present invention also provides an information recording medium producing apparatus and method for production of the aforementioned information recording medium according to the present invention. The apparatus and method will be described herebelow.

Figure 43:
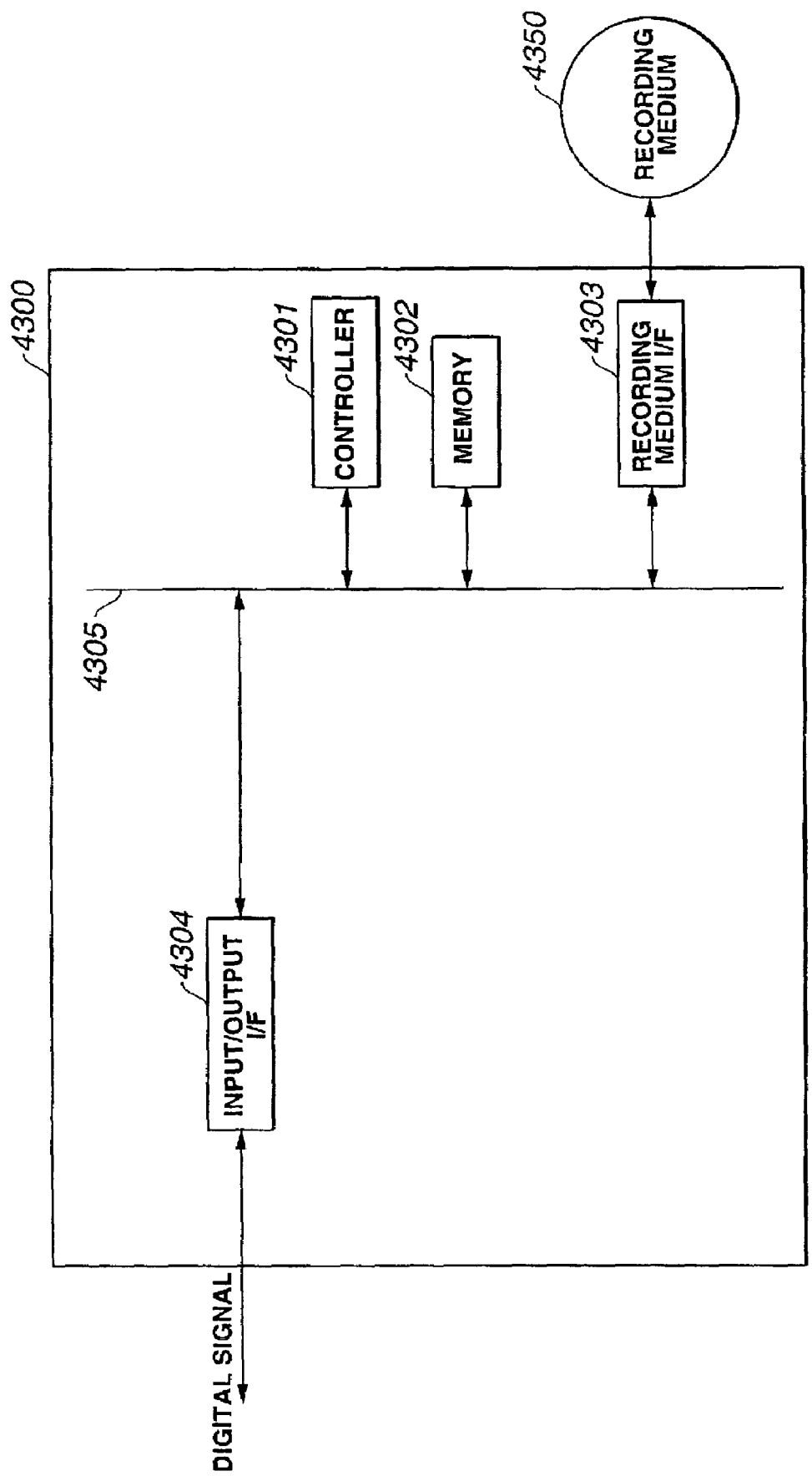
FIG. 43 is a block diagram showing the construction of an apparatus for producing an information recording medium which is used in the information recorder/player according to the present invention.

FIG. 43 outlines the disc manufacturing apparatus used for production of a recording medium and which records a disc ID, key renewal block (KRB) and an encrypted master key or medium key to the recording medium.

The disc manufacturing apparatus shown in FIG. 43 records a disc ID, key renewal block (KRB) and an encrypted master key or medium key to a recording medium already assembled in an assembling process (not shown), and also a pre-recording generation number Generation#n of the master key to the recording medium as necessary.

A disc manufacturing apparatus 4300 includes a memory 4302 having prestored therein a disc ID, key renewal block (KRB) and encrypted master key or medium key or any other memory means, a recording medium I/F 4303 which makes write and read to and from a recording medium 4350, an input/output I/F 4304 being an interface for other devices, a controller 4301 which controls the above components, and a bus 4305 which connects the above components to each other.

In the example shown in FIG. 43, the memory 4302 and recording medium I/F 4303 are built in the disc manufacturing apparatus 4300. However, the memory 4302 and recording medium I/F 4303 may be external devices for connection to the disc manufacturing apparatus 4300.

The disc ID, key renewal block (KRB), encrypted master key or medium key and the pre-recording generation number Generation#n are issued from a key issuing center (not shown) for example and prestored in the built-in or external memory.

The disc ID, key renewal block (KRB) and encrypted master key or medium key stored in the memory 4302 are recorded to the recording medium via the recording medium I/F 4303 under the control of the controller 4301. Note that the pre-recording generation number Generation#n is recorded to the recording medium as necessary.

Also, the disc ID, key renewal block (KRB), encrypted master key or medium key stored in the memory 4302 and the pre-recording generation number Generation#n may be the ones prestored in the memory 4302 as mentioned above as well as ones sent from the key issuing center via the input/output I/F 4304, for example.

Figure 44:
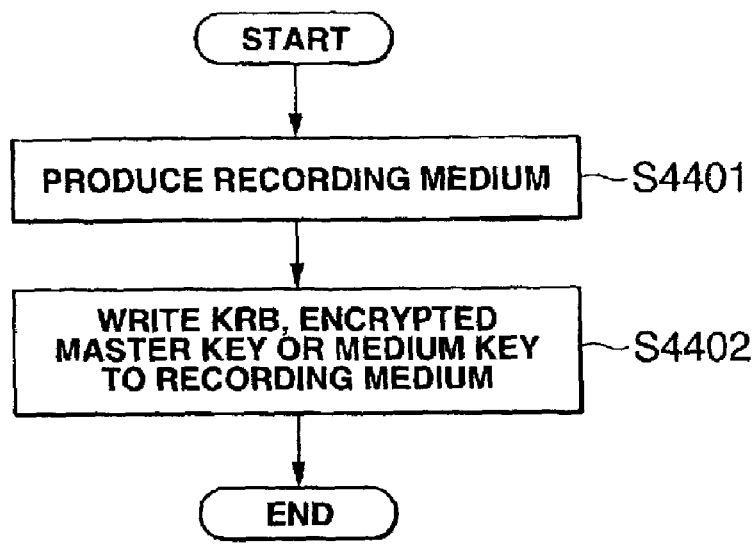
FIG. 44 shows a flow of operations made in production of the information recording medium which is used in the information recorder/player according to the present invention.

FIG. 44 shows a flow of operations effected in the recording medium producing method according to the present invention to produce the recording medium and record a disc ID, key renewal block (KRB), encrypted master key or medium key and a pre-recording generation number Generation#n to the recording medium.

In the recording medium producing method, first in step S4401 in FIG. 44, a recording medium such as DVD, CD or the like is assembled in a well-known assembling process (not shown).

Next in step S4402, the recorder/player shown in FIG. 43 records, to the recording medium produced as in the above, a disc ID, key renewal block (KRB) and an encrypted master key or medium key. Also, the recorder/player records a pre-recording generation number Generation#n to the recording medium as necessary.

After completion of the above disc manufacturing process, there will be shipped from factory the recording medium having recorded therein, a disc ID, key renewal block (KRB) and an encrypted master key or medium key. Also, after a pre-recording generation number Generation#n is recorded as necessary, the recording medium will be shipped from factory.

[KRB Format]

Figure 45:
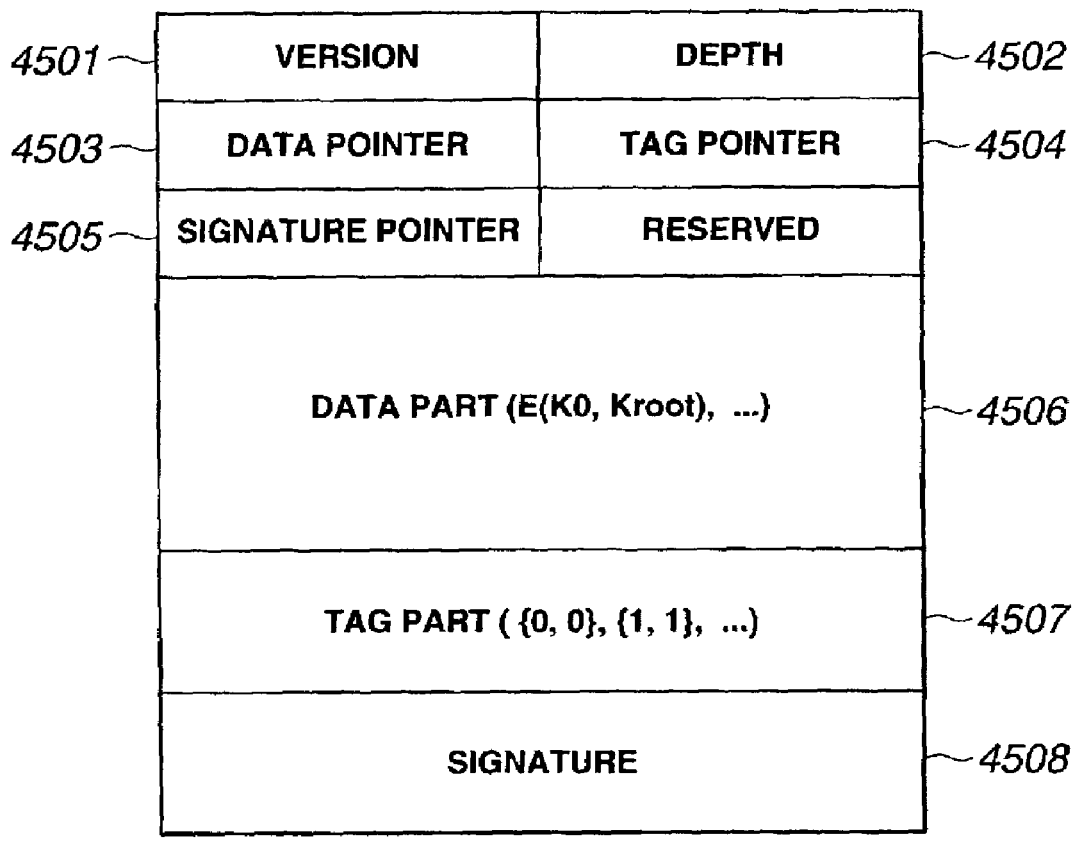
FIG. 45 shows an example format of the key renewal block (KRB) used in the information recorder/player according to the present invention.

FIG. 45 shows an example format of the key renewal block (KRB). In the format, "Version" 4501 identifies the version of the key renewal block. "Depth" 4502 indicates a number of stages of a hierarchical tree of the key renewal block (KRB) for a device to which the recording medium is destined. "Data pointer" 4503 indicates the position of a data part in the key renewal block (KRB), and "Tag pointer" 4504 indicates the position of a tag part. "Signature pointer" 4505 indicates the position of a signature. "Data part" 4506 has stored therein data derived from encryption of node keys to be renewed for example.

"Tag part" 4507 is a tag indicating the geometry of encrypted node keys and leaf keys stored in the data part. The tag appending rule will be described with reference to FIG. 46 showing an example of sending the key renewal block (KRB) having previously been described with reference to FIG. 12A. The current data is as shown in the right table in FIG. 46. The address of a top node included in the current encryption key is taken as a top node address. In this case, since the top node address contains a renewal key $K(t)R$ of a route key, so it will be "KR".

As shown in FIG. 46, data $Enc(K(t)0, K(t)R)$ on the top stage in the encryption key takes a position in the hierarchical tree shown in the left portion of the illustration. Next to the data $Enc(K(t)0, K(t)R)$, there is data $Enc(K(t)00, K(t)0)$ in a left lower position of the preceding data. When there is no data there, the tag is set to "0". When there is data there, the tag is set to "1". The tag is set like {left(L) tag, right(R) tag}. Since there exists data to the left of the topmost data $Enc(K(t)0, K(t)R)$, the tag will be L tag=0. There is no data to the right of the data $Enc(K(t)0, K(t)R)$, and so the tag will be R tag=1. Tags are set to all the data in this way to form data row and tag row as shown in FIG. 46C. Nodes in the tree should preferably be processed by either the "width first" or "depth first" method. In the "width first" method, nodes on the same stage are processed first in the direction of width. In the "depth first" method, nodes are processed first in the direction of depth.

The KRB format will further be described with reference to FIG. 45 again. "Signature" in the format is an electronic signature made by for example the key issuing center, content provider, settlement institute or the like which has issued the key renewal block (KRB). A device having received a KRB confirms, by signature verification, that the received KRB is a one issued for a legal key renewal block (KRB) issuing party.

In the foregoing, the present invention has been described in detail concerning specific embodiments thereof. However, it will be apparent that the present invention can be modified or altered by those skilled in the art without departure from the scope and spirit thereof. That is, the embodiments of the present invention has been described by way of example and the present invention is not limited to these embodiments. The substance of the present invention is referred to the claims defined later.

INDUSTRIAL APPLICABILITY

As having been described in the foregoing, since renewed data of a master key and medium key are transmitted each along with a key renewal block (KRB) by the tree-structural key distribution system, so the information recorder/player according to the present invention can transmit or distribute decryptable keys to only a device in which the keys have to be renewed and thus the size of a message to be distributed can be reduced. Further, a key which is decryptable only by a specific group of devices defined by the tree structure and which cannot be decrypted by any other devices not belonging to the group, can be distributed with the message size reduced, so that the security of the key distribution or delivery can be assured.

Also, according to the present invention, a key to be transmitted to each of the recorder/players by the tree-structural key distribution system may be a master key which can commonly be used in a system defined by a specific group included in the tree structure or a medium key unique to each recording medium. By generating a KRB unique to each recorder/player or recording medium and delivering it to them via a network or medium, it is possible to renew the key easily and safely.

Thus, according to the present invention, it is possible to built an information recording/playback system in which copyrighted data such as movie, music or the like can be prevented from being copied illegally (against the copyrighter's will).

With a design of a system using a generation-manage master key and in which a KRB-renewed master key of a new generation can be distributed, it is possible to generate a unique key block oriented for a device capable of renewing a renewed master key having been encrypted and distributed along with the KRB. So, according to the present invention, it is possible to generate an encrypted master key decryptable only by a device needing to renew the master key and safely renew the key, without having to make the conventional authentication with each device.

Further, in the information recorder/player and information recording/playback method according to the present invention, not only encryption with a generation-managed master key or medium key but encryption with the player restriction being settable are effected to store the data to a recording medium. Owing to this system, data is recorded to a recording medium by having a device-unique key act on the encryption key with which the data has been encrypted when the player restriction is set (the data can be played back in a restricted player). In case the player restriction is not set, a device ID is made to act on the encryption key with which the data has been encrypted, thereby encrypt the data to be recorded to the recording medium. Further, since device identification information for a device having recorded the data and information indicative of which has been used to record the data, the player restriction mode or player non-restriction mode (player restriction flag), are recorded to the recording medium, only a device knowing the device-unique key and having recorded the data can decrypt the data when the player restriction is set. When the player restriction is not set, any device can decrypt the data with device identification information (device ID) for the device having recorded the data.

Also, the information recording/playback apparatus and method according to the present invention generate an encrypting block key for block data based on an ATS which is random data corresponding to a time when each packet arrives. So it is possible to generate a unique key which varies from one block to another, use a different encryption key for each block and thus enhance the protection against data cryptanalysis. Also, by generating a block key based on the ATS, no area has to be secured in the recording medium for storage of an encryption key for each block and thus the main data area can be used more effectively. Furthermore, data other than the main data has not to be accessed during data recording or playback, and thus the data recording or playback can be done with a higher efficiency.

The invention claimed is:

1. An information recorder for recording information onto a recording medium, said recorder comprising:

cryptography means for generating an encryption key based on encryption key generating data built within said information recorder and for encrypting, using the generated encryption key, data that is to be stored on the recording medium; and memory means for storing a corresponding leaf key and at least a portion of a plurality of node keys, the plurality of node keys being associated with a plurality of nodes whereby a given one of the plurality of node keys is associated with a particular one of the plurality of nodes, the plurality of nodes being arranged according to a hierarchical tree structure having a root node and having one or more leaves, a specific leaf of the one or more leaves being associated with said information recorder and with its corresponding leaf key, the portion of the plurality of node keys being the node keys associated with the nodes disposed along a particular path from the root node to the specific leaf, the encryption key generating data being renewable using a key renewal block and at least one key selected from the group consisting of the corresponding leaf key and the portion of the plurality of node keys, the key renewal block including encrypted data and tag data, the encrypted data being derived from encryption of renewed encryption key generating data and the selected at least one key, and the tag data indicating locations in the hierarchical tree structure whose associated keys are encrypted within the encrypted data, the encryption key being a first encryption key and the encryption key generating data being first encryption key generating data when playback of the recording medium is to be restricted to only a player storing a specific identifier, the first encryption key generating data being stored on the recording medium, and the encryption key being a second encryption key and the encryption key generating data being second encryption key generating data when playback of the recording medium is not to be restricted.

2. The apparatus according to claim 1, wherein the encryption key generating data is a master key common to a plurality of information recorders associated with a plurality of leaves in the hierarchical tree structure such that a given one of the plurality of information recorders is associated with a particular one of the plurality of leaves.

3. The apparatus according to claim 1, wherein the encryption key generating data is a medium key unique to a specific recording medium.

4. The apparatus according to claim 1, wherein:

the encryption key generating data has a generation number as renewal information correlated therewith; and the cryptography means stores, as a recording generation number into the recording member, a generation number of the encryption key generating data having been used when storing encrypted data into the recording medium.

5. The apparatus according to claim 1, wherein:

when playback of the recording medium is not to be restricted, said cryptography means generates a title-unique key from a master key, of which the generation is managed, stored in the information recorder, a disc ID being an identifier unique to a recording medium, a title key unique to data to be recorded to the recording medium and a device ID being an identifier for the information recorder to generate the first encryption key from the title-unique key; and when playback of the recording medium is to be restricted to the player storing the specific identifier, said cryptography means generates a title-unique key from the generation-managed master key stored in the information recorder, disc ID being an identifier unique to the recording medium, title key unique to the data to be recorded to the recording medium and the device-unique key unique to the information recorder to generate the second encryption key from the title-unique key.

6. The apparatus according to claim 1, further comprising a transport stream processing means for appending an arrival time stamp (ATS) to each of discrete transport packets included in a transport stream;

the cryptography means generating a block key as an encryption key for a block data including more than one packet each having the arrival time stamp (ATS) appended thereto; and the cryptography means generating a block key as an encryption key, in encryption of the data to be stored into the recording medium, based on data including the encryption key generating data and a block seed being additional information unique to the block data including the arrival time stamp (ATS).

7. The apparatus according to claim 1, wherein the cryptography means encrypts the data to be stored into the recording medium according to DES algorithm.

8. The apparatus according to claim 1, further comprising:

an interface means for receiving information to be recorded to a recording medium;

said interface means identifying copy control information appended to each of packets included in a transport stream in a data to judge, based on the copy control information, whether or not recording to the recording medium is possible.

9. The apparatus according to claim 1, further comprising:

an interface means for receiving information to be recorded to a recording medium;

said interface means identifying 2-bit EMI (encryption mode indicator) as copy control information to judge, based on the EMI, whether or not recording to the recording medium is possible.

10. The apparatus according to claim 1, wherein:

at least one of the node keys is renewable, and when at least one node key is renewed, the key renewal block (KRB) includes encrypted data derived from encryption of at least one renewed node key with at least a node key or leaf key located on a lower stage of the hierarchical tree structure; and said cryptography means receives renewal data for the encryption key generating data encrypted with the at least one renewed node key, encrypts the key renewal block (KRB) to acquire the at least one renewed node key, and calculates renewal data for the encryption key generating data using the acquired at least one renewed node key thus.

11. The apparatus according to claim 10, wherein:
the key renewal block (KRB) is stored in a recording medium; and
the cryptography means encrypts the key renewal block (KRB) read from the recording medium.

12. An information player for playing back information from a recording medium, said information player comprising:
memory means for storing a corresponding leaf key and at least a portion of a plurality of node keys, the plurality of node keys being associated with a plurality of nodes whereby a given one of the plurality of node keys is associated with a particular one of the plurality of nodes, the plurality of nodes being arranged according to a hierarchical tree structure having a root node and having one or more leaves, a specific leaf of the one or more leaves being associated with said information recorder and with its corresponding leaf key, the portion of the plurality of node keys being the node keys associated with the nodes disposed along a particular path from the root node to the specific leaf;
cryptography means for decrypting encrypted data stored in the recording medium using a decryption key and for generating the decryption key based on decryption key generating data built in said information recorder; and
the decryption key generating data being renewable using a key renewal block and at least one key selected from the group consisting of the corresponding leaf key and the portion of the plurality of node keys, the key renewal block including encrypted data and tag data, the encrypted data being derived from encryption of renewed encryption key generating data and the selected at least one key, and the tag data indicating locations in the hierarchical tree structure whose associated keys are encrypted within the encrypted data;
the decryption key being a first decryption key and the decryption key generating data being first decryption key generating data when playback of the recording medium is restricted such that said information player can play back information from the recording medium only if said information player stores a specific identifier, and
the decryption key being a second decryption key and the decryption key generating data being second decryption key generating data when playback of the recording medium is not restricted.

13. The apparatus according to claim 12, wherein the encryption key generating data is a master key common to a plurality of information recorders associated with a plurality of leaves in the hierarchical tree structure such that a given one of the plurality of information recorders is associated with a particular one of the plurality of leaves.

14. The apparatus according to claim 13, wherein the decryption key generating data is a medium key unique to a specific recording medium.

15. The apparatus according to claim 12, wherein:
the decryption key generating data has a generation number as renewal information correlated therewith; and
the cryptography means reads, from the recording medium when decrypting encrypted data read from the recording medium, a generation number of the encryption key generating data having been used when encrypting the encrypted data and generates a decryption key from the decryption key generating data corresponding to the generation number thus read.

16. The apparatus according to claim 12, wherein:
when playback of the recording medium is not restricted, said cryptography means acquires a generation-managed master key stored in the information recorder and acquires, from a recording medium, a disc ID being an identifier unique to a recording medium, a title key unique to data to be decrypted and a device ID being an identifier for the information recorder having recorded the encrypted data to generate a title-unique key from the master key, disc ID, title key and device key and the first decryption key from the title-unique key; and
when playback of the recording medium is restricted and said information player stores the specific identifier, said cryptography means acquires a generation-managed master key stored in the information recorder and a device-unique key unique to, and stored in, the information recorder and acquires, from a recording medium, a disc ID being an identifier unique to the recording medium and a title key unique to the data to be decrypted to generate a title-unique key from the master key, disc ID, title key and device-unique key, and the second decryption key is generated from the title-unique key.

17. The apparatus according to claim 12, further comprising a transport stream processing means for controlling data outputting based on an arrival time stamp (ATS) appended to each of a plurality of transport packets included in the block data having been decrypted by the cryptography means;
the cryptography means generating a block key as a decryption key for a block data including more than one packets each having the arrival time stamp (ATS) appended thereto; and
the block key as a decryption being generated, in decryption of the encrypted data stored in the recording medium, based on data including the decryption key generating data and a block seed being additional information unique to the block data including the arrival time stamp CATS).

18. The apparatus according to claim 12, wherein the cryptography means decrypts the encrypted data stored in the recording medium according to DES algorithm.

19. The apparatus according to claim 12, wherein there is further provided an interface means for receiving information to be recorded to a recording medium;
the interface means identifying copy control information appended to each of packets included in a transport stream in a data to judge, based on the copy control information, whether or not playback from the recording medium is possible.

20. The apparatus according to claim 12, wherein there is further provided an interface means for receiving information to be recorded to a recording medium;
the interface means identifying 2-bit EMI (encryption mode indicator) as copy control information to judge, based on the EMI, whether or not playback from the recording medium is possible.

21. The apparatus according to claim 12, wherein:
at least one of the node keys is renewable, and
when at least one node key is renewed, the key renewal block (KRB) includes encrypted data derived from encryption of at least one renewed node key with at least a node key or leaf key located on a lower stage of the hierarchical tree structure; and said cryptography means receives renewal data for the encryption key generating data encrypted with the at least one renewed node key, encrypts the key renewal block (KRB) to acquire the at least one renewed node key, and calculates renewal data for the encryption key generating data using the acquired at least one renewed node key thus.

22. The apparatus according to claim 21, wherein:
the key renewal block (KRB) is stored in a recording medium; and
the cryptography means encrypts the key renewal block (KRB) read from the recording medium.

23. An information recording method for recording information to a recording medium, said method comprising:
storing a corresponding leaf key and at least a portion of a plurality of node keys, the plurality of node keys being associated with a plurality of nodes whereby a given one of the plurality of node keys is associated with a particular one of the plurality of nodes, the plurality of nodes being arranged according to a hierarchical tree structure having a root node and having one or more leaves, a specific leaf of the one or more leaves being associated with said information recorder and with its corresponding leaf key, the portion of the plurality of node keys being the node keys associated with the nodes disposed along a particular path from the root node to the specific leaf;
renewing encryption key generating data built within an information recorder using a key renewal block and at least one key selected from the group consisting of the corresponding leaf key and the portion of the plurality of node keys, the key renewal block including encrypted data and tag data, the encrypted data being derived from encryption of renewed encryption key generating data and the selected at least one key, and the tag data indicating locations in the hierarchical tree structure whose associated keys are encrypted within the encrypted data;
generating an encryption key based on the encryption key generating data;
encrypting, using the generated encryption key, data to be stored on the recording medium;
the encryption key being a first encryption key and the encryption key generating data being first encryption key generating data when playback of the recording medium is to be restricted to only a player storing a specific identifier, the first encryption key generating data being stored on the recording medium, and
the encryption key being a second encryption key and the encryption key generating data being second encryption key generating data when playback of the recording medium is not to be restricted.

24. The method according to claim 23, wherein the encryption key generating data is a master key common to a plurality of information recorders associated with a plurality of leaves in the hierarchical tree structure such that a given one of the plurality of information recorders is associated with a particular one of the plurality of leaves.

25. The method according to claim 23, wherein the encryption key generating data is a medium key unique to a specific recording medium.

26. The method according to claim 23, wherein:
at least one of the node keys is renewable, and
when at least one node key is renewed, the key renewal block (KRB) includes encrypted data derived from encryption of at least one renewed node key with at least a node key or leaf key located on a lower stage of the hierarchical tree structure; and
said renewing step includes:
acquiring the renewed node key by encrypting the key renewal block (KRB); and
calculating renewal data for the encryption key generating data using the acquired at least one renewed node key thus acquired.

27. The method according to claim 23, wherein:
the encryption key generating data has a generation number as renewal information correlated therewith; and
the cryptography step further includes the step of storing, when storing encrypted data into the recording medium, a generation number of the encryption key generating data having been used, as a recording generation number into the recording medium.

28. The method according to claim 23, wherein:
when playback of the recording medium is not restricted, said generating step generates a title-unique key from a generation-managed master key stored in the information recorder, a disc ID being an identifier unique to a recording medium, a title key unique to data to be recorded to the recording medium and a device ID being an identifier for the information recorder and generates the first encryption key from the title-unique key; and
when playback of the recording medium is restricted to an information player storing the specific identifier, said generating step generates a title-unique key from the generation-managed master key stored in the information recorder, disc ID being an identifier unique to the recording medium, title key unique to the data to be recorded to the recording medium and the device-unique, key unique to the information recorder and generates the second encryption key from the title-unique key.

29. The method according to claim 23, wherein there is further included a transport stream processing step of appending an arrival time stamp (ATS) to each of discrete transport packets included in a transport stream; in the cryptography step:
there is generated a block key as an encryption key for a block data including more than one packet each having the arrival time stamp (ATS) appended thereto; and
the block key as an encryption key is generated, in encryption of the data to be stored into the recording medium, based on data including the encryption key generating data and a block seed being additional information unique to the block data including the arrival time stamp (ATS).

30. The method according to claim 23, wherein there is encrypted in the cryptography step the data to be stored into the recording medium according to DES algorithm.

31. The method according to claim 23, wherein copy control information appended to each of packets included in a transport stream in a data is identified to judge, based on the copy control information, whether or not recording to the recording medium is possible.

32. The method according to claim 23, wherein 2-bit EMI (encryption mode indicator) as copy control information is identified to judge, based on the EMI, whether or not recording to the recording medium is possible.

33. An information playback method for playing back information from a recording medium, said method comprising:

storing a corresponding leaf key and at least a portion of a plurality of node keys, the plurality of node keys being associated with a plurality of nodes whereby a given one of the plurality of node keys is associated with a particular one of the plurality of nodes, the plurality of nodes being arranged according to a hierarchical tree structure having a root node and having one or more leaves, a specific leaf of the one or more leaves being associated with said information recorder and with its corresponding leaf key, the portion of the plurality of node keys being the node keys associated with the nodes disposed along a particular path from the root node to the specific leaf;

renewing encryption key generating data built within an information recorder using a key renewal block and at least one key selected from the group consisting of the corresponding leaf key and the portion of the plurality of node keys, the key renewal block including encrypted data and tag data, the encrypted data being derived from encryption of renewed encryption key generating data and the selected at least one key, and the tag data indicating locations in the hierarchical tree structure whose associated keys are encrypted within the encrypted data;

generating the decryption key based on the renewed decryption key generating data; and decrypting the data stored in the recording medium using the generated decryption key;

the decryption key being a first decryption key and the decryption key generating data being first decryption key generating data when playback of the recording medium is restricted such that the information player can play back information from the recording medium only if only the information player stores a specific identifier, and the decryption key being a second decryption key and the decryption key generating data being second decryption key generating data when playback of the recording medium is not to be restricted.

34. The method according to claim 33, wherein the encryption key generating data is a master key common to a plurality of information recorders associated with a plurality of leaves in the hierarchical tree structure such that a given one of the plurality of information recorders is associated with a particular one of the plurality of leaves.

35. The method according to claim 33, wherein the decryption key generating data is a medium key unique to a specific recording medium.

36. The method according to claim 33, wherein:
at least one of the node keys is renewable, and
when at least one node key is renewed, the key renewal block (KRB) includes encrypted data derived from encryption of at least one renewed node key with at least a node key or leaf key located on a lower stage of the hierarchical tree structure; and
said cryptography step includes:
encrypting the key renewal block (KRB) to acquire the renewed node key; and
calculating renewal data for the encryption key generating data using the acquired at least one renewed node key thus acquired.

37. The method according to claim 33, wherein:
the decryption key generating data has a generation number as renewal information correlated therewith; and
in the cryptography step, there is read from the recording medium when decrypting encrypted data from the recording medium, a generation number of the encryption key generating data having been used when encrypting the encrypted data to generate a decryption key from decryption key generating data corresponding to the generation number thus read.

38. The method according to claim 33, wherein said generating step includes:
when playback of the recording medium is not to be restricted, acquiring a generationmanaged master key stored in the information player, acquiring, from the recording medium, a disc ID being an identifier unique to a recording medium, a title key unique to data to be decrypted and a device ID being an identifier for the information recorder having recorded the encrypted data to generate a title-unique key from the master key, disc ID, title key and device key and the first decryption key from the title-unique key; and
when playback of the recording medium is restricted and the information player stores the specific identifier, acquiring a generation-managed master key stored in the information player and a device-unique key unique to, and stored in, the information player, and acquiring, from a recording medium, a disc ID being an identifier unique to the recording medium and a title key unique to the data to be decrypted to generate a title-unique key from the master key, disc ID, title key and device-unique key; the second
decryption key being generated from the title-unique key thus generated.

39. The method according to claim 33, wherein:
the player includes a transport stream processing means for controlling data outputting based on an arrival time stamp (ATS) appended to each of a plurality of transport packets included in the decrypted block; and in the cryptography step:
a block key is generated as a decryption key for a block data including more than one packets each having the arrival time stamp (ATS) appended thereto; and
the block key as a decryption is generated, in decryption of the encrypted data stored in the recording medium, based on data including the decryption key generating data and a block seed being additional information unique to the block data including the arrival time stamp (ATS).

40. The method according to claim 33, wherein the encrypted data stored in the recording medium is decrypted according to DES algorithm.

41. The method according to claim 33, wherein copy control information appended to each of packets included in a transport stream in a data is identified to judge, based on the copy control information, whether or not playback from the recording medium is possible.

42. The method according to claim 33, wherein 2-bit EMI (encryption mode indicator) as copy control information is identified to judge, based on the EMI, whether or not playback from the recording medium is possible.

43. A storage medium for storing a computer program for carrying out a method of recording information to a recording medium, said method comprising:
storing a corresponding leaf key and at least a portion of a plurality of node keys, the plurality of node keys being associated with a plurality of nodes whereby a given one of the plurality of node keys is associated with a particular one of the plurality of nodes, the plurality of nodes being arranged according to a hierarchical tree structure having a root node and having one or more leaves, a specific leaf of the one or more leaves being associated with said information recorder and with its corresponding leaf key, the portion of the plurality of node keys being the node keys associated with the nodes disposed along a particular path from the root node to the specific leaf;

renewing encryption key generating data built within an information recorder using a key renewal block and at least one key selected from the group consisting of the corresponding leaf key and the portion of the plurality of node keys, the key renewal block including encrypted data and tag data, the encrypted data being derived from encryption of renewed encryption key generating data and the selected at least one key, and the tag data indicating locations in the hierarchical tree structure whose associated keys are encrypted within the encrypted data;

generating an encryption key based on the encryption key generating data;

encrypting, using the generated encryption key, data to be stored on the recording medium;

the encryption key being a first encryption key and the encryption key generating data being first encryption key generating data when playback of the recording medium is to be restricted to only a player storing a specific identifier, the first encryption key generating data being stored on the recording medium, and the encryption key being a second encryption key and the encryption key generating data being second encryption key generating data when playback of the recording medium is not to be restricted.

44. A storage medium for storing a computer program for carrying out a method of playing back information stored in a recording medium, said method comprising:

storing a corresponding leaf key and at least a portion of a plurality of node keys, the plurality of node keys being associated with a plurality of nodes whereby a given one of the plurality of node keys is associated with a particular one of the plurality of nodes, the plurality of nodes being arranged according to a hierarchical tree structure having a root node and having one or more leaves, a specific leaf of the one or more leaves being associated with said information recorder and with its corresponding leaf key, the portion of the plurality of node keys being the node keys associated with the nodes disposed along a particular path from the root node to the specific leaf;

renewing encryption key generating data built within an information recorder using a key renewal block and at least one key selected from the group consisting of the corresponding leaf key and the portion of the plurality of node keys, the key renewal block including encrypted data and tag data, the encrypted data being derived from encryption of renewed encryption key generating data and the selected at least one key, and the tag data indicating locations in the hierarchical tree structure whose associated keys are encrypted within the encrypted data;

generating the decryption key based on the renewed decryption key generating data; and decrypting the data stored in the recording medium using the generated decryption key;

the decryption key being a first decryption key and the decryption key generating data being first decryption key generating data when playback of the recording medium is restricted such that the information player can play back information from the recording medium only if only an information player stores a specific identifier, and the decryption key being a second decryption key and the decryption key generating data being second decryption key generating data when playback of the recording medium is not to be restricted.

* * * * *

UNITED STATES PATENT AND TRADEMARK OFFICE
CERTIFICATE OF CORRECTION

| | | |
|---|---|---|
| PATENT NO. | : 7,225,339 B2 | Page 1 of 1 |
| APPLICATION NO. | : 09/980272 | |
| DATED | : May 29, 2007 | |
| INVENTOR(S) | : Tomoyuki Asano et al. | |

It is certified that error appears in the above-identified patent and that said Letters Patent is hereby corrected as shown below:

On the face of the patent after section (65) please insert the following:

--(30)   Foreign Application Priority Data

April 6, 2000 (JP) …………………………..P2000-105358

August 10, 2000 (JP) ……………………….P2000-243205--

Column 24, line 4, "12" should read --12A--.

Column 50, line 57, "13," should read --12,--.

Column 52, line 35, after "unique", delete ",".

Column 54, line 9, "generationmanaged" should read --generation-managed--.

Signed and Sealed this

Sixth Day of May, 2008

JON W. DUDAS
*Director of the United States Patent and Trademark Office*